United States Patent [19]
Teixeira et al.

[11] 3,916,386
[45] Oct. 28, 1975

[54] ELECTRONIC CASH REGISTER WITH DATA READING WAND

[75] Inventors: Anibal Teixeira, San Jose; William H. Burkhart, Los Altos Hills, both of Calif.

[73] Assignee: Transaction Systems, Incorporated, Palo Alto, Calif.

[22] Filed: Oct. 29, 1973

[21] Appl. No.: 410,896

Related U.S. Application Data

[63] Continuation of Ser. No. 182,089, Sept. 20, 1971, abandoned.

[52] U.S. Cl. .......................... 340/172.5; 235/61.11
[51] Int. Cl.² ... G06F 9/00; G06F 15/30; G06F 3/02
[58] Field of Search ............... 235/61.11, 61.6, 61.9, 235/61.7 B, 61.12; 340/149 A, 172.5

[56] References Cited
UNITED STATES PATENTS

| | | | |
|---|---|---|---|
| 2,746,679 | 5/1956 | Stratton et al. | 235/61.6 |
| 3,111,576 | 11/1963 | Lipshutz | 235/61.11 |
| 3,335,407 | 8/1967 | Lange et al. | 340/172.5 |
| 3,663,800 | 5/1972 | Myer et al. | 235/61.11 E |
| 3,665,164 | 5/1972 | Beveridge et al. | 340/149 A |
| 3,671,722 | 6/1972 | Christie | 235/61.12 |
| 3,686,637 | 8/1972 | Zachar et al. | 340/172.5 |
| 3,716,699 | 2/1973 | Eckert et al. | 235/61.11 E |
| 3,752,961 | 8/1973 | Torrey | 235/61.11 E |
| 3,774,179 | 11/1973 | Wiegand et al. | 340/174 ZB |

*Primary Examiner*—Mark E. Nusbaum
*Attorney, Agent, or Firm*—Shapiro and Shapiro

[57] ABSTRACT

Cash register which reads tags and other media, automatically checks the accuracy of data, performs computations, instructs and controls operator personnel, prints sales checks, and sends data to a remote processor. Key-less entry of all data is possible by virtue of a reading wand for data recorded magnetically on strips, for example, but an auxiliary keyboard may be provided for extra versatility. Data strips are attached to articles of merchandise, are provided upon an external control panel, and are incorporated in employee badges and customer credit cards. Each strip contains control data as well as at least one of descriptive, quantitative and instruction data. The utilization of a set of strips by an operator implements a complete transaction. The control data are preferably encoded upon each strip as a preamble to the message contained within the strip. Such preambles and the instruction data determine the manner in which the cash register operates to implement a transaction.

6 Claims, 137 Drawing Figures

FIG. 2

| TAKE CASH SEND | KEY DATE SCAN EMPLOYEE NUMBER SCAN TYPE TRANSACTION | TAKE CHARGE SEND |
| --- | --- | --- |
| | SCAN CREDIT CARD SCAN MERCHANDISE AND SERVICES | |
| COD | KEY C O D FEE | RETURN |
| LAYAWAY | KEY LAYAWAY FEE KEY SHIPPING FEE | MARKDOWN |
| PAY ACCOUNT | KEY AMOUNT DEPOSITED KEY AMOUNT | DISCOUNT |
| MERCHANDISE TRANSFER | KEY SERVICE FEE KEY AMOUNT TENDERED | VOID |
| NO SALE | REQUEST SIGNATURE WRITE ADDRESS | COMPLETE |
| CALL MANAGER | TEAR SLIP | REPEAT ENTRY |

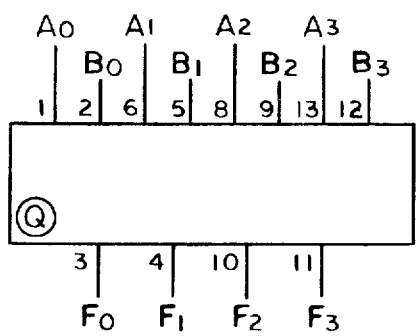
FIG. 5A
QUAD EXCLUSIVE-OR ELEMENT
SIGNETICS PART NO. 8241
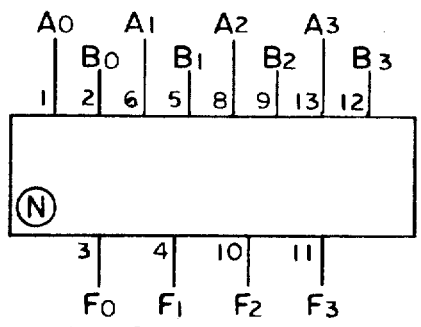
4-BIT DIGITAL COMPARATOR
(QUAD EXCLUSIVE-NOR)
SIGNETICS PART NO. 8242
FIG. 5B
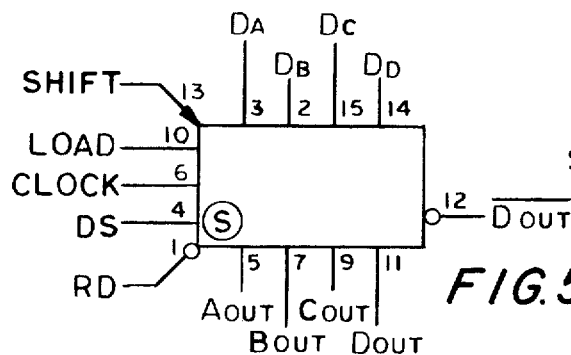
SHIFT REGISTER
SIGNETICS PART NO. 8271
FIG. 5C
GATED FULL ADDER
SIGNETICS PART NO. 8268
FIG. 5D
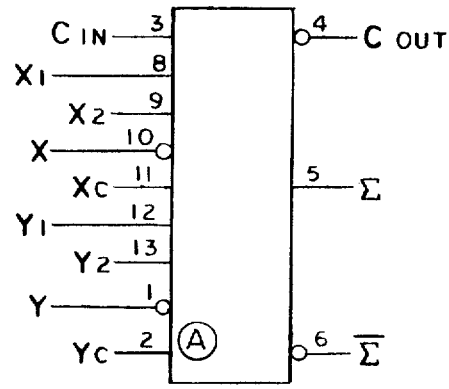
FIG. 5E
BCD-TO-DECIMAL DECODER
SIGNETICS PART NO. 8251
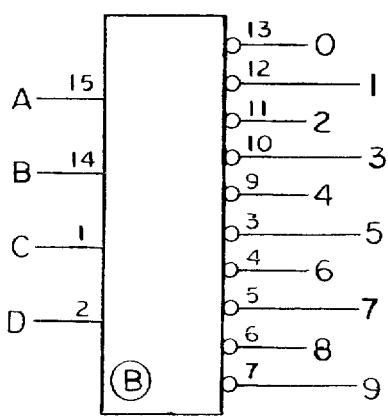
LOGIC SYMBOL KEY DUAL MASTER SLAVE J-K BINARY
SIGNETICS PART NO. 8824
FIG. 6A
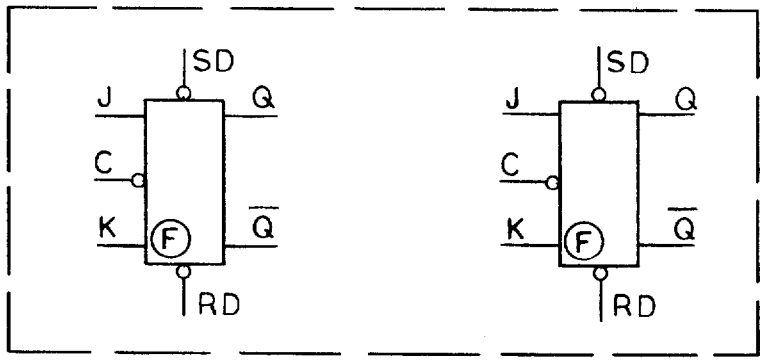
DUAL EXPANDABLE
AND-OR-INVERT GATE
SIGNETICS PART NO. 8840
FIG. 6B
DUAL 4 INPUT
EXPANDER ELEMENT
SIGNETICS PART NO. 8806
FIG. 6C
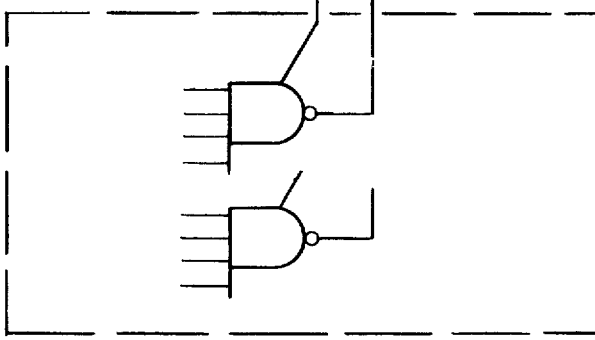
LOGIC SYMBOL KEY
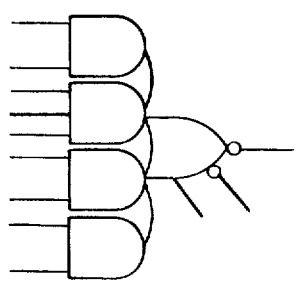
EXPANDABLE
AND-OR-INVERT GATE
SIGNETICS PART NO. 8848

MASTER TIMING SIGNALS

FIG.11 MASTER TIMING SIGNALS

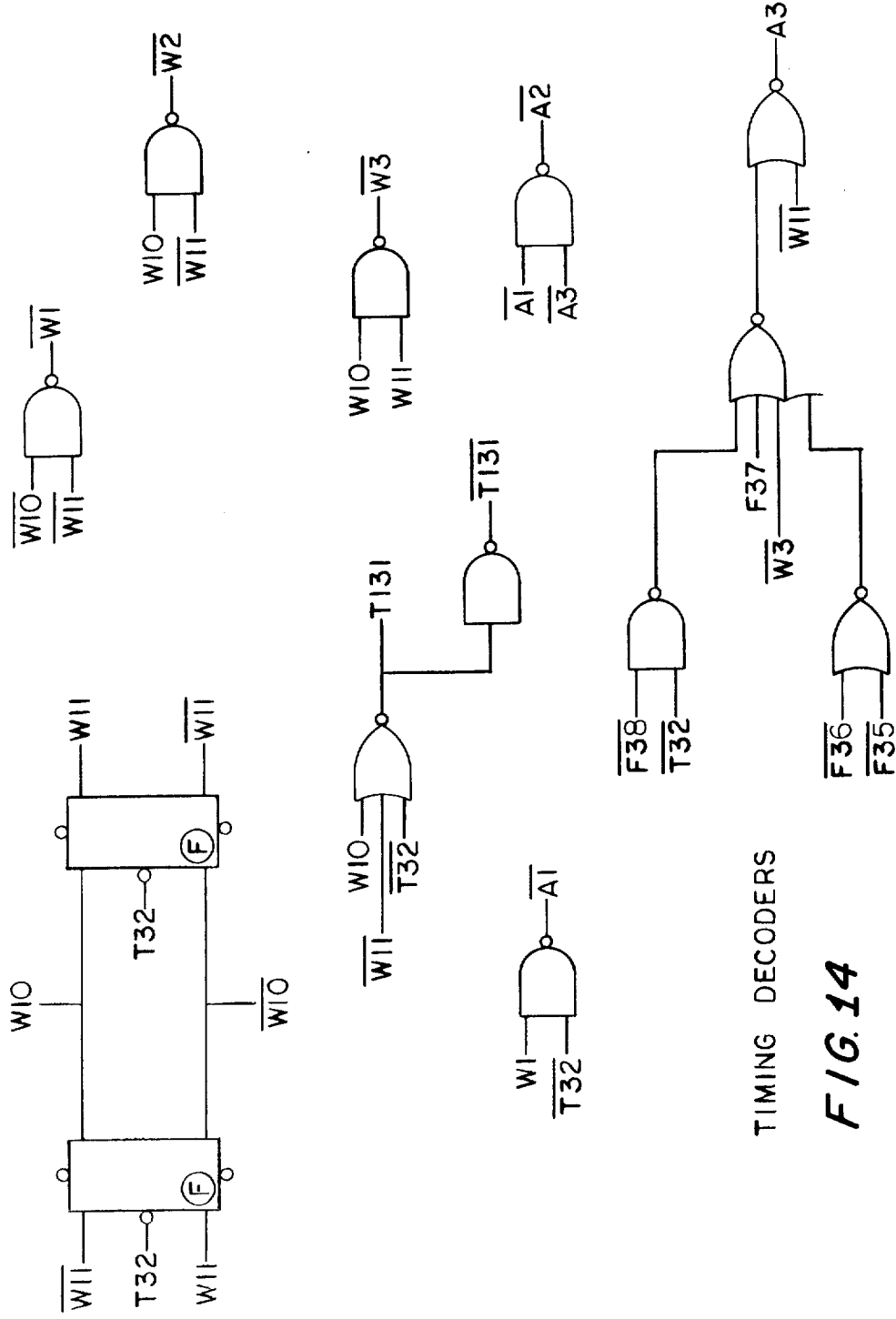

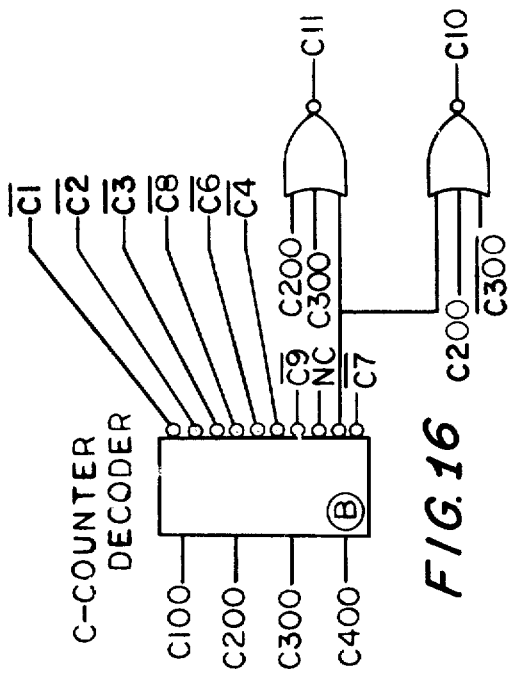
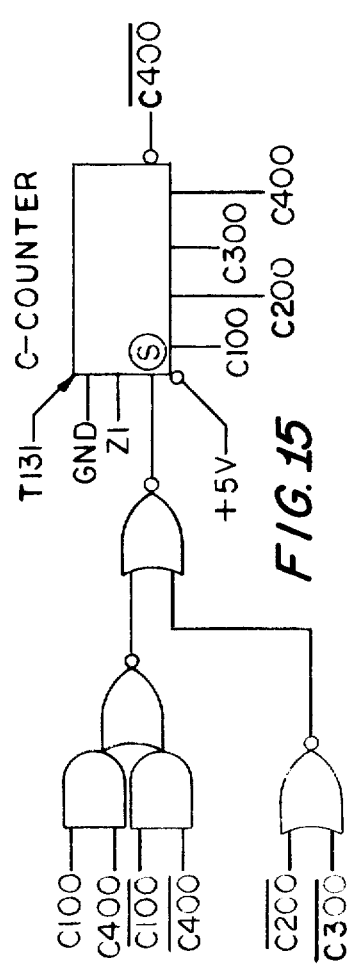
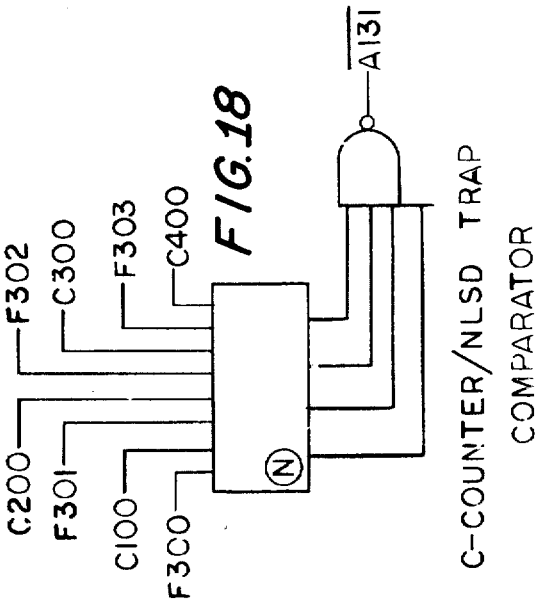
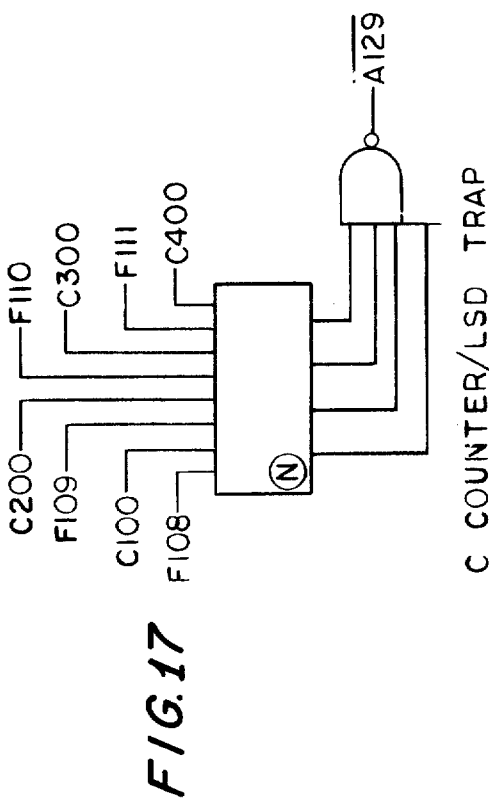

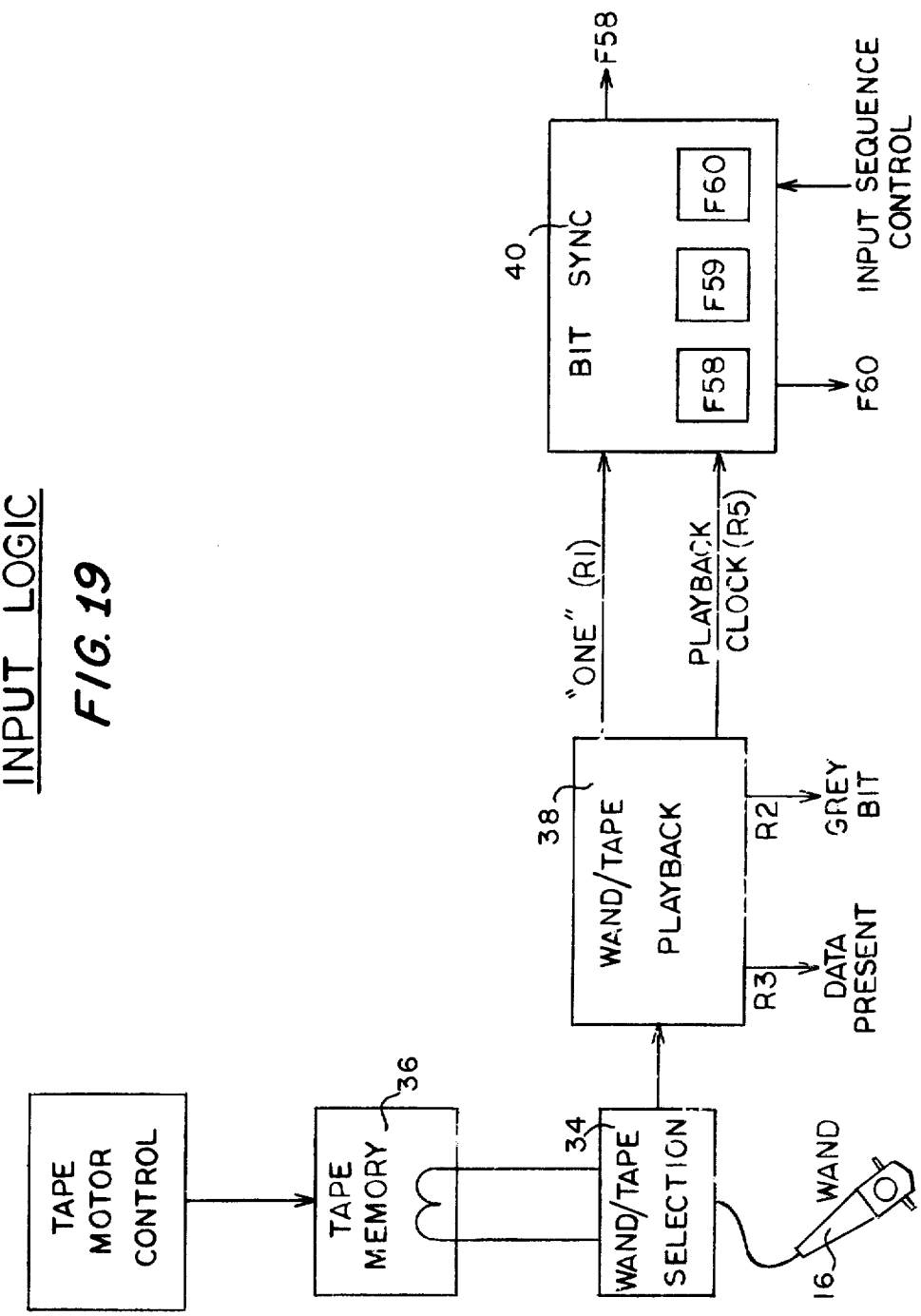

BIT SYNC LOGIC

INPUT LOGIC

WAND/TAPE SELECTION

TAPE MOTOR DRIVER

INPUT LOGIC

AMR AMOUNT FIELD SIGN FLIP FLOP

TAPE MOTOR CONTROL SIGNAL

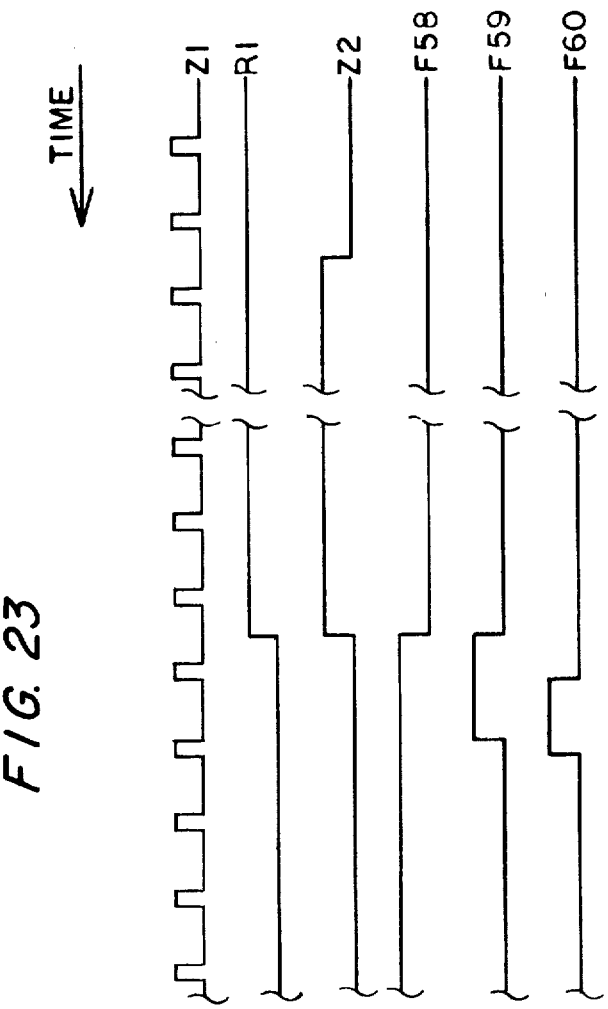

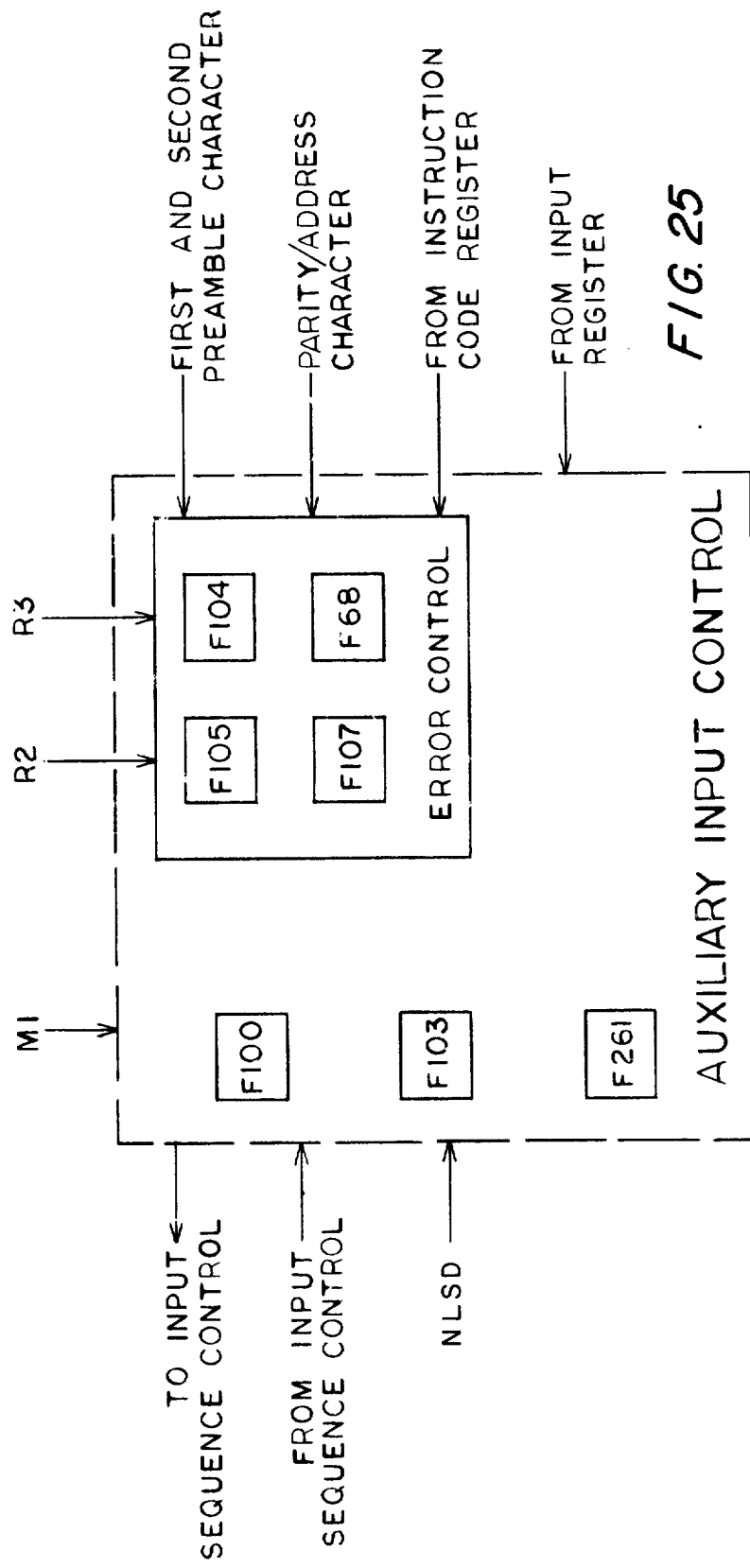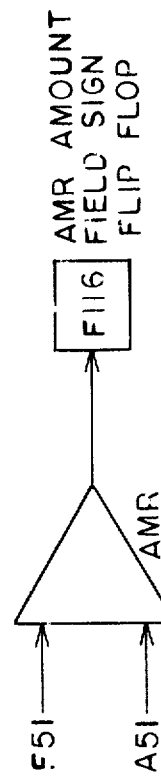

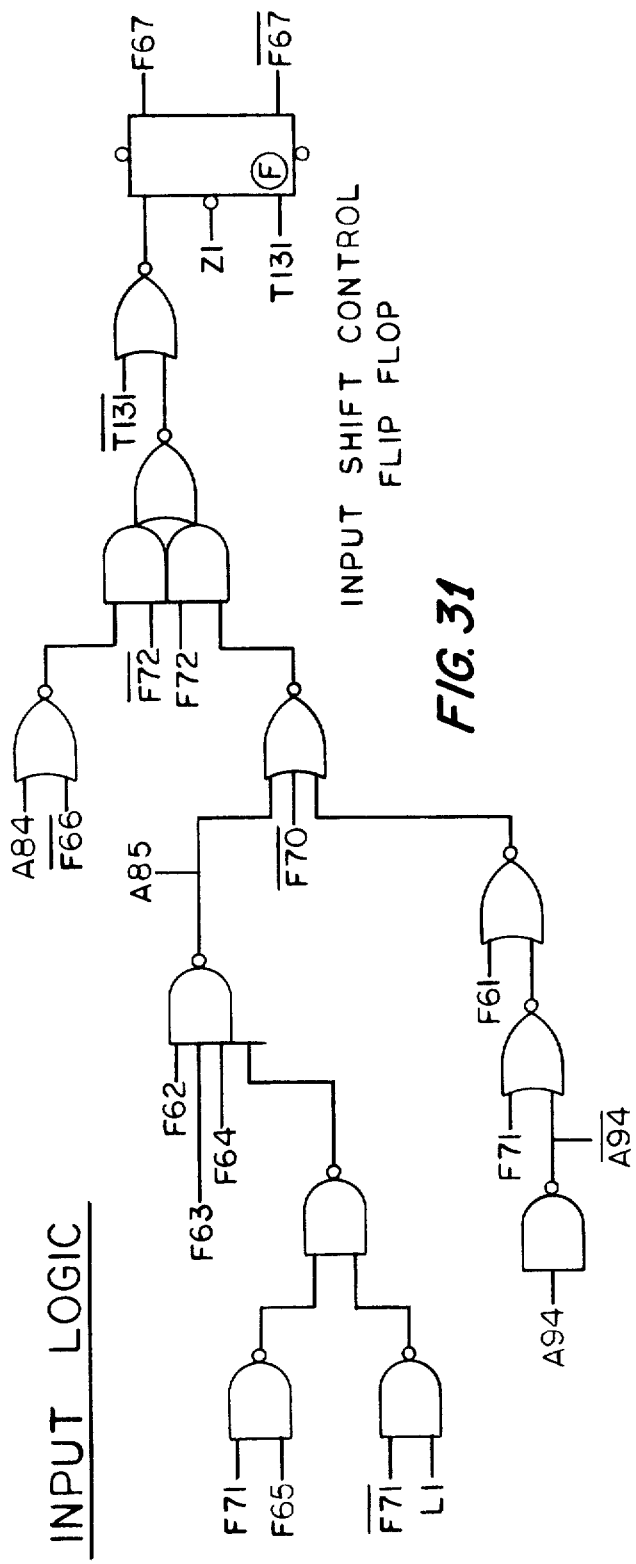
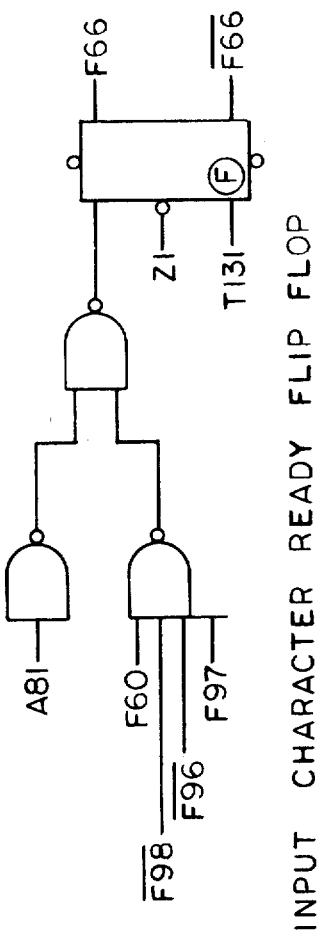
FIG. 31
FIG. 30

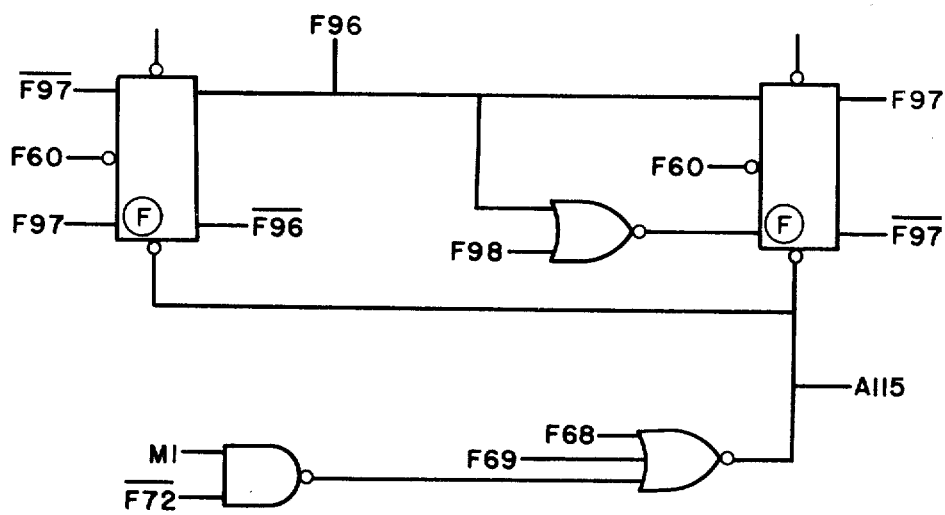
INPUT BIT COUNTER     FIG 32
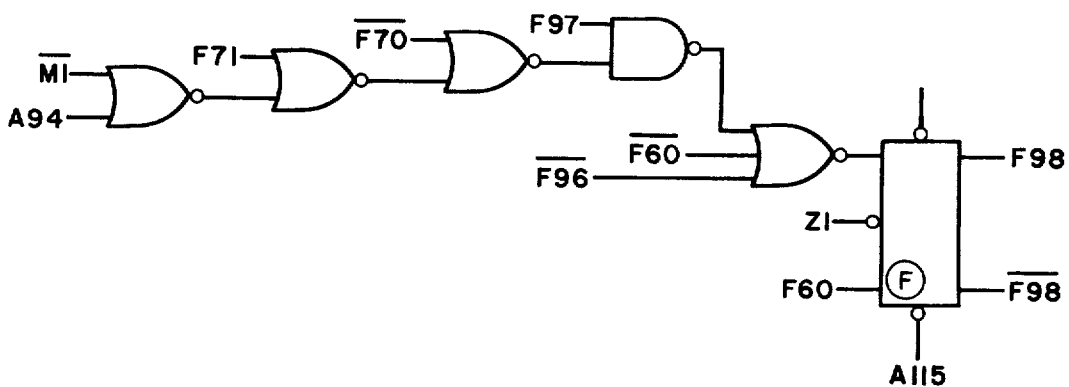
INPUT LOGIC

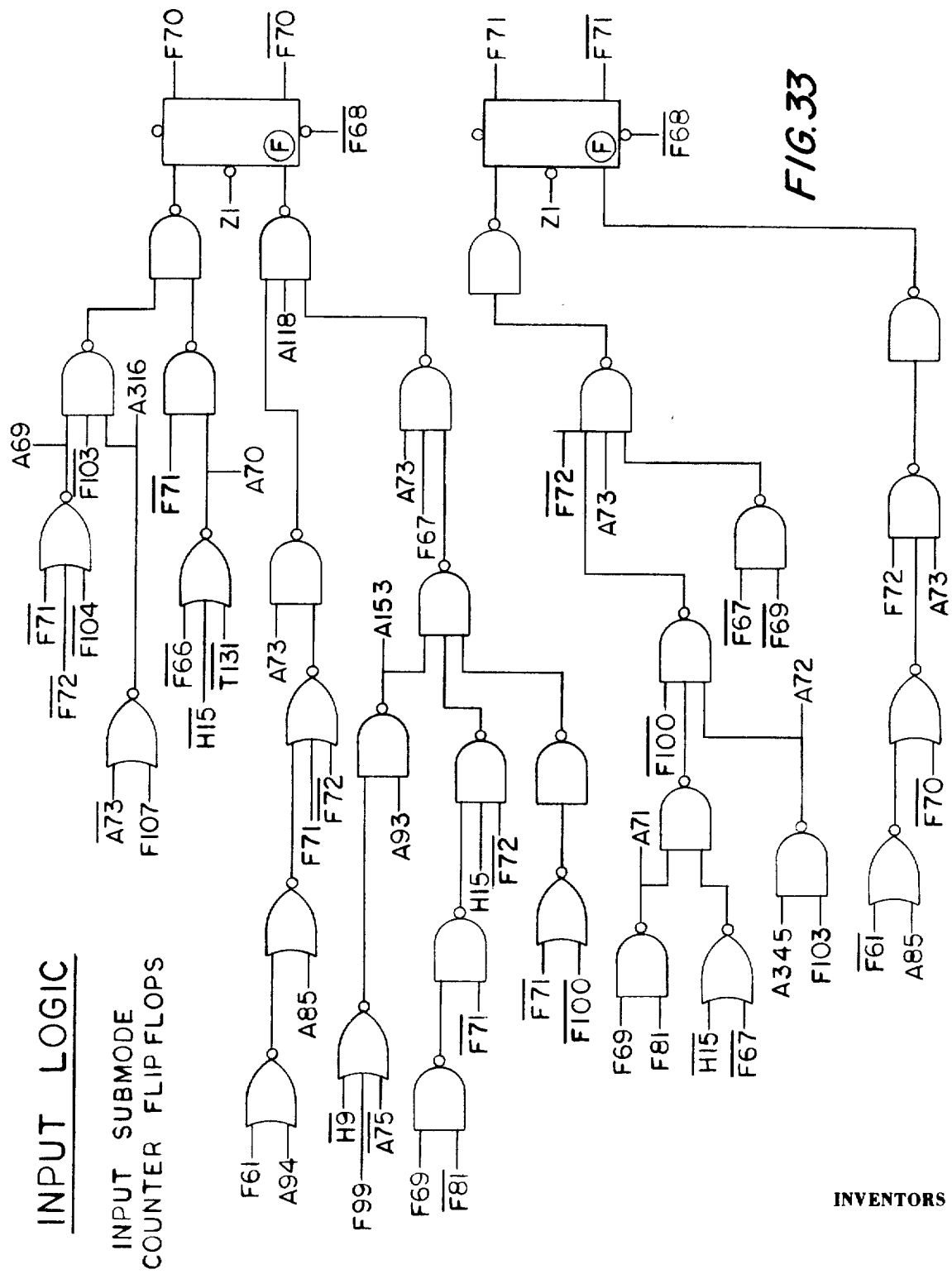

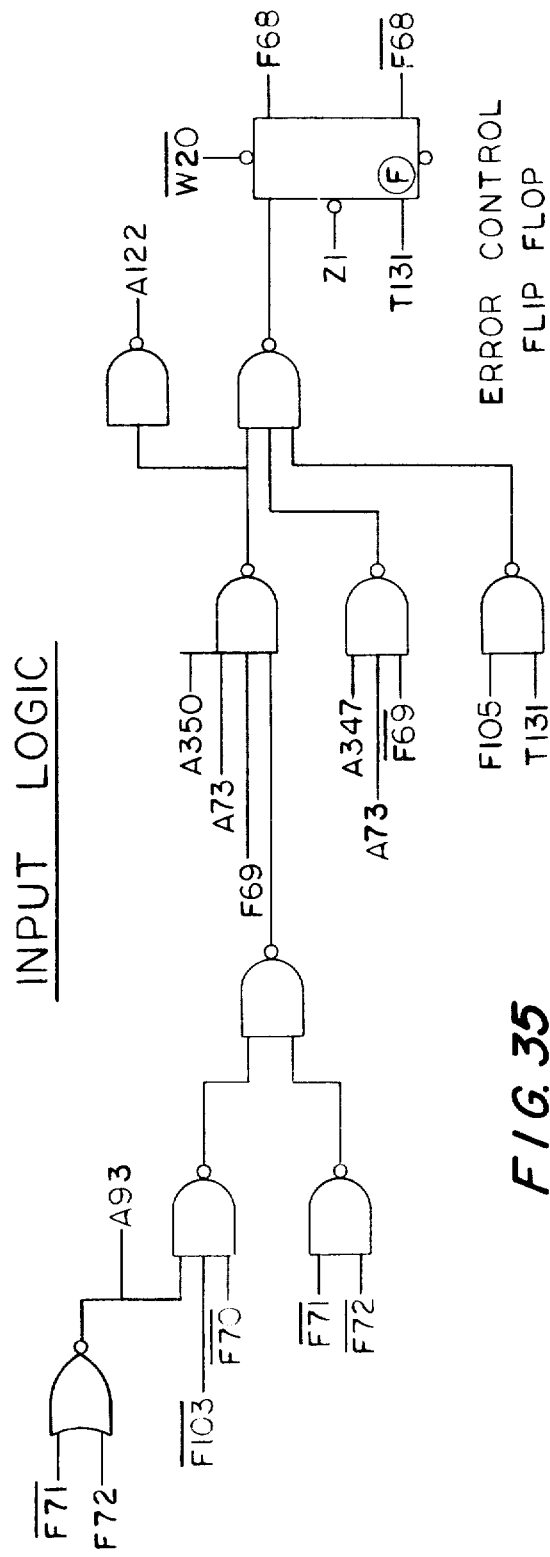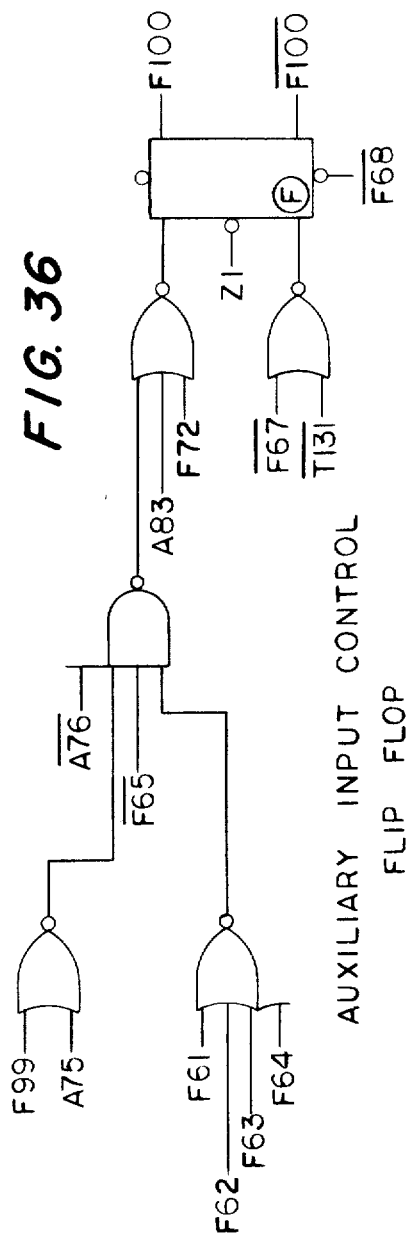

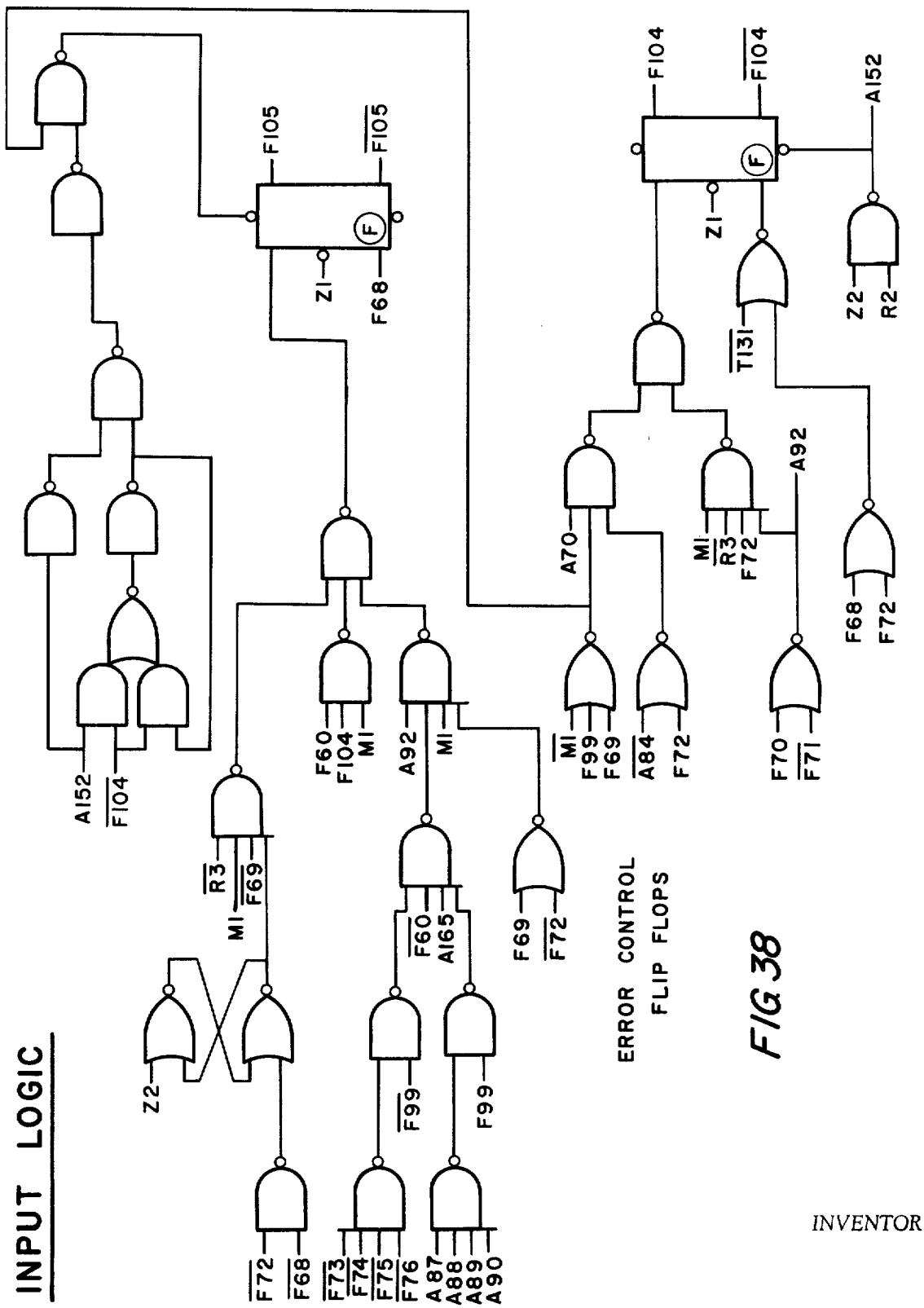

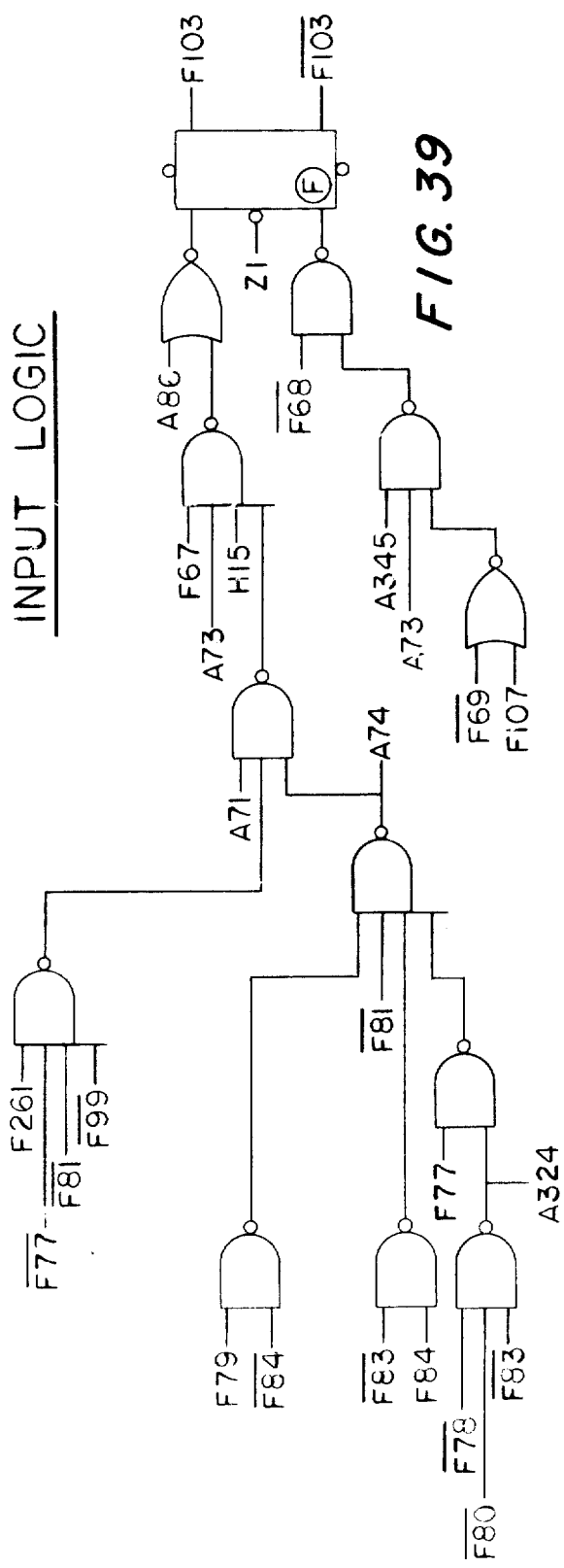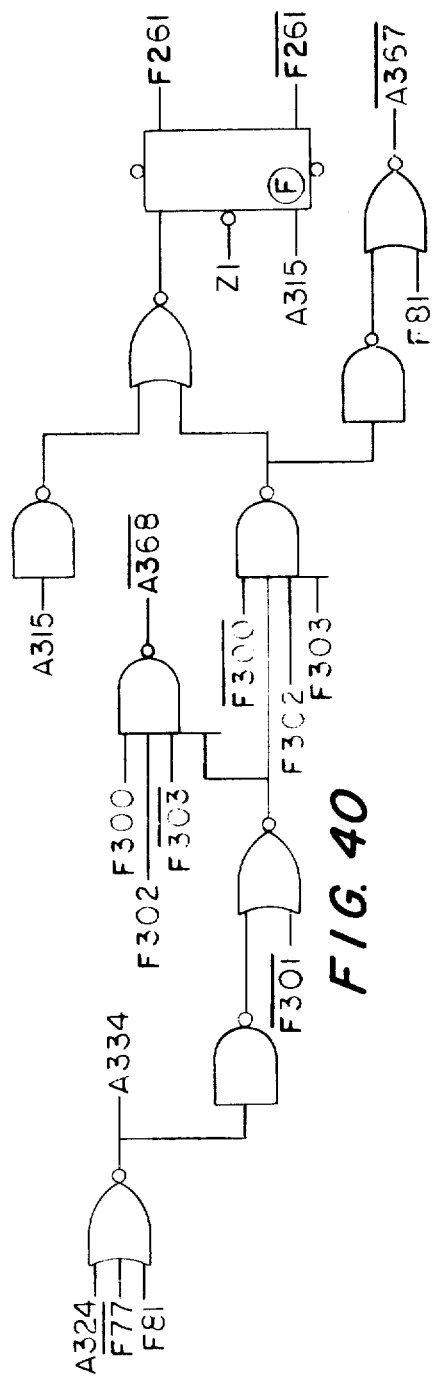

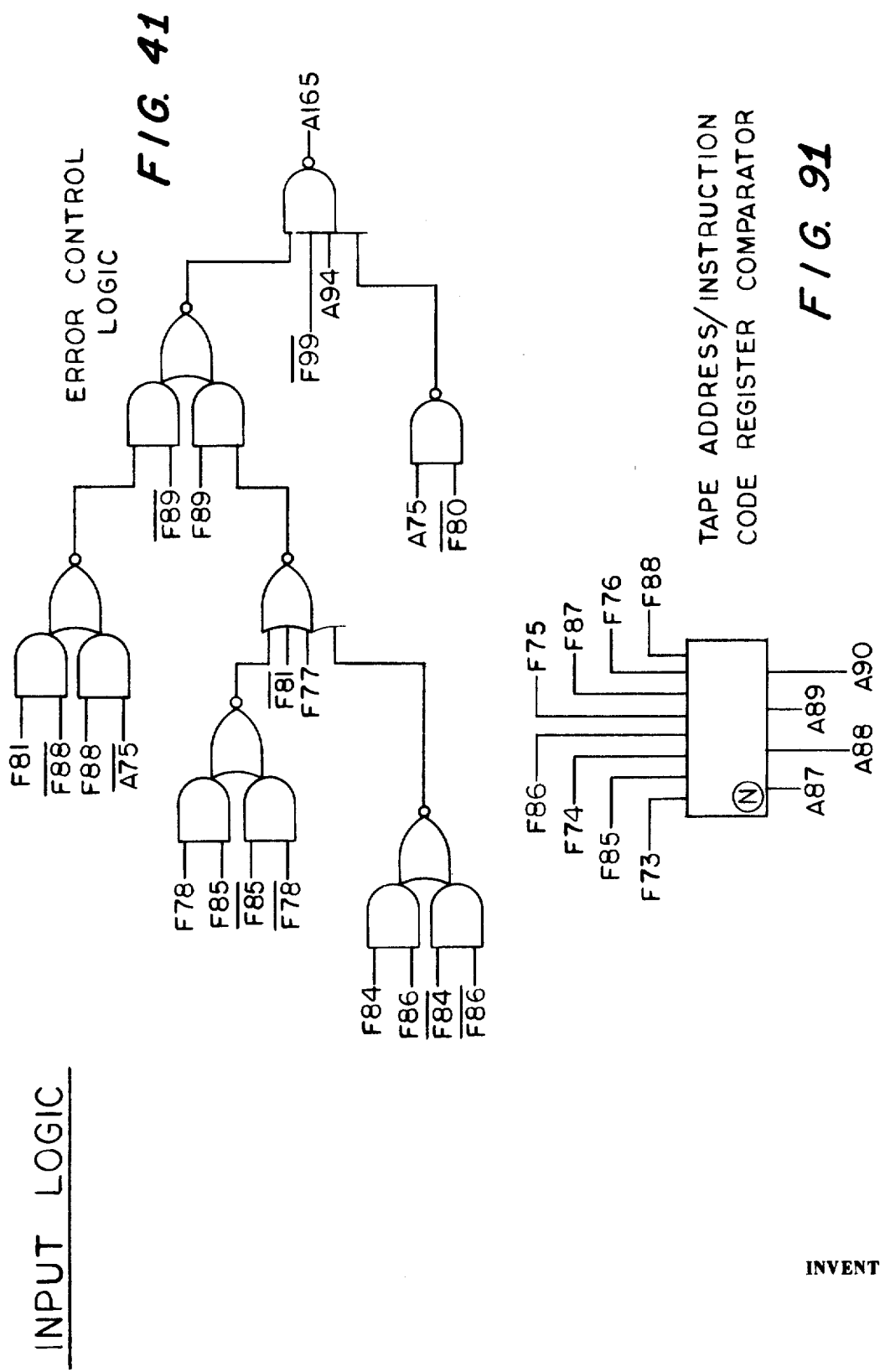

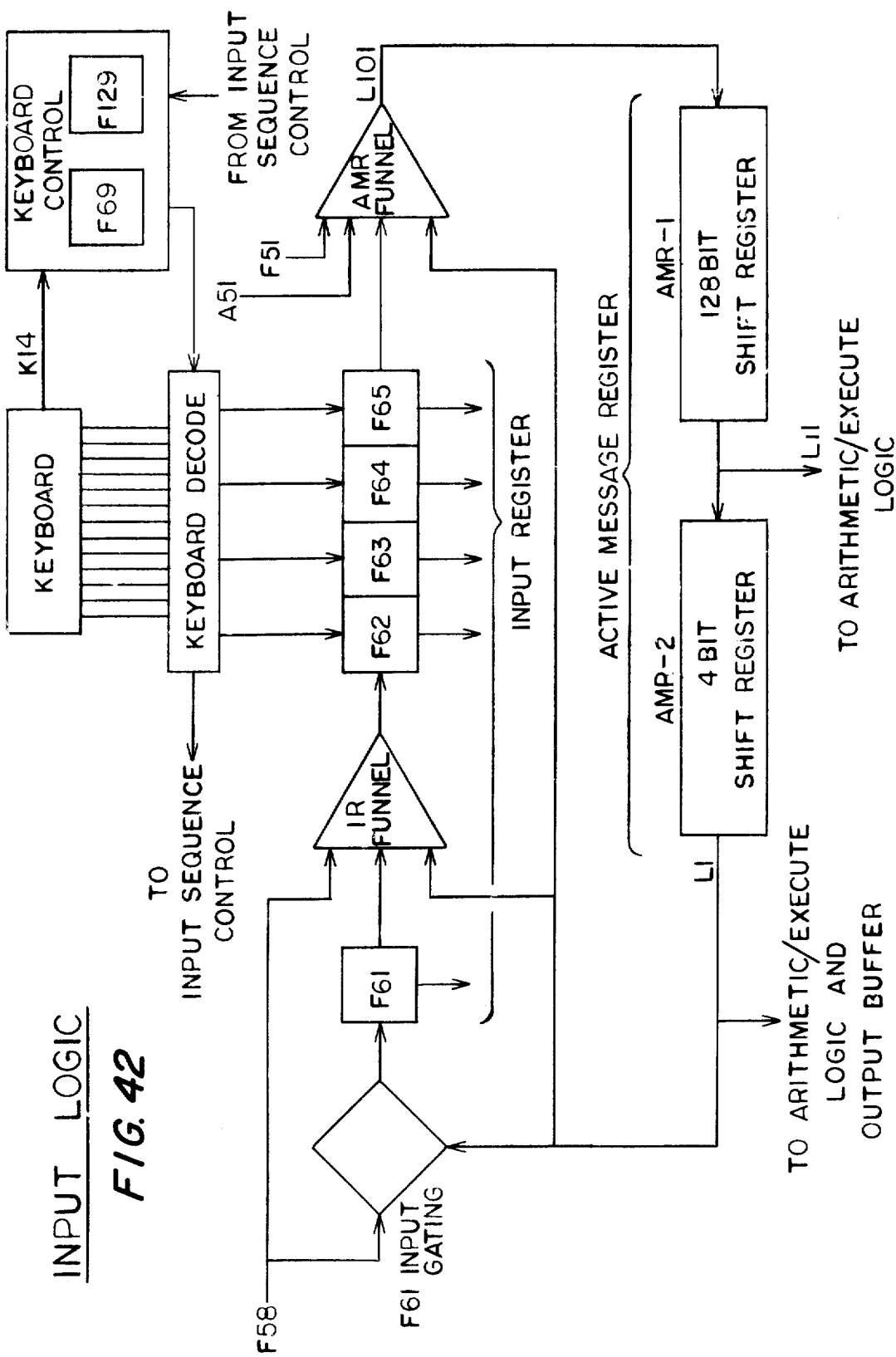

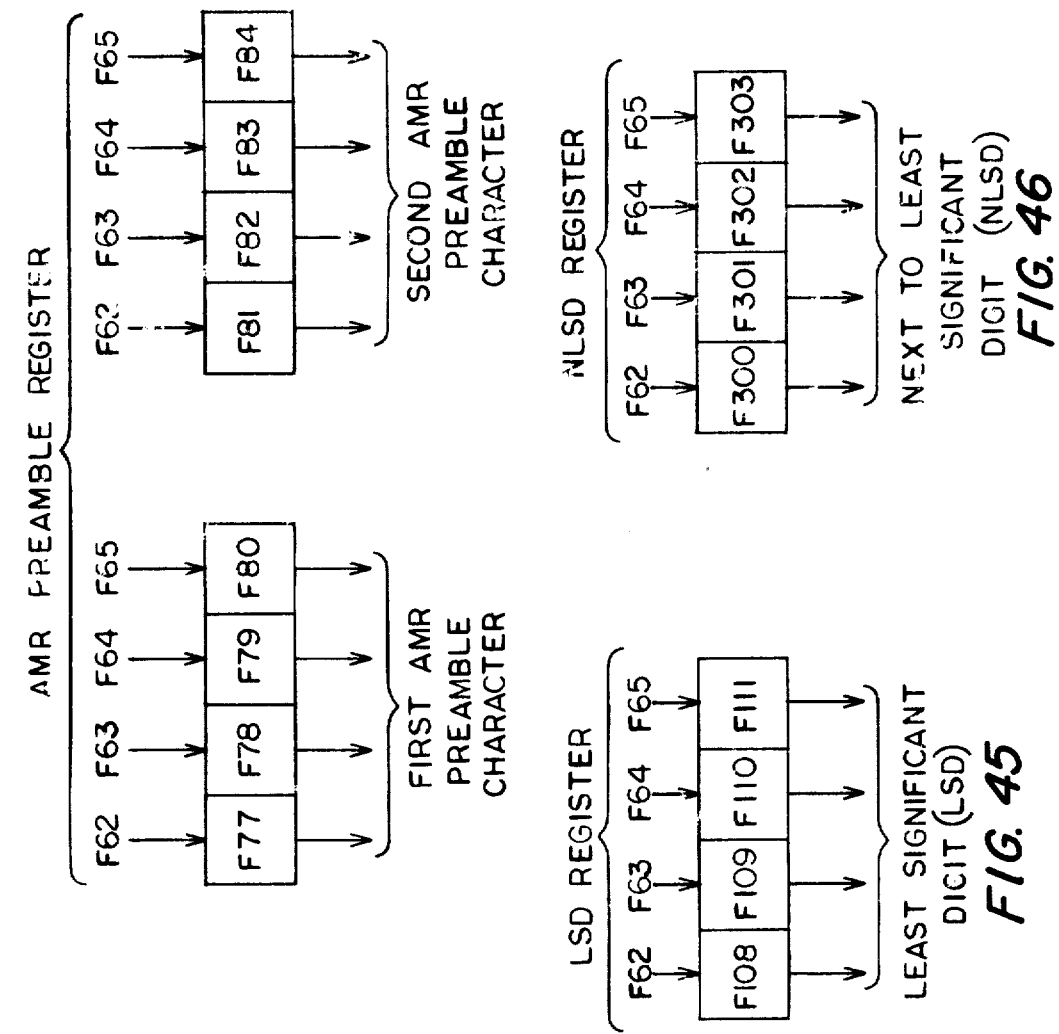

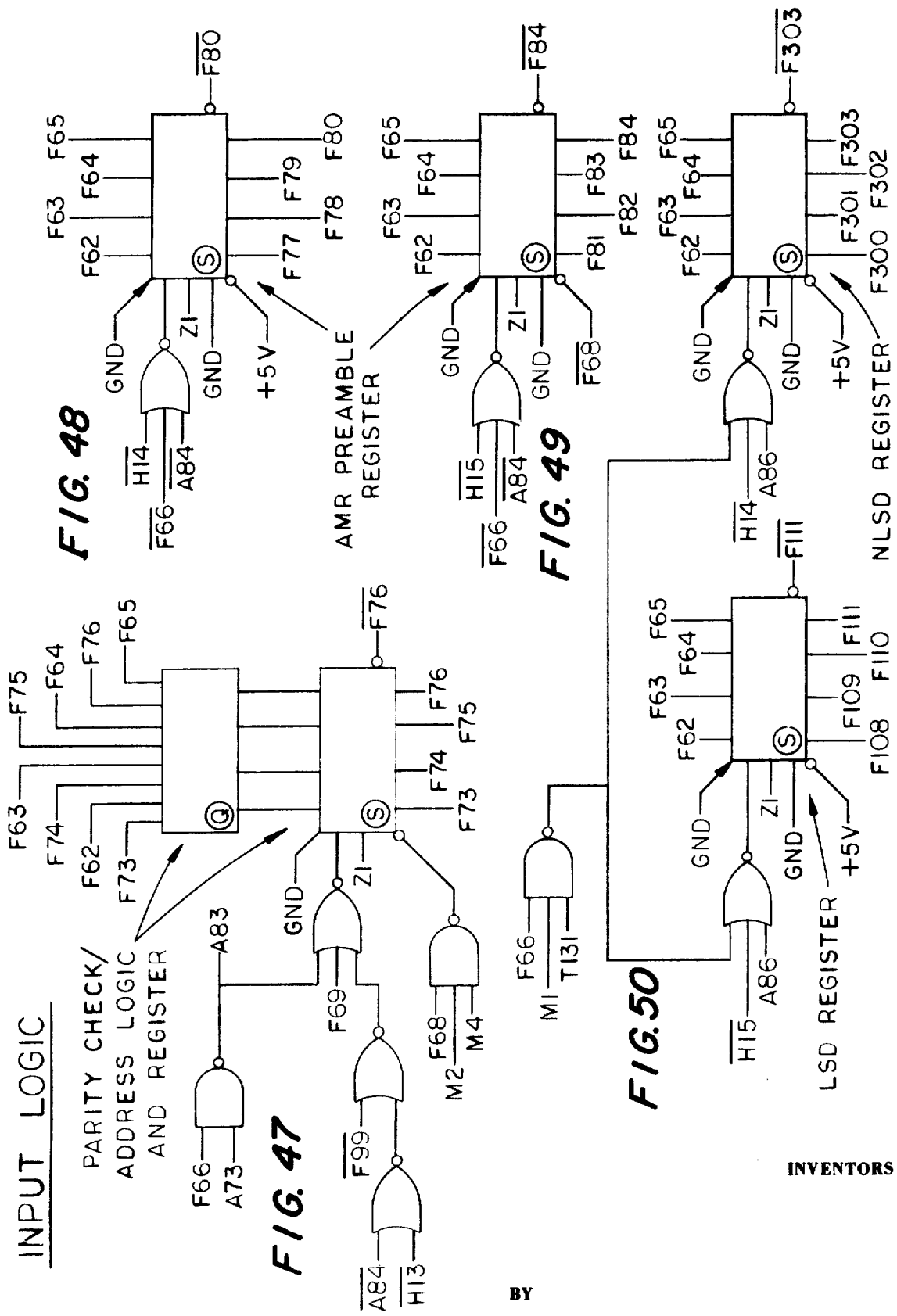

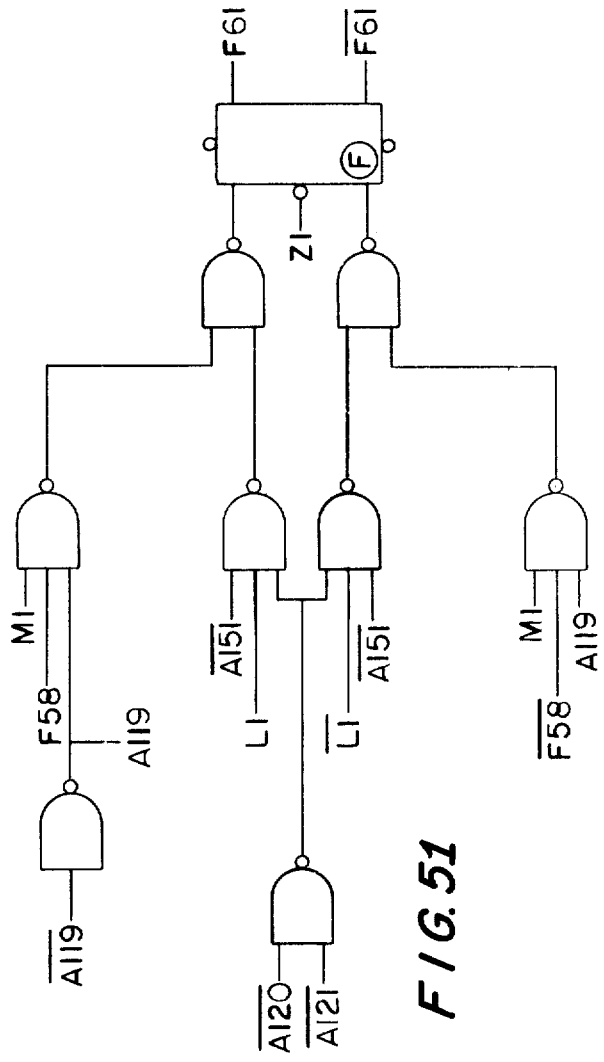

TRANSFER TO OUTPUT BUFFER

OUTPUT BUFFER EMPTY

AMR TO OUTPUT BUFFER TRANSFER CONTROL

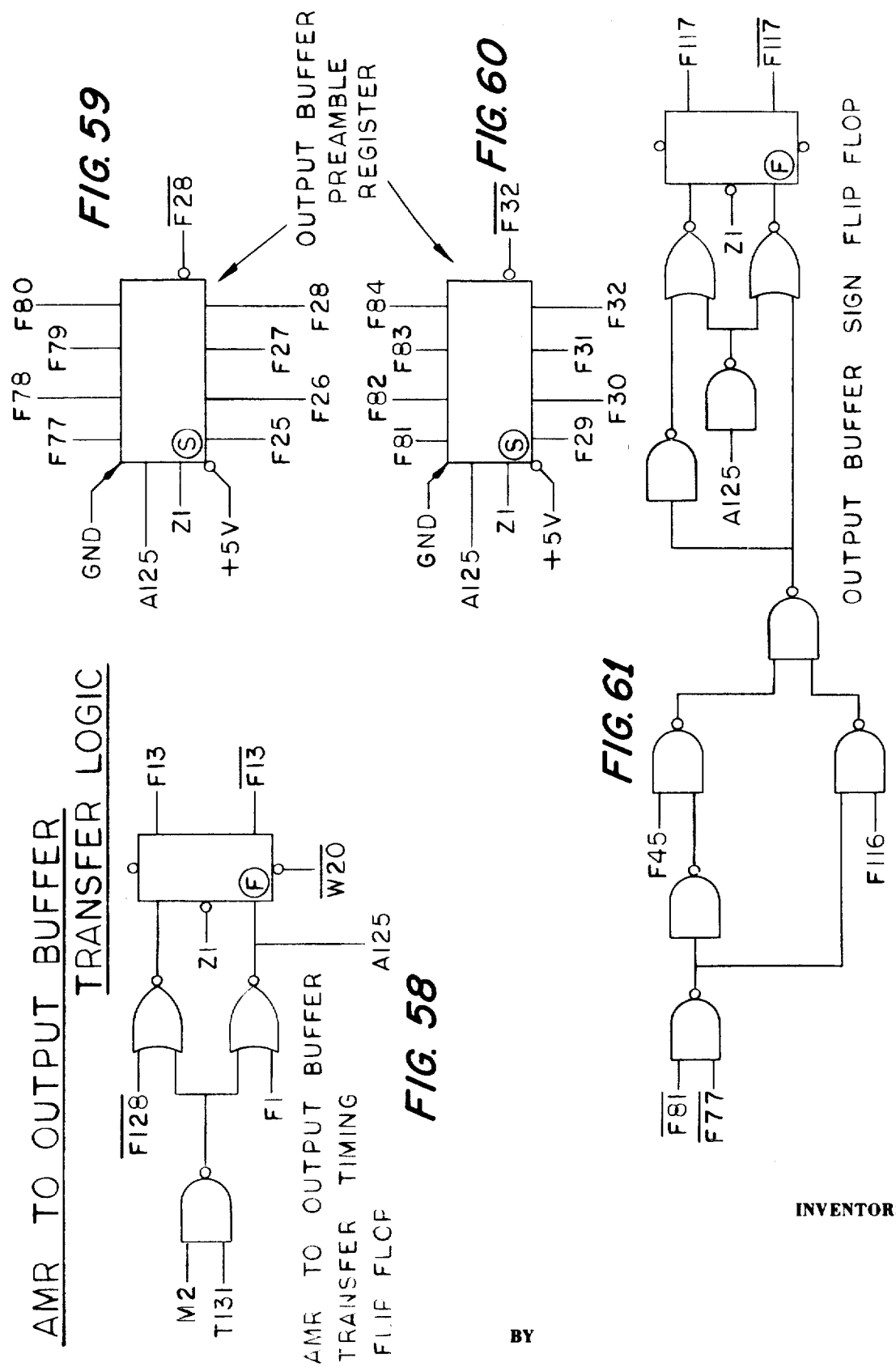

INPUT LOGIC

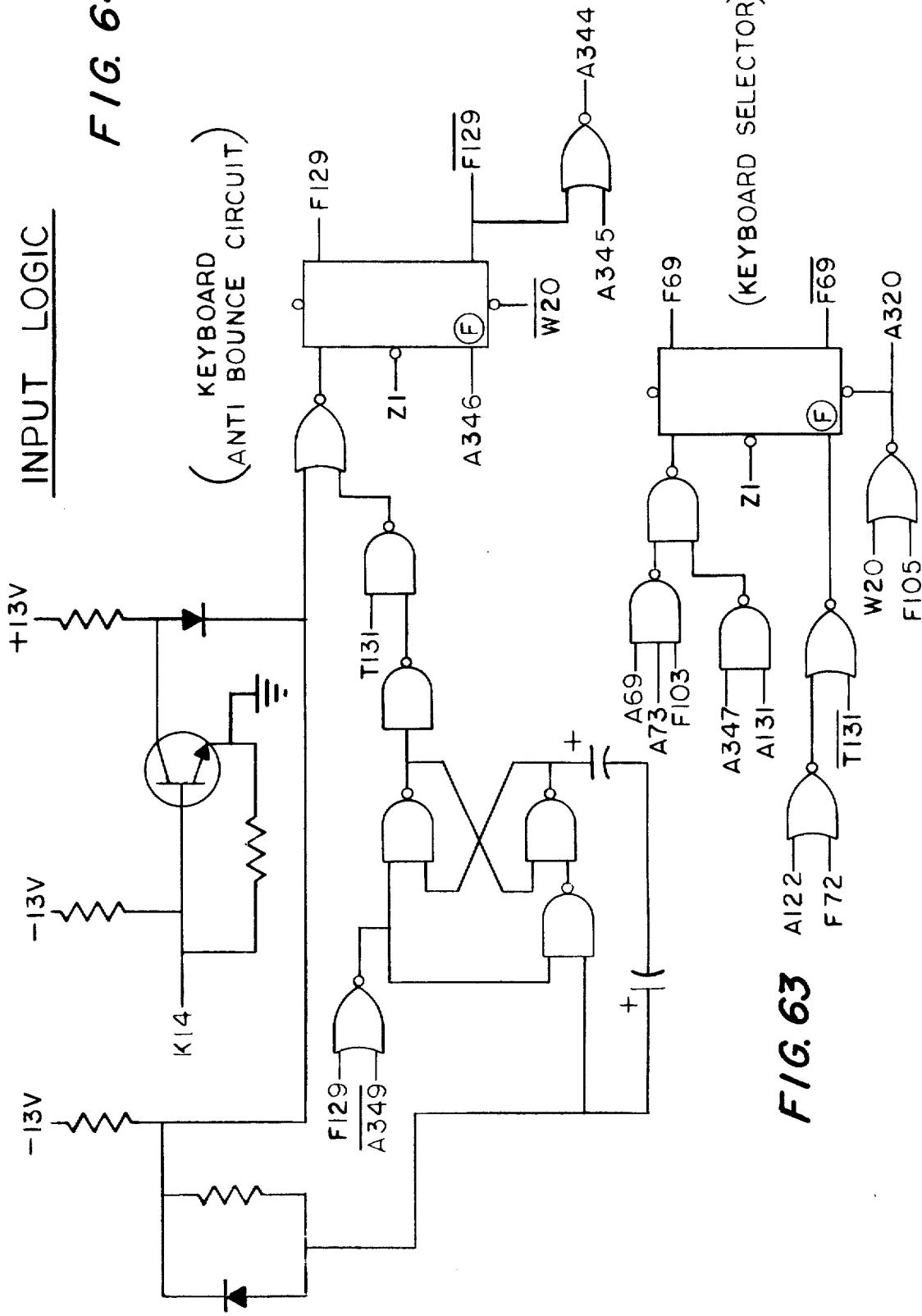

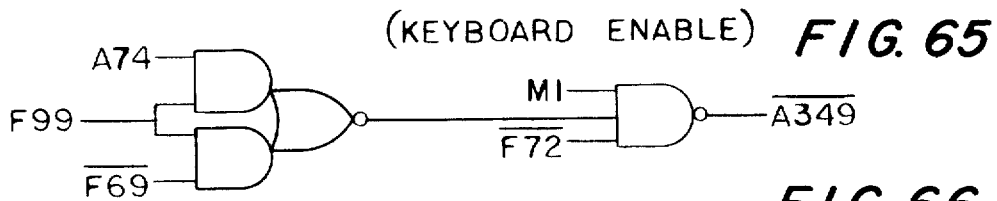
FIG. 65
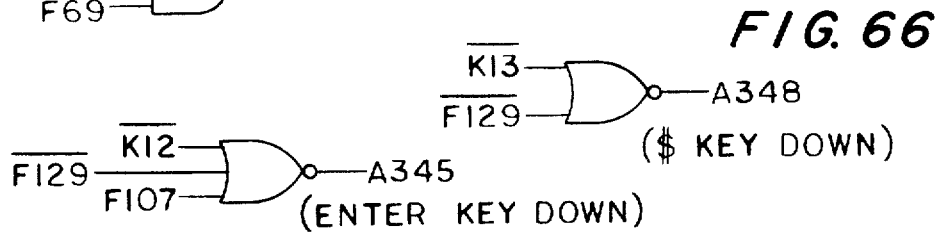
FIG. 66
FIG. 67
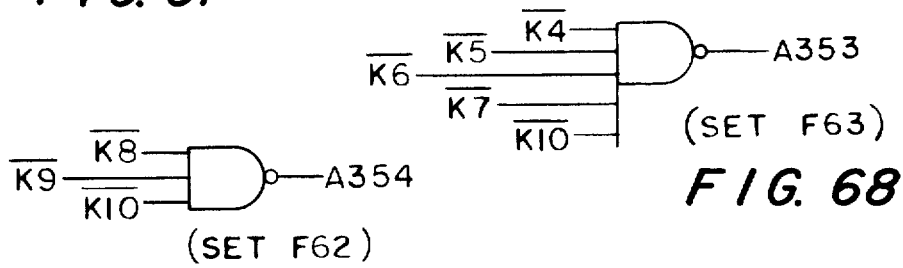
FIG. 68
FIG. 69
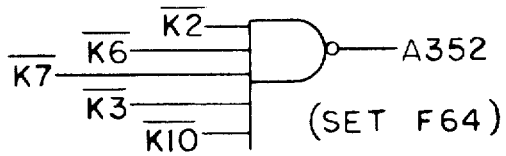
FIG. 70
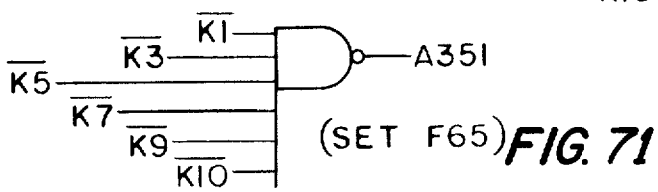
FIG. 71
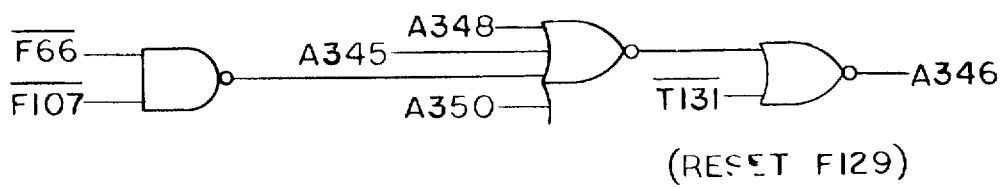
FIG. 72
INPUT LOGIC

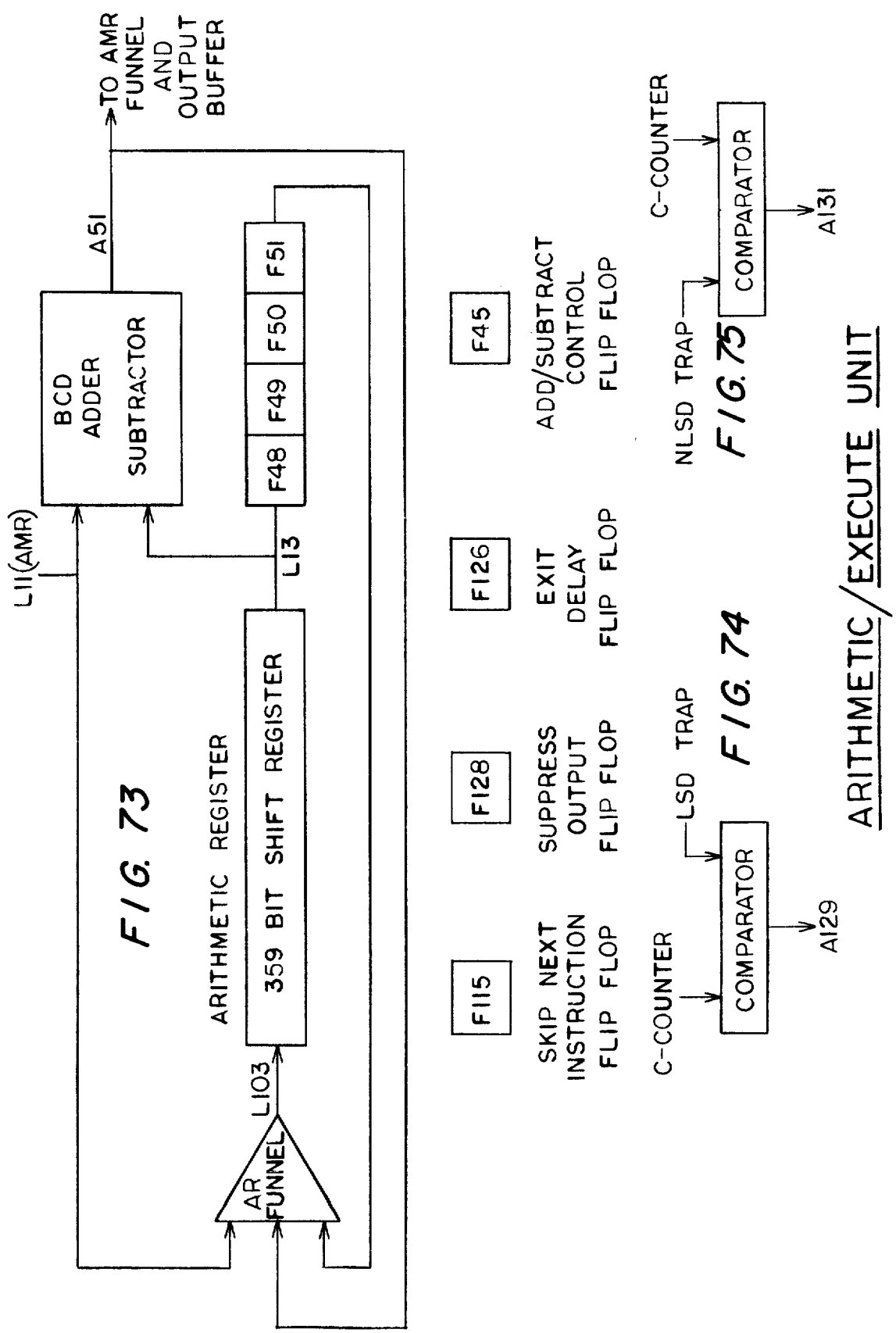

BCD ADDER/SUBTRACTOR

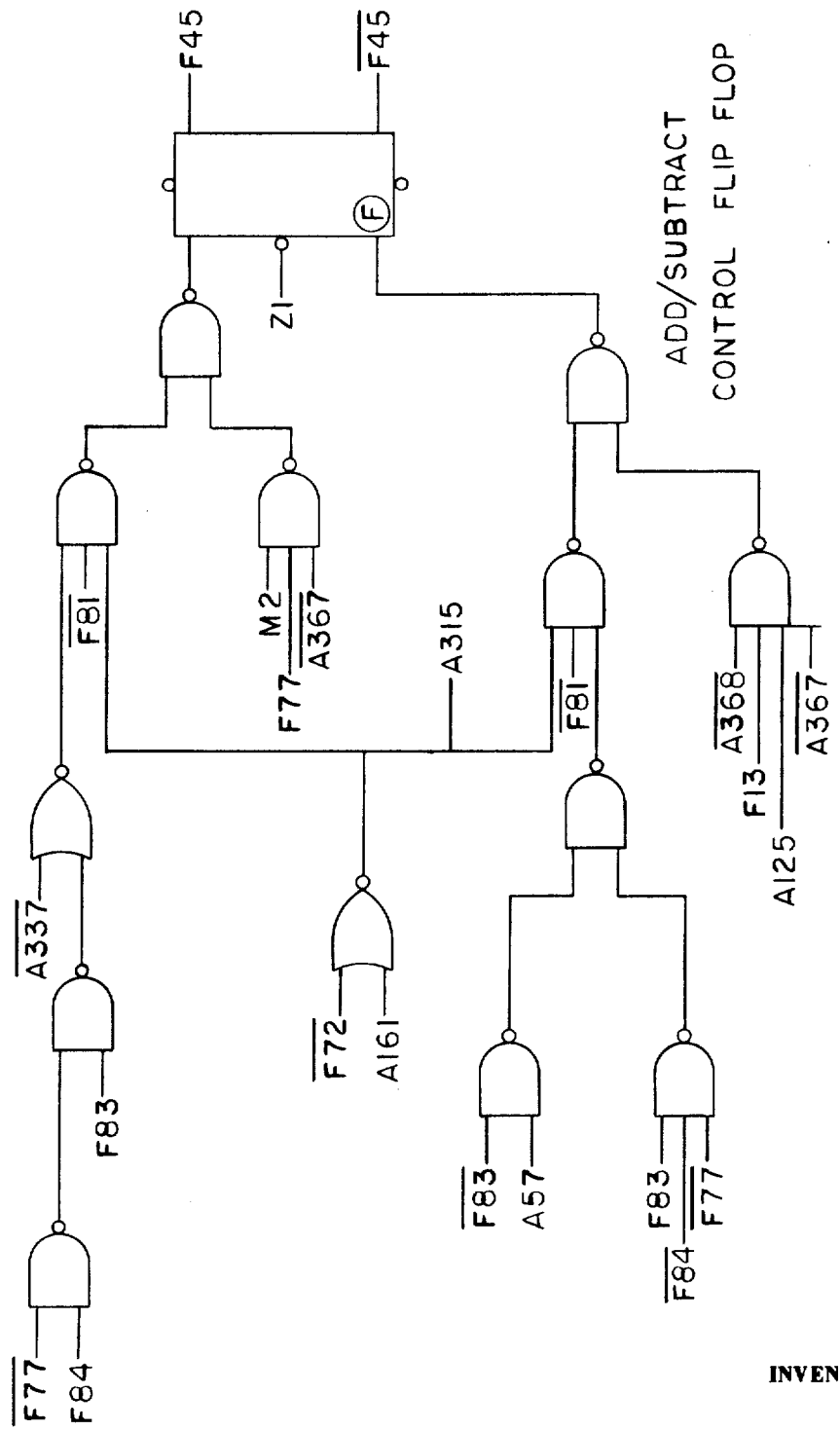
FIG. 80 ARITHMETIC/EXECUTE LOGIC

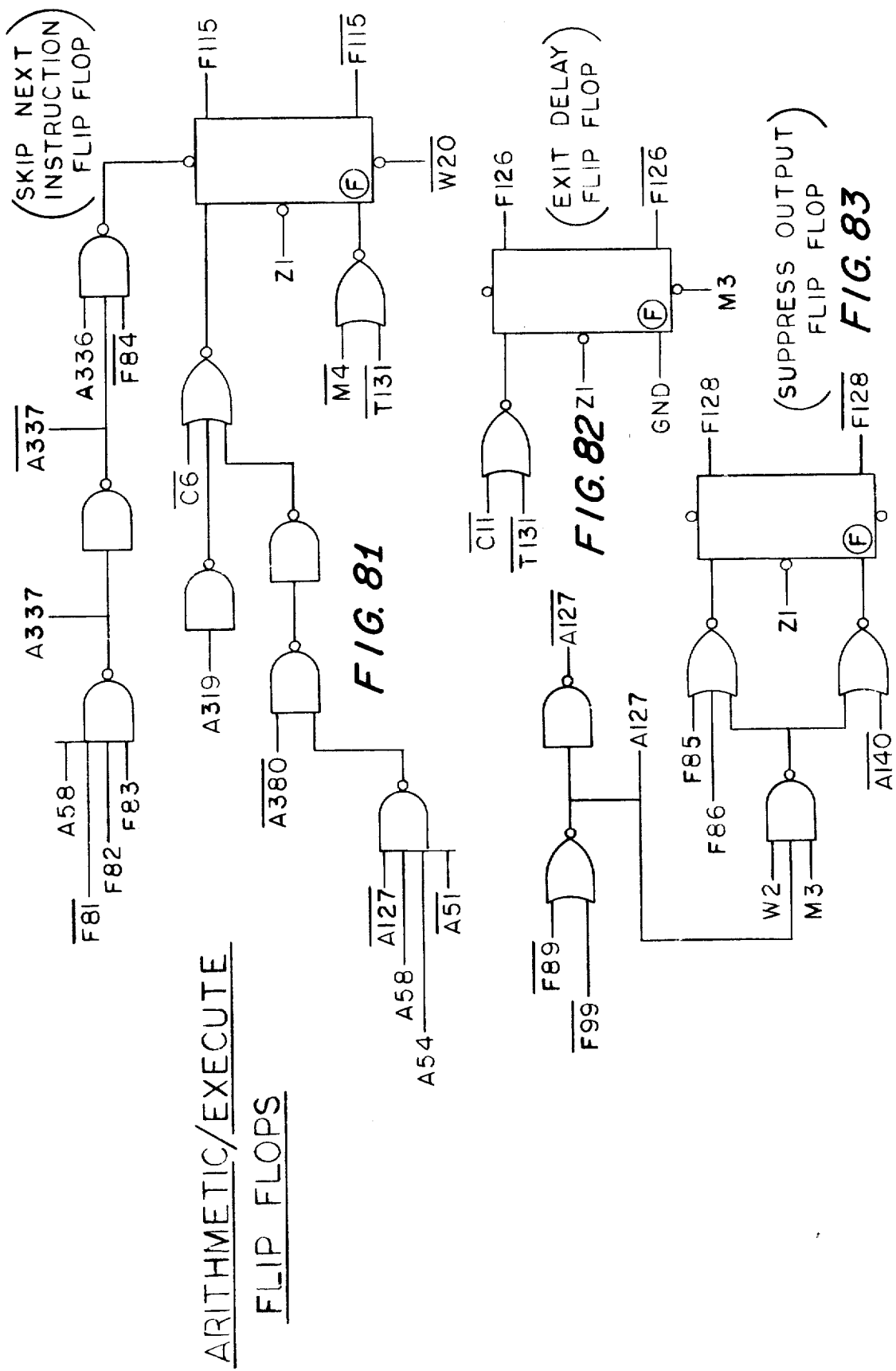

FIG. 85

MESSAGE TYPE
MERCHANDISE, SPECIAL FEES AND CREDITS

FIG. 87

\* Y IS THE ADDRESS OF THE CHARACTER IN THE NLSD TRAP

| MESSAGE TYPE | PREAMBLE |
|---|---|
| ENTER AMOUNT | 84 |
| TRANSFER AMOUNT | 85 |
| ENTER NUMERIC | 80 |
| TRANSFER NUMERIC | 81 |

INSTRUCTION MESSAGE SEQUENCER

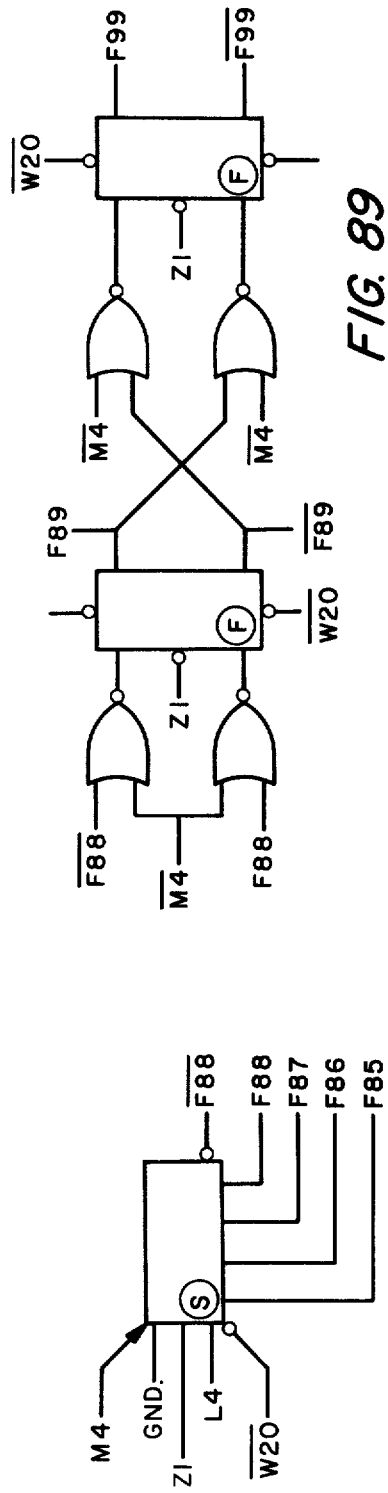
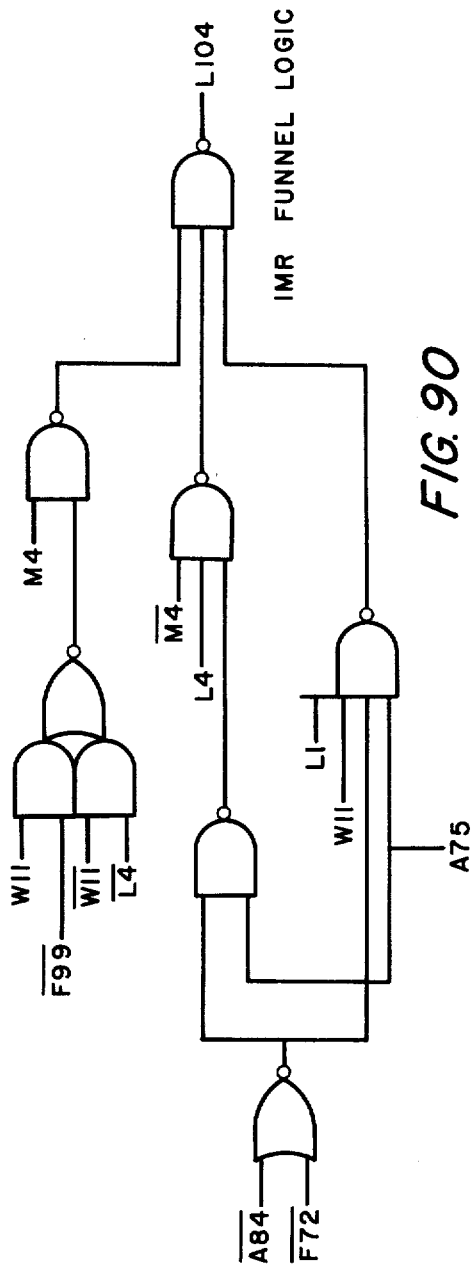

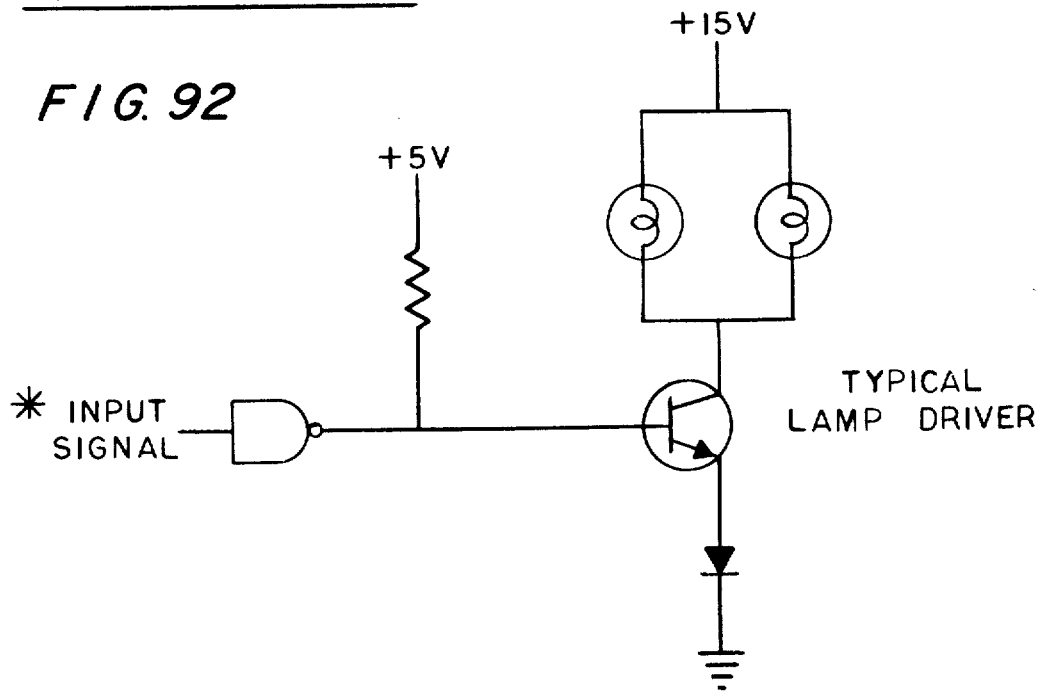

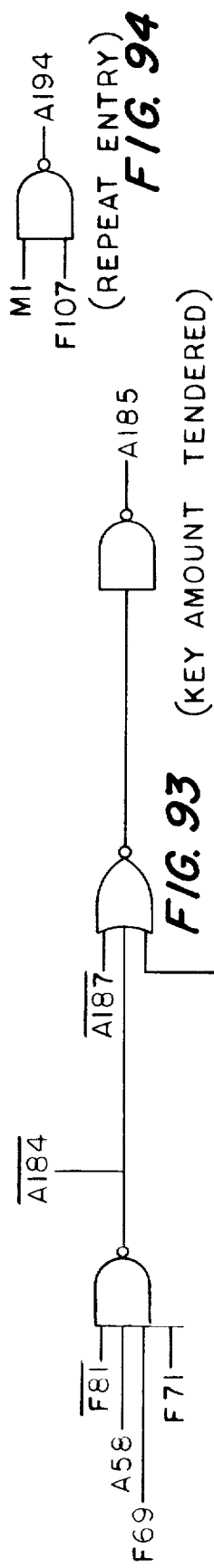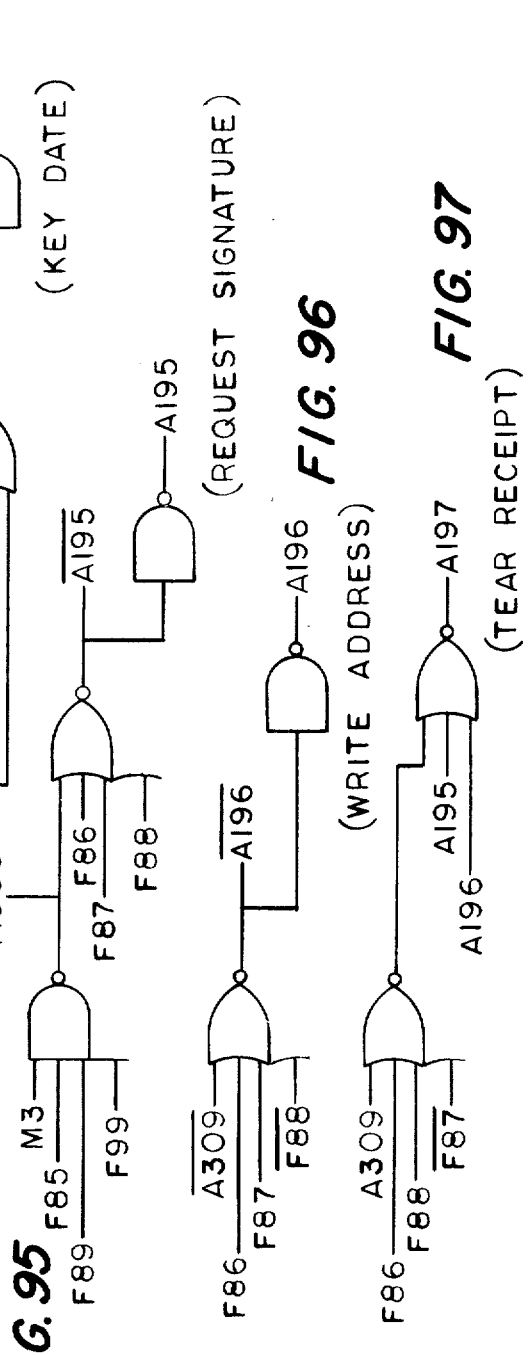
CONTROL PANEL LIGHT DRIVER LOGIC

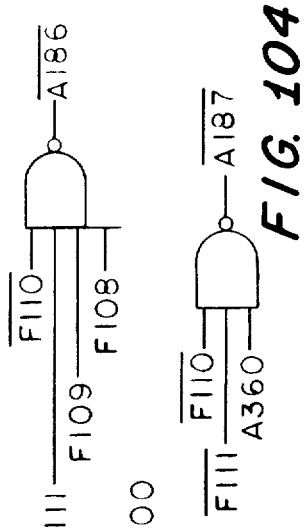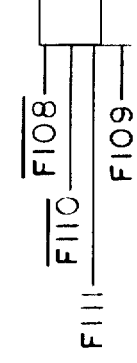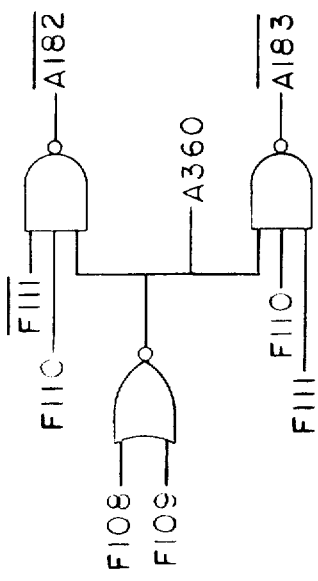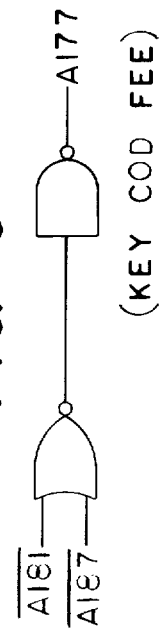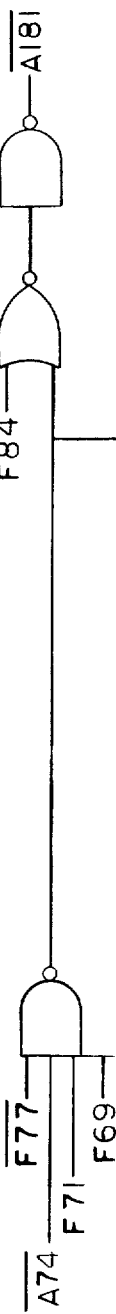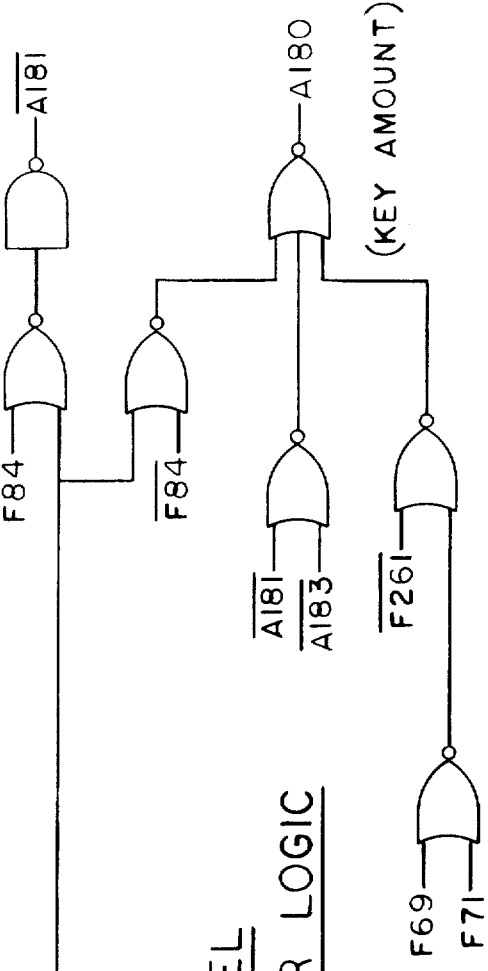

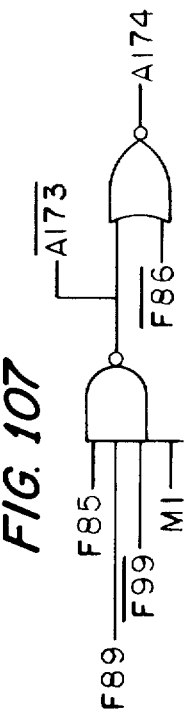
FIG. 107
(SCAN EMPLOYEE NUMBER)
FIG. 108
(SCAN AUTHORIZATION NUMBER)
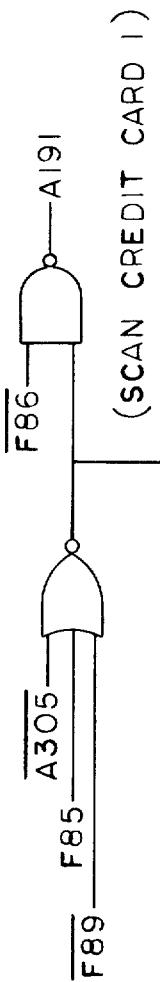
FIG. 109
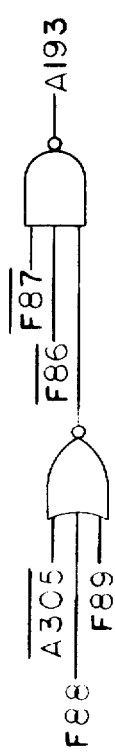
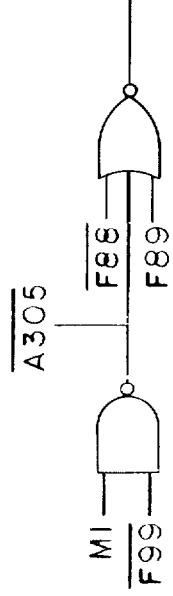
FIG. 105
(SCAN ITEMS AND SERVICES)
FIG. 106
(SCAN TRANSACTION TYPE)
CONTROL PANEL LIGHT DRIVER LOGIC

MODE CONTROL UNIT

CASH DRAWER SOLENOID AND DRIVER

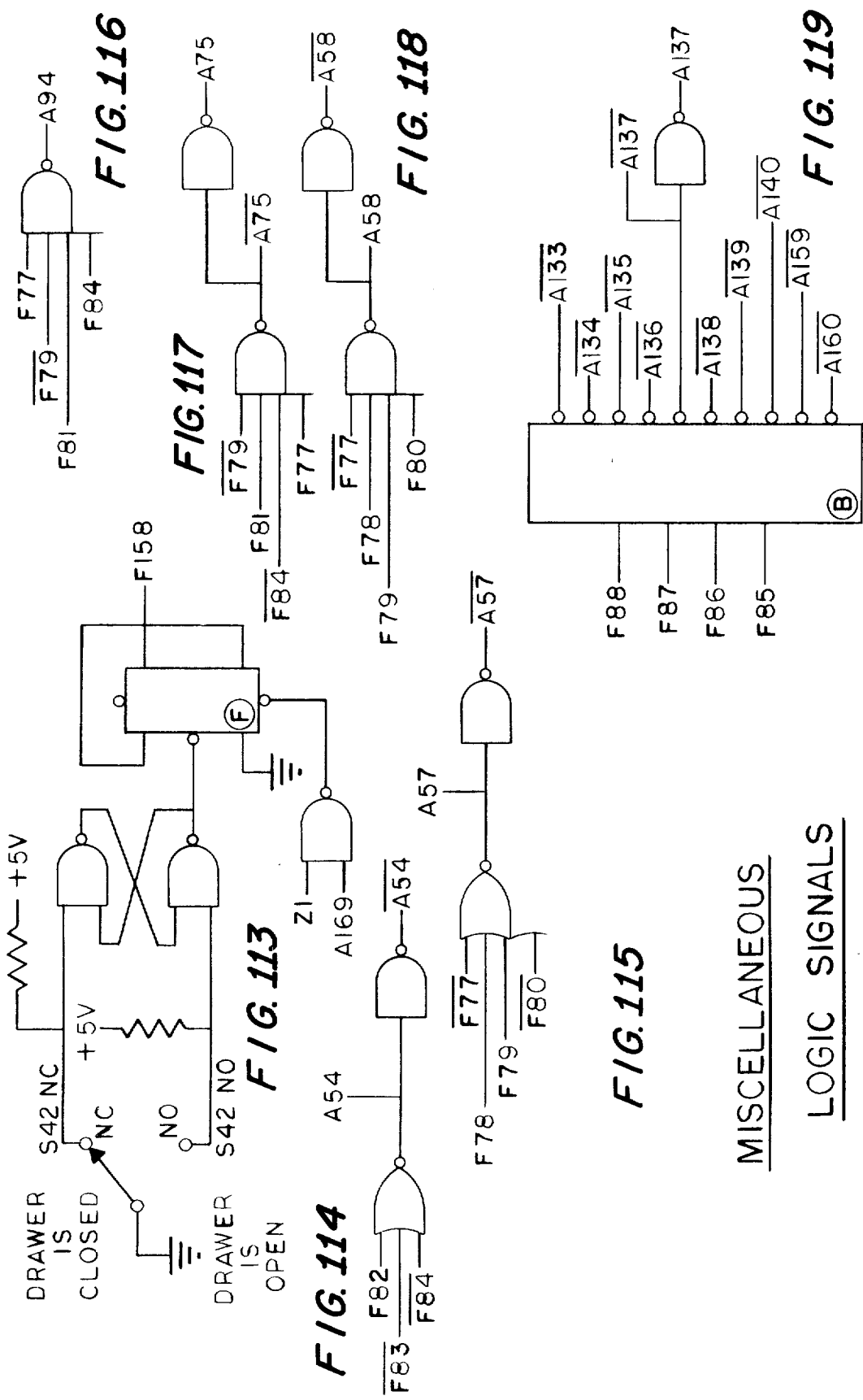

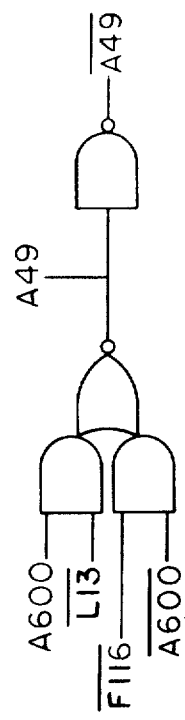
FIG.123
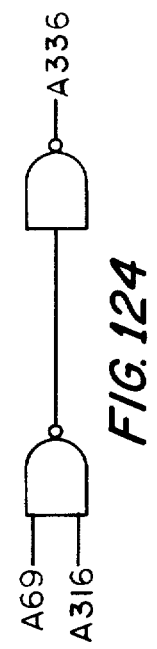
FIG.124
MISCELLANEOUS LOGIC SIGNALS
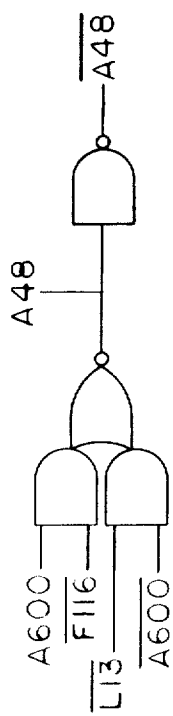
FIG.120
FIG.121
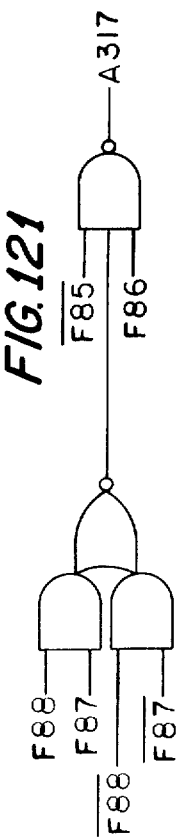
FIG.122
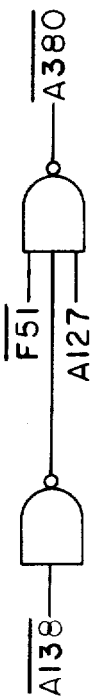
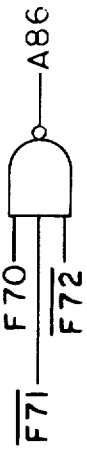
FIG.125

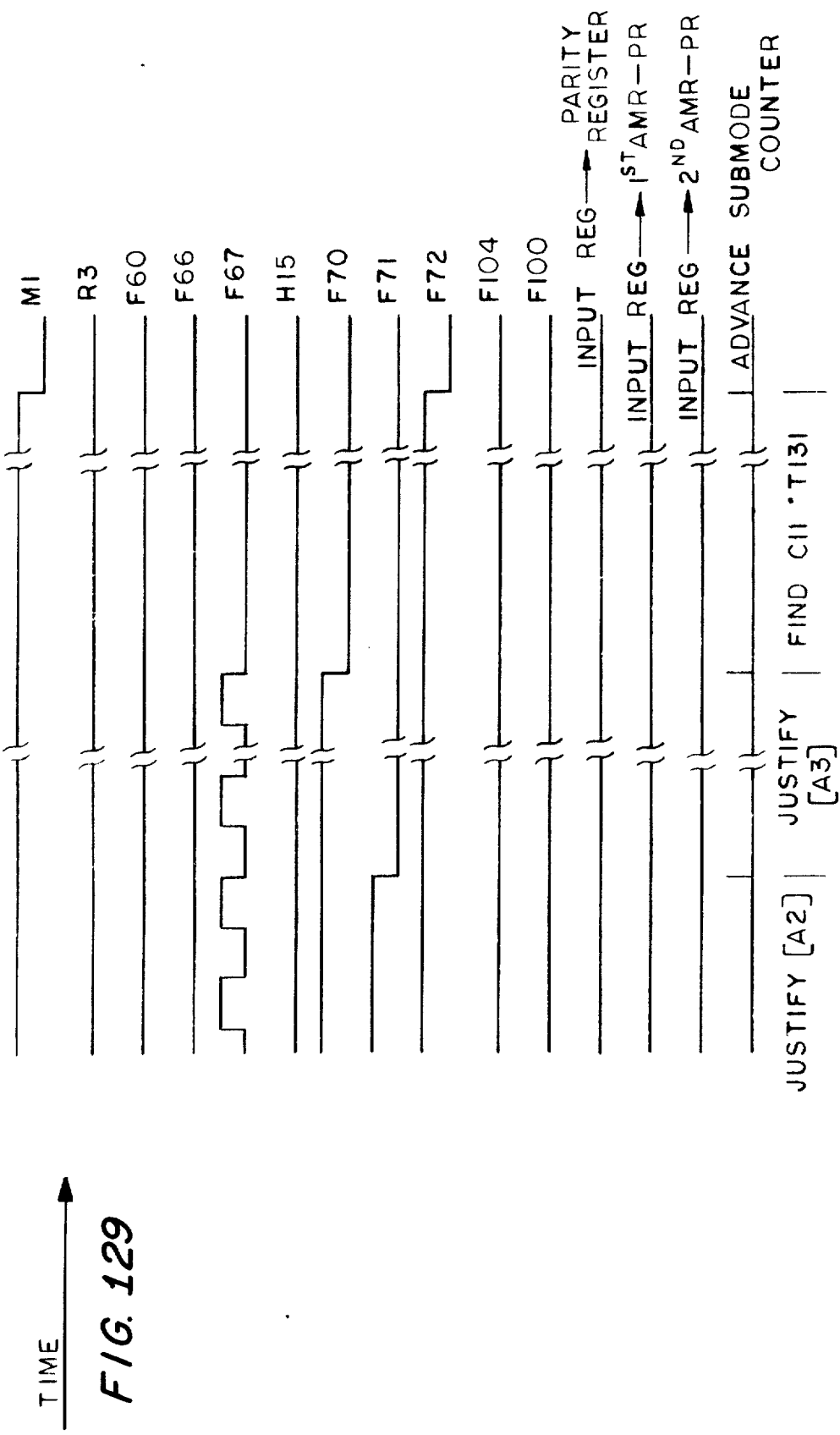

ELECTRONIC CASH REGISTER WITH DATA READING WAND

This is a continuation of application Ser. No. 102,089, filed Sept. 20, 1971, now abandoned.

BACKGROUND OF THE INVENTION

This invention relates to the art of data processing. Although the invention is especially concerned with point-of-sale devices or cash registers, the principles of the invention may also be utilized in other environments.

A conventional cash register is similar to an adding or bookkeeping machine in that it comprises an arithmetic unit, which calculates, and a control unit, which governs both the arithmetic operations and the totalizing registers affected by these operations. Such a register usually has two input keyboards, one for entry of numbers (e.g., prices) and one for entry of commands (e.g., "total"). Inside the register there are memories for numbers (e.g., totals) and programs. The operator enters data and selects program steps manually by depressing keys.

It has been proposed in connection with data processors, such as cash registers, to provide data entry by means of readers, such as hand-held scanners or wands which read optically or magnetically recorded data. Programs are stored within the data processor, and keys are depressed to supply addresses from which stored sub-routines can be called. The keying of addresses is time consuming and requires prodigious operator memory or constant reference to a list of addresses. Moreover, the machine must include expensive internal storage for all of the sub-routines. It would of course be possible to program a general purpose digital computer to perform transaction routines for point-of-sale devices, but this would be expensive and impractical. Moreover, it would still be necessary to find a practical scheme for providing the computer with all of the data necessary to the transaction and to inform the computer of the nature of the data provided.

BRIEF DESCRIPTION OF THE INVENTION

It is accordingly a principal object of the present invention to provide improved apparatus and methods for data processing, especially with respect to point-of-sale devices or cash registers.

A further object of the invention is to provide for the control of data processing equipment, such as a cash register, by means of external message strips, which may be scanned by a hand-held reader or wand.

Another object of the invention is to provide a point-of-sale device or the like which does not require a keyboard.

A further object of the invention is to provide a point-of-sale device or the like which reads tags and other media, checks the accuracy of the data, performs computations, instructs and controls sales personnel, prints sales checks, and sends data to a remote processor.

Another object of the invention is to provide an improved point-of-sale device or the like in which operation of the device in whole or in part may be restricted to one or more classes of authorized operators.

A futher object of the invention is to provide an improved point-of-sale device or the like which is self-contained, free-standing, and which does not require the cooperation of a remote computer.

Yet another object of the invention is to provide improved apparatus of the foregoing type having exceptional speed, accuracy, simplicity, economy, and versatility.

An additional object of the invention is to provide improved message strips and methods of utilizing the same in the control of data processing equipment.

Briefly stated, a preferred form of cash register in accordance with the invention employs a hand-held reader or wand for the entry of external data from merchandise tags, employee badges, credit cards, and from other scannable message strips, which may be provided on the control panel. These strips all contain control data and commonly contain descriptive and/or quantitative data too. An auxiliary keyboard may be provided to handle the entry of certain variable data, such as the date or the price of a marked down item, but the provision of the keyboard is not necessary. Inexpensive (tape-loop) internal memory is preferably provided for the storage of relatively non-variable data, such as headings or sub-routines which are common to most transactions. By virtue of the control data contained in the message strips, the programming of a complete transaction can be controlled by the message strips themselves, in conjunction with their counterparts in internal memory. Each message identifies itself and tells the hardware what to do with it. Error-checking, computing, printing, and output transmitting are performed automatically. Because of the ease of varying the message inputs, programs may be modified with great facility and economy.

BRIEF DESCRIPTION OF THE DRAWINGS

The invention will be further described in conjunction with the accompanying drawings, which illustrate preferred and exemplary embodiments, and wherein:

FIG. 2 is a plan view of a typical control panel, illustrating scannable message strips and illuminable indicia;

FIGS. 5A – 5E and FIGS. 6A – 6C are a key to logic symbols employed in the drawing;

FIG. 14 is a logic diagram of master timing decoders;

FIG. 15 is a logic diagram of a C-counter circuit employed in the master timing system;

FIG. 16 is a logic diagram of the C-counter decoder circuit;

FIGS. 17 and 18 are logic diagrams of comparators associated with the C-counter and employed for addressing arithmetic registers;

FIG. 19 is a block diagram illustrating certain input logic;

FIG. 23 is a timing diagram illustrating bit synchronization;

FIG. 25 is a block diagram of an auxiliary input control;

FIG. 26 is a logic diagram of a portion of the system associated with the execute unit;

FIGS. 27 – 41 are logic diagrams supplementing the block diagrams of FIGS. 24 and 25;

FIGS. 42 – 46 are block diagrams illustrating further input portions of the system;

FIGS. 47 – 53 are logic diagrams supplementing the block diagrams of FIGS. 42 – 46;

FIGS. 56 – 61 are logic diagrams supplementing the block diagrams of FIGS. 54 and 55;

FIG. 63 is a logic diagram concerned with the same portion;

FIG. 64 is a logic-schematic diagram concerned with that portion;

FIGS. 65 – 72 are further logic diagrams concerned with the same portion;

FIGS. 73 – 76 are block diagrams concerned with the execute (arithmetic) unit;

FIGS. 77 – 83 are logic diagrams supplementing those block diagrams;

Figure 85:
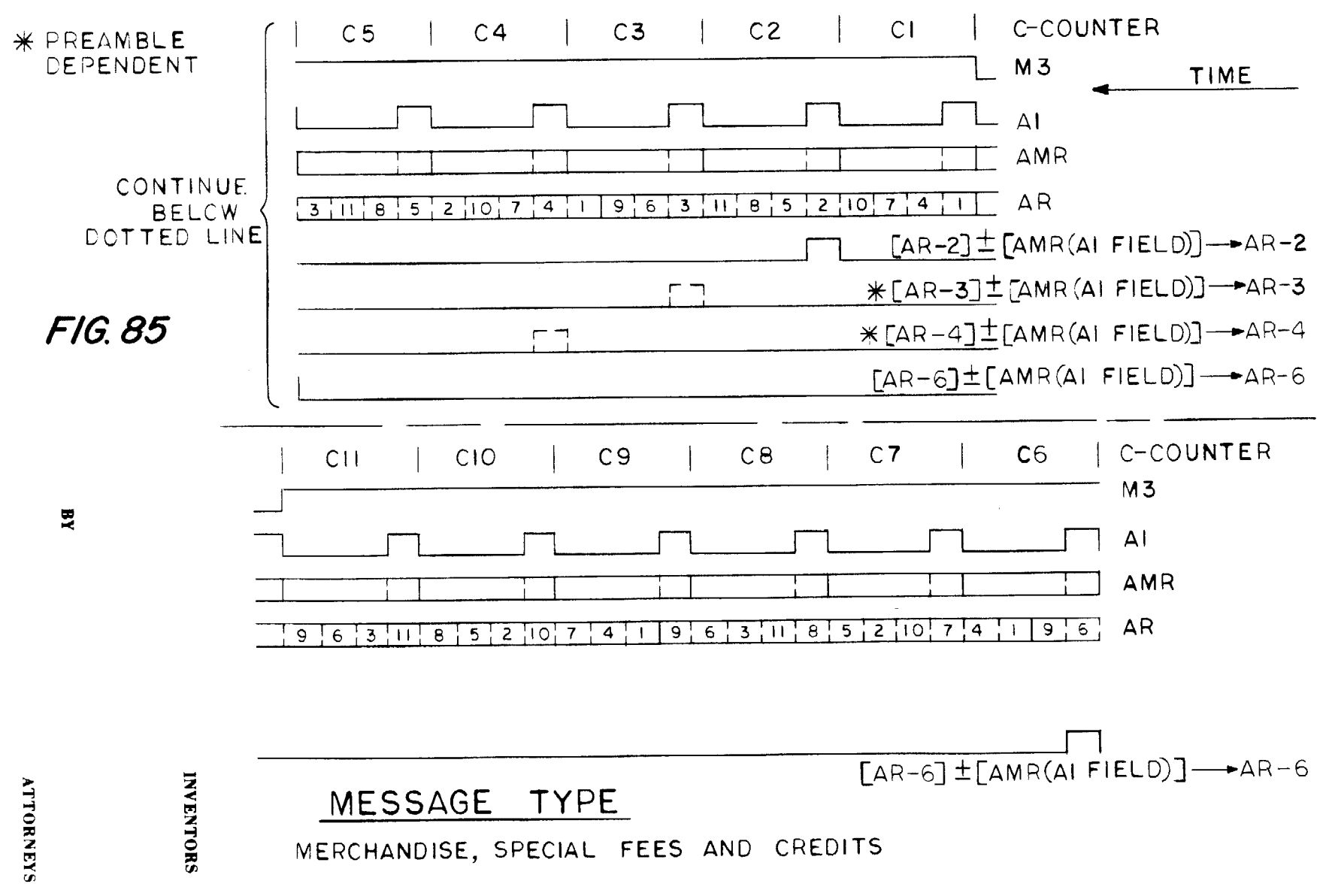

FIGS. 84 – 87 are timing diagrams illustrating certain operations of the execute unit;

FIGS. 89 – 91 are logic diagrams supplementing the block diagram of FIG. 88;

FIG. 92 is a logic-schematic diagram of the lamp driver;

FIGS. 93 – 109 are logic diagrams concerned with the control panel lamp driver;

FIGS. 113 – 125 are logic diagrams concerned with the generation of miscellaneous logic signals employed in the system; and FIGS. 126 – 129 are timing diagrams showing the relationship of various signals during an input sequence for a merchandise message read by the wand.

DETAILED DESCRIPTION OF THE INVENTION

Figure 1:
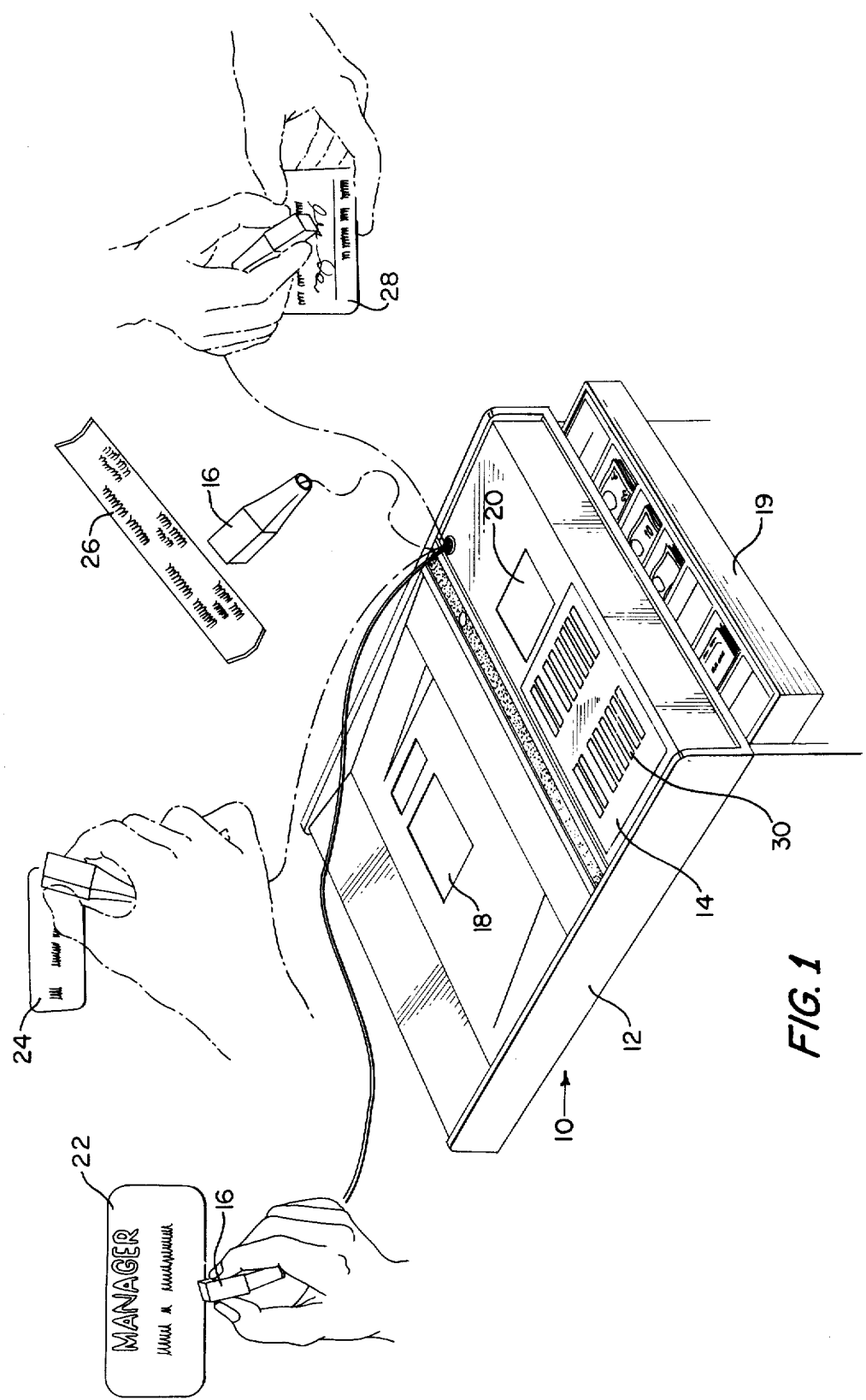
FIG. 1 is a perspective, somewhat diagrammatic view illustrating the utilization of a cash register of the invention in a transaction involving the reading of a manager's badge, an employee's badge, merchandise tags, a customer's credit card, and control panel message strips.

Referring to the drawings, and initially to FIG. 1 thereof, a cash register 10 of the invention may comprise a low-profile case 12 having a control panel 14, a data-reading wand 16, and an aperture at which the printed sales check 18 is exposed. An auxiliary keyboard may be provided beneath a sliding panel 20, and a conventional cash drawer 19 may be housed within the case 12 so as to extend from the case when released. Also illustrated in FIG. 1 are external data media, including a manager's badge 22, a clerk's badge 24, a merchandise tag 26, a credit card 28, and control panel strips 30, all of which constitute or incorporate pre-recorded memory elements. The memory elements are in the form of message strips, recorded magnetically, for example, which may be manually scanned by the wand 16 for the entry of data into the cash register. They are affixed, as by adhesive, to articles of merchandise or their wrappings and to the various badges and the control panel. As shown, the merchandise tags may be arrow-shaped to designate the desired direction of scan. Scanning direction may also be specified on the other message strips as well.

FIG. 2 shows a typical control panel carrying typical message strips 30. The legends to the left of the message strips are illuminated by underlying panel indicator lamps when the system calls for or permits entry of the associated messages. The legends at the center of the control panel are illuminated by underlying indicator lamps when the system requires or permits the operator to perform the specified tasks. The control panel need not be wired to the hardware of the cash register and is preferably detachable from the case 12, so that a control panel may be replaced by a different one.

Each character or digit to be recorded on a message strip may first be represented as a series of bits (ones and zeros) in accordance with an appropriate code. For example, numeric characters may be four-bit binary-coded decimal, and alphabetic characters may be encoded in accordance with a subset of the ASCII code (American Standard Code for Information Interchange) as five-bit characters. Each bit may then be encoded and recorded on conventional plastic-base magnetic tape media in an appropriate manner, preferably by non-return-to-zero (NRZ) recording. For example, each bit may be represented magnetically by driving the medium first to one state of saturation and then to the opposite state of saturation, the identification of the bit as a 1 or 0 being determined by whether the medium remains in the first state of saturation for a substantially longer or a substantially shorter time than in the second state. This is termed "proportional code" and is disclosed, for example, in U.S. Pat. No. 2,887,674, granted on May 19, 1959 to Greene. A special bit, referred to as a "grey" bit, may be designated when the duration of the saturation states is approximately the same. Apparatus and methods for processing messages recorded in this fashion are described and claimed in the copending application of Alan K. Jensen and Richard L. Desilets, Ser. No. 74,672, filed Sept. 23, 1970, now U.S. Pat. No. 3,688,260, granted Aug. 29, 1972, and assigned to the same assignee as the present application. Other applicable recording and playback apparatus and methods are described and claimed in the copending application of William H. Burkhart, Ser. No. 171,251, filed Aug. 12, 1971, and assigned to the same assignee as the present application. However, it is not desired to restrict the present invention to particular recording and playback techniques.

Figure 3:
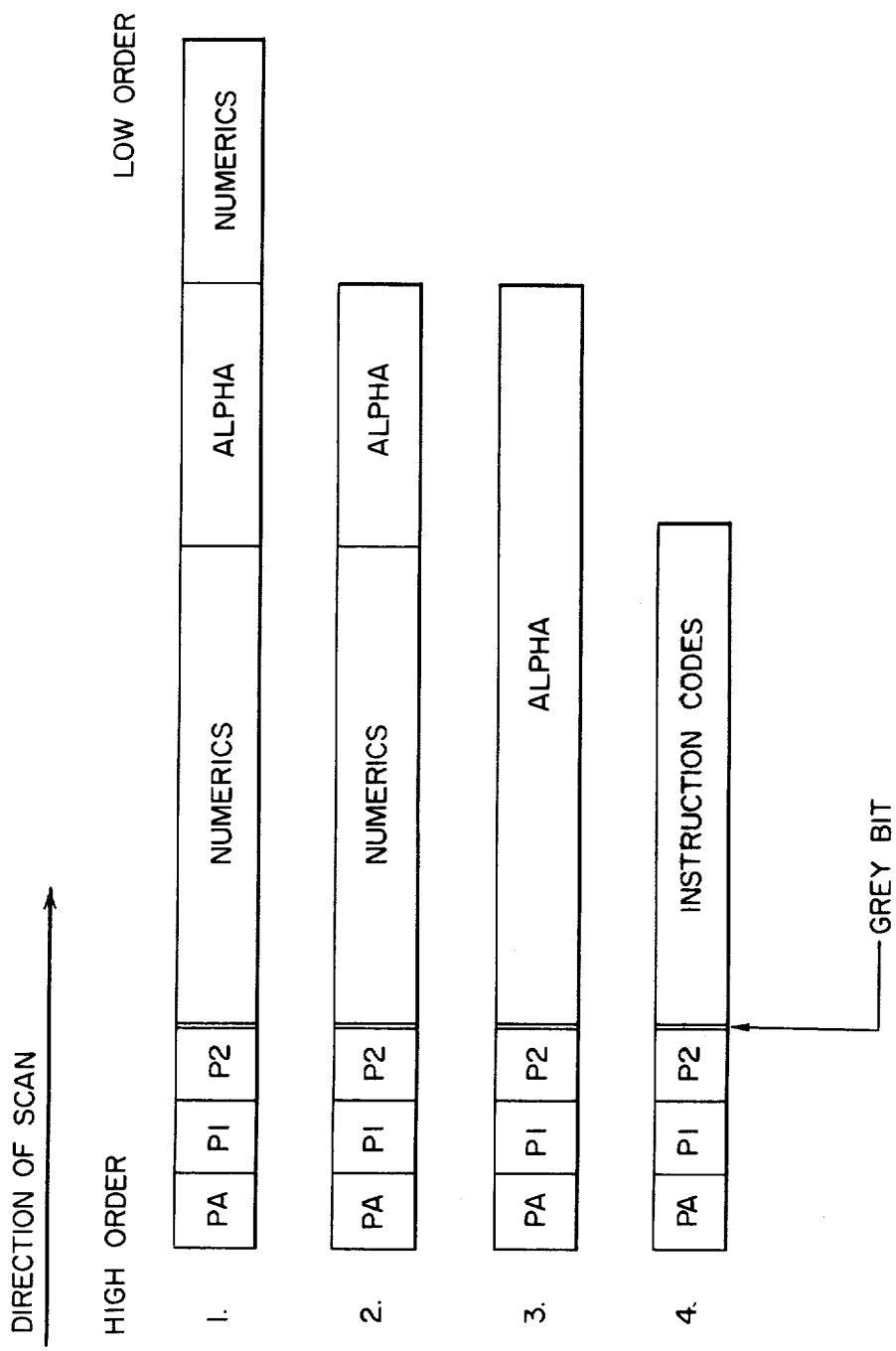
FIG. 3 is a diagrammatic view illustrating four message formats.

FIG. 3 illustrates diagrammatically four basic message formats employed in the invention. Proportions are distorted for purposes of illustration. The direction of scan in reading the message is presumed to be from the high order (left) end to the low order (right) end. The first digit, PA, is a parity check digit for messages encoded on external media and is an address digit for messages encoded on internal media (to be described). The next two digits, P1 and P2, are the first and second preamble digits. Each of the foregoing digits is comprised of four bits. Next there is a grey bit, which appears in messages encoded on external media only. This bit is employed, inter alia, for checking the direction of message scan. For simplicity, the grey bit will not be designated in specific message formats which will be described later. Some message formats comprise both numeric and alpha character fields in the body of the message; one has a single field constituted by all alpha characters; and another has a single instruction code field.

The preamble of a message constitutes a label which identifies the message content, its length, and other significant parameters. The preamble determines what error tests should be performed upon the message and determines the processing required. In short, the preamble constitutes control data which identify the type of message and tell the machine what to do with it. It may establish editing rules for printing, and it may establish levels of authority in the performance of restricted operations.

There are five general types of messages:
1. Merchandise and special charges or credits.
2. Command messages.
3. Alphabetic messages.
4. Employee/account identification messages.
5. Instruction messages.

A sixth class, memory up-date messages, may also be employed. All of the message types may appear externally of the cash register, but as a practical matter many messages can be conveniently placed in internal memory. A typical transaction will illustrate the use of different message types.

For example, in a typical transaction, the legend "Scan Employee No." on the control panel 14 may be illuminated by cash register logic to start the transaction. The operator would accordingly scan his employee badge (containing an employee message) with the data wand 16 (see FIG. 1), entering the message data into the cash register and causing illumination of the control panel legend "Scan Merchandise". The operator would then use the wand to scan message strips (containing merchandise messages) attached to articles of merchandise in order to enter the data from these messages. Upon finishing this operation, the operator would scan the illuminated "Complete" strip on the control panel (containing a command message) to inform the cash register of the completion of merchandise message entry. Next the legend "Scan Type Transaction" would be illuminated by the register logic, and the operator would scan the strip associated with the illuminated legend "Charge Take", for example (containing an instruction message). The entry of this message would result in illumination of the control panel legend "Scan Credit Card", and the operator would use the wand to scan the message strip on the customer's credit card (containing an account identification message). The entry of this message would result in illumination of the legend "Request Signature", and the customer would be called upon to sign the sales slip. The legend "Tear Slip" would also be illuminated, and the operator would then tear the sales slip from the cash register to complete the transaction. As will become more fully apparent hereinafter, each message preamble tells the cash register logic what type of message is being entered and tells the logic what to do with the message. All data processing operations, including error-checking, computing, printing, transmitting, and program sequencing, are implemented automatically in response to control data contained in each message. Moreover, the operator is instructed, at each appropriate stage of the transaction, as to steps to be performed by the operator, and the cash register will not proceed with the transaction unless the operator performs as required.

Figure 4:
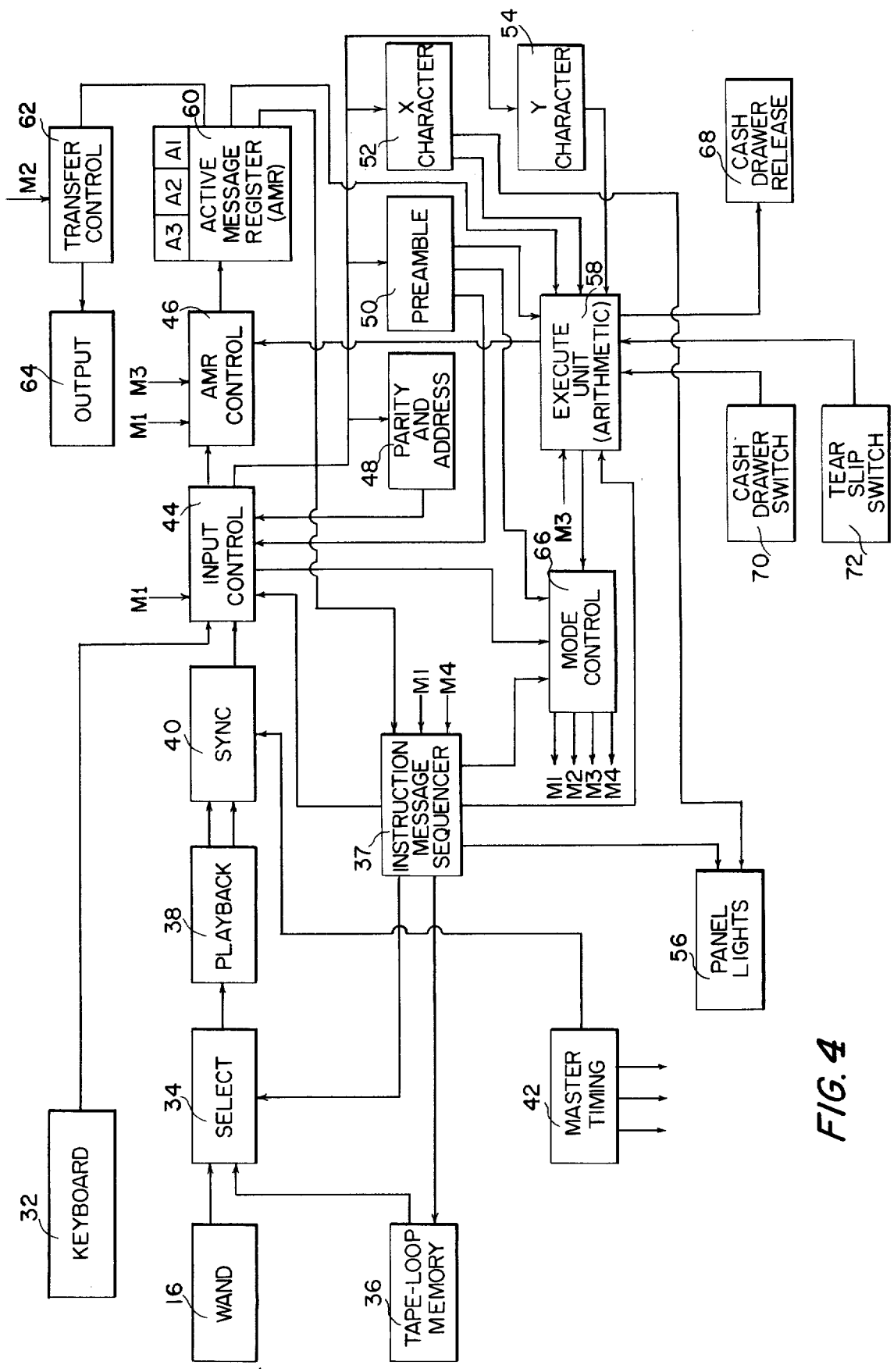
FIG. 4 is a general block diagram of a cash register in accordance with the invention.

FIG. 4 illustrates in simplified form a cash register in accordance with the invention. The wand 16 is the principal means of inputting message data from external media. Most types of messages cannot be ingested by the register in any other manner. The cash register will only accept whole messages from the wand, that is, the message must conform to one of the four formats of FIG. 3. The message must have a parity character, the two preamble characters, a grey bit in the specified location, etc. The scanned message must pass all error checks provided by the register. If not, it is rejected, and the whole message must be re-scanned. If desired, acceptance of scanned messages may be signalled by an audible "beep". The wand may have a conventional tape reading head comprising a core with a gap oriented transversely of the message strips and a pick-up coil coupled to the core, the head being supported adjacent to the end of a plastic handle and connected by a flexible wire to the register.

Although in principle any message of FIG. 3 can be entered via the wand, it is more practical to enter highly variable data, such as the date, shipping charges, the amount tendered by the customer, etc. via a keyboard 32. The keyboard may be a conventional type which generates voltages on certain inputs of a four stage shift register (parallel input) when keys are depressed. The keyboard may comprise ten numeric keys and four function keys. The dollar sign ($) key may be used to define the end of the SKU (stock keeping unit) field of a merchandise message and the beginning of the price field. The slash ("/") key may be used to separate certain non-dollar numerics, such as the day, month, and year. The "Enter" key may be used to signal the completion of an entry. Messages are entered via the keyboard by keying all numerics high order (left-most digit) first. Although the keyboard is an alternative means for entering data, there are large constraints on the kind of data which can be keyed in. The keyboard can be used to enter:
1. merchandise tag messages;
2. account number messages;
3. dollar amounts (variable charges, etc.) and other numeric entries (date, etc.)

if the cash register calls for the entry of such data by lighting an appropriate indicator on the control panel. Alpha characters cannot be entered. All messages except dollar amounts and certain other numerics (e.g., the date) called for by the cash register must be preceded by the appropriate preamble (keyed in).

The keyboard is "live" whenever the wand is selected by a selection circuit 34. The cash register logic will, however, only accept keyboard entry of the message data specified above. The first key depression represents the first preamble digit unless the cash register is specifically requesting keyed dollar amounts, the date, etc., there being no parity digit from keyboard. The first key depression may be used to lock out data entry from the wand. The second depression will cause the cash register error logic to reject the input unless the preamble defines one of the message types listed above and the register is requesting input of that specific message type (assuming keyed dollar amounts, the date, etc. are not called for).

A simple, inexpensive tape loop 36 is employed as internal memory of the cash register. Although the invention need not include such a memory, it is convenient to store internally certain data such as sub-routines common to many transactions. The use of such memory is limited, however, and it is not necessary to employ vast and complex internal memory, such as the usual core matrices employed in computers. Data are recorded on a single tract (or on multiple tracks with track selection, if desired) in bit-serial form and organized in accordance with the message formats of FIG. 3. The four high order (left-most) bits define the address of the message on the tape loop. Parity check is forsaken because of the high reliability of the tape. The "grey" bit is not included in tape messages, since it is not required (scan direction is fixed). Another difference between internal and external messages is the uniform length of a message from the tape loop. All tape messages, regardless of format or preamble, may be 112 bits long inclusive of address and preamble digits.

The tape loop is driven by a conventional tape transport and is provided with a conventional read head. The transport runs only when the cash register calls for a message from the tape. When such is the case, the transport motor is energized, and tape motion begins and continues until the desired message is found by comparing the leading four-bit address of each message, as it passes under the read head, with the address specified by sequence logic of the cash register (to be described). Tape motion ceases after the desired complete 112 bit message has been read, such that the stationary head is aligned with the portion of the tape between the end of the desired message and the beginning of the next message.

Selection of data entry from the wand 16 or the tape loop 36 is determined by the condition of the selection logic 34. As will be seen more fully hereinafter, the tape/wand select logic is controlled by two classes of instruction codes from an instruction message sequencer 37, one of which calls for tape input, specifying the desired message by its address, and the other of which calls for wand input, specifying the desired message by preamble type, e.g., clerk identification, account number, etc. The preamble digits are the key to the type of message which will be accepted from the wand. As pointed out above, the keyboard is available for use when the wand is selected. Once a key is depressed, the system will ignore the output of the wand for that message entry. In certain instances it is possible to de-select the keyboard and revert back to the wand input.

The output of the select logic 34 is applied to a playback circuit or reader 38. This circuit converts the electrical signals representing flux changes into other electrical signals representing ones, zeros, grey bits, and clocks. The playback circuit may be conventional or a type set forth in the aforementioned co-pending applications. Since the speed at which the wand is moved by hand over the message strips will ordinarily be subject to some variation, it is desired that the bit-recording code be self-clocking (as is conventional with the proportional code mentioned earlier), a clock pulse being produced for each bit by the playback circuit.

The output of the playback circuit 38 is fed to a synchronization circuit 40, the purpose of which is to synchronize the data from the playback circuit with the system clock from master timing 42. The synchronized data are then applied to an input control circuit 44, which includes an input register error checking logic, bit counter, character counter, and other components to be described hereinafter. The input control circuit 44 is connected to a further circuit, 46, designated "AMR Control" and to additional circuits 48, 50, 52, and 54 designated "Parity and Address", "Preamble", "X Character" and "Y Character". Circuits 48 and 50 include registers for storing the parity or address and preamble characters of the input message and have an output to the input control circuit 44. These registers are only cleared when the system logic is ready for a new message input, either because it has finished processing the last message or because it has rejected it. Circuits 52 and 54 include registers for storing "X" and "Y" characters, respectively, of the input message, which are utilized in controlling panel lights 56 and an execute unit 58 (where arithmetic operations are performed).

The AMR control 46 controls the entry of the body of an input message (everything beyond the "grey") into an active message register (AMR) 60, which has three fields A1, A2, A3, which may be 32 bits, 40 bits, and 60 bits long, respectively. The body of all incoming messages, regardless of source, is assembled and held in this register for processing. In most operations involving arithmetic, the AMR will hold one of the operands. In some cases the result of the arithmetic is stored in the AMR. Once the preamble is stored in the preamble register of circuit 50, it is decoded. The decoded preamble is used to control the gating of the rest of the incoming message to the proper fields in the active message register, to designate the correct total number of bits in the message and to designate how the message is to be processed, as by the execute unit 58. (This explains the connections from circuit 50 to the unit 58 and to the input control 44, mentioned previously). The AMR 60 has outputs to the execute unit 58, to the instructing message sequencer 37, and to a transfer control circuit 62. The last-mentioned circuit controls the transfer of the message in the AMR to an output circuit 64, which may include a conventional printer and/or a conventional circuit for transmitting data to a remote processor, such as large computers used to monitor sales from many cash registers or multiple places of business.

The instruction message sequencer 37 receives instruction messages (see FIG. 3) from the AMR 60. The body of each instruction message may be 66 bits long, comprising eleven 6-bit instruction codes, which are implemented in sequence. Instruction messages originate at the wand 16 or the tape loop 36 (never the keyboard) and provide much of the "program" of the cash register. Clearly, the last useful instruction code in an instruction message must be one which, when implemented, will result in replacement of the instruction message in the instruction sequencer 37 by a new instruction message. If the next instruction message is in the tape loop 36, the current instruction message must include an instruction code which turns on the tape transport (indicated in the drawing by the connection to tape memory 36) and specifies the desired message address of a particular instruction message. If the next instruction message is to arrive via the wand 16, the current instruction message must include an instruction code which calls for wand input of an instruction message (by preamble class). (The function of the instruction message sequencer in specifying message address or preamble type is indicated in the drawing by the connection to input control 44.) As shown in FIG. 4, the instruction message sequencer is also involved in the control of panel lights 56, the execute unit 58, and a mode control unit 66.

The operation of the cash register of the invention involves four operating modes: M1, M2, M3, and M4. These modes are specified by the mode control unit 66. Mode M1 is the input mode, during which data may be entered. There are eight submodes of M1, which will be described later. Mode M2 is the output mode, during which data may be transferred by the transfer control 62 to output 64. Mode M3 is the execute mode, during which all arithmetic and data-manipulation operations are executed. Certain codes in the instruction message sequencer 37, termed "housekeeping codes", are also executed during M3. Mode M4 is the shift or sequencing mode, during which the next instruction code in the instruction message sequence 37 is sequenced or shifted for subsequent implementation. Appropriately labelled arrows have been shown in FIG. 4 to indicate generally the influence of the mode control unit 66 on various portions of the block diagram. Specifics will become more apparent hereinafter. The system is always in one of the foregoing operating modes (most frequently in M1 awaiting input from the wand).

Also indicated generally in FIG. 4 are the cash drawer release 68, a cash drawer switch 70 and a tear slip switch 72. The cash drawer may be opened by a release solenoid at the appropriate moment and must be closed, as indicated by the switch 70, before the transaction can proceed. The tear slip switch 72 may be a microswitch located in the case 12 adjacent to an edge of the opening through which the sales slip 18 is exposed and which is actuated when the sales slip is grasped and torn from its paper supply roll about that edge.

Referring again to the message formats of FIG. 3, merchandise messages have format No. 1, which includes three data fields: an SKU field (left numeric), an alpha field, and a price field (right numeric). In a typical message, the price field is always a seven digit field. Zeros may be employed in the price field to occupy empty digit positions. The alpha field has a maximum of eight characters. A special symbol of the ASCII code, such as an AT sign, may be employed at the low order end of a series of alpha characters to indicate the end of an alpha message of less than eight characters. In the SKU field there are four possible field sizes (15, 12, 8, or 4 characters), the field size (number of characters) being designated by the preamble. The preambles may also inform the cash register whether the merchandise item is taxable. For example, preamble 01 may designate a non-taxable item and a four-character SKU. Preamble 25 may designate a taxable item and an eight-character SKU.

Instruction messages have format No. 4. An external message (e.g., control panel strips) may have a length of 82 bits. The body of the message includes eleven 6-bit instruction codes (66 bits total) arranged serially. The final four bits (low order) may constitute a code utilized in conjunction with a remote processor, which will not be described in detail herein. Two types of preambles are typical, one (98) for a standard instruction message, and the other (88) for a "void" instruction message. The following table gives typical 6-bit instruction codes:

6-BIT INSTRUCTION CODES

| | | |
|---|---|---|
| 1. | 000000 | Scan Merchandise |
| 2. | 000100 | Select Method of Payment |
| 3. | 001000 | Scan Tax |
| 4. | 010000 | Discount |
| 5. | 1XXX10 | Request Employee Number |
| 6. | 0XXX10 | Request Credit Number |
| 7. | XXXX01 | Message Address (on tape) |
| 8. | 010011 | Open Drawer |
| 9. | 010111 | Skip If Customer Total + |
| 10. | 011011 | Clear Customer Registers |
| 11. | 100011 | Request Signature |
| 12. | 100111 | Request Address |
| 13. | 101011 | Tear Receipt |
| 14. | 000011 | Print |
| 15. | 011111 | No Print |

An examination of this table reveals that there are no arithmetic or bit-manipulative instruction codes. The instruction codes fall into two general categories:

1. Codes which call for a message input. This type of code includes bits which specify the source (tape loop or wand). If tape loop, the code specifies the desired message by its address. If wand, it specifies the desired message by type (preamble class). The input logic will reject all messages (with two exceptions to be specified below) not meeting these criteria.
2. Internal housekeeping and auxiliary codes. These concern such tasks as opening the cash drawer, clearing certain registers etc.

Code Nos. 1 – 6, 8, and 11 – 13 result in the lighting of an appropriate lamp on the control panel. The digits XXX in codes 5 and 6 are used to specify the levels of personnel authority or credit classes, depending upon whether these digits are ones or zeros. The digits produce signals which are compared with corresponding signals produced by preamble characters in the scanned employee badge or credit card strip, and the cash register logic determines whether the processing shall be permitted to proceed. The initial digits XXXX in code No. 7 specify the four-bit address to be sought in the tape loop 36 (again by signal comparison).

There are two message types that may be entered successfully whenever the logic demands an external message input, regardless of the type specified. One is the "void" message (preamble 88) previously referred to. The only difference between this message and a standard instruction message is the preamble. Scanning this type of message causes immediate replacement of the current instruction message in the instruction message sequencer 37 (as by a new instruction message from internal memory 36) which starts the transaction over again. The second is an alphabetic message (preamble 89). This message can be entered successfully whenever the wand is selected by the select unit 34. However, it only results in the printing of a message on a sales slip. It does not alter the program sequence. Thus, the current instruction code must still be satisfied with the correct message input, before the next instruction code is sequenced for implementation.

Alphabetic messages have format No. 3 and are of variable length when external. The body of the message may include twenty alpha characters maximum, each five bits. A single AT sign may indicate termination of a series of alpha characters totalling less than twenty, and two consecutive AT signs may be employed to designate termination of a series of alpha characters less than twelve in number. A typical alpha message preamble is 89.

Employee/account identification messages have format No. 2. The body of the message includes an alpha portion, having a maximum of eight alpha characters, a lesser number being designated by an AT sign. The identification (numeric) portion may have one of four field sizes (as in merchandise messages), the size being designated by the preamble. A typical employee identification message preamble is 48, and a typical customer account identification message preamble is 08.

Special charges or credits messages have format No. 1, and a maximum length of eighty-eight bits if an external message. The amount field (right numeric) is seven digits long if the message is external and eight digits long if internal. The alpha field may have eight characters maximum if from external memory, and is fixed at eight characters if from internal memory. Again, an AT sign may be employed to terminate the alpha field. The left numeric field may have a length of two digits or seven digits, if from an external source, and is fixed at seven digits if from internal memory, all defined by the preamble. The lowest significant digit (LSD) in this field is the X-character, which is used to control the lighting of an indicator lamp on the control panel, such as "Key Amount". Certain preambles designate that the amount field is empty (or contains useless information) and that subsequent entry of an amount (after scanning of the strip message or reading of the tape message) is required, as by means of the keyboard. The reading of a message of this type (containing the X-character) would thus call for a keyboard entry at the appropriate time. Again, the preamble may specify whether the item is taxable. A typical preamble for a taxable charge item which calls for keyboard entry of the amount is 04, while a credit might be 06.

Command messages have format No. 1, and, with exceptions to be noted hereinafter, are employed in performing arithmetic operations. The right numeric field is seven digits long, if from external memory, and eight digits long if from internal. This is the field which contains arithmetic information. The alpha field is eight characters maximum if from external memory and eight characters fixed if from internal memory. Again, an AT sign may be employed to terminate the alpha field in an external message. The left numeric field is two digits long or seven digits long, if from an external source, and is fixed at seven digits if from an internal source, the preamble designating the field length. The least significant digit in this field (LSD) is the X-character and the next to the least significant digit (NLSD) is the Y-character. These are used to designate particular arithmetic registers in the execute unit 58.

As noted above, most command messages involve arithmetic or bit manipulation operations, and these will be discussed later in connection with the execute mode M3. Two exceptions are: a "fetch" command (also termed "Complete" herein), and "skip and fetch". Both may be entered (by the wand) whenever the logic will accept a merchandise message. The "fetch" command (preamble 87) causes the shifting of the next instruction code in the instruction message sequencer 37, while the "skip and fetch" command (preamble 86) causes the skipping of the next instruction code and the shifting of the following instruction code in the instruction message sequencer.

In the detailed description of the invention, which follows, reference will be made to additional block diagrams which illustrate the principal portions of the block diagram of FIG. 4 with greater particularity. In general, the additional block diagrams are comprised of detail blocks which correspond to the generic blocks of FIG. 4, but in some instances the correspondence may not be precise, because the diagram of FIG. 4 is intended to illustrate broad principles in a simplified manner. The detailed description will also make reference to timing diagrams and to supplementary logic-schematic diagrams. The latter diagrams are appropriately labelled and illustrate typical circuits of a preferred embodiment by the use of well known symbols in conjunction with reference characters designating the input and output signals. A key to certain symbols employed appears in FIGS. 5 and 6.

It should be noted that certain registers employed in the exemplary embodiment of the invention, including the active message register, the instruction message register, the arithmetic register and the output buffer register, are conventional dynamic registers, although static registers may be used instead, with appropriate modification of the logic (as well known in the art). Dynamic registers are repetitively clocked so that data are continually circulated from the output to the input. Access to particular data or data fields in the register is gained by using timing signals which identify the position of data bits in the register.

Figure 7:
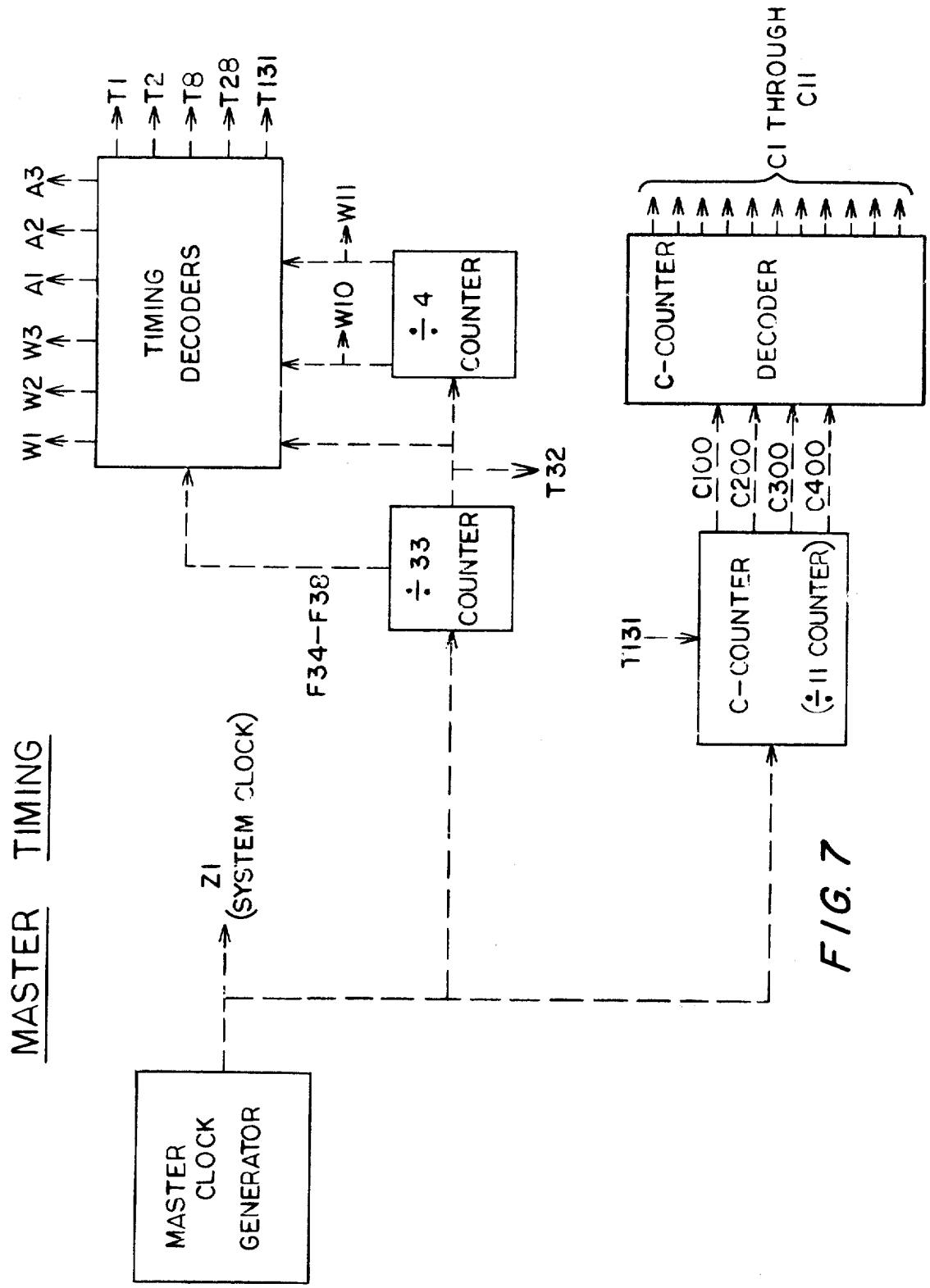
FIG. 7 is a block diagram of the master timing system.
Figure 8:
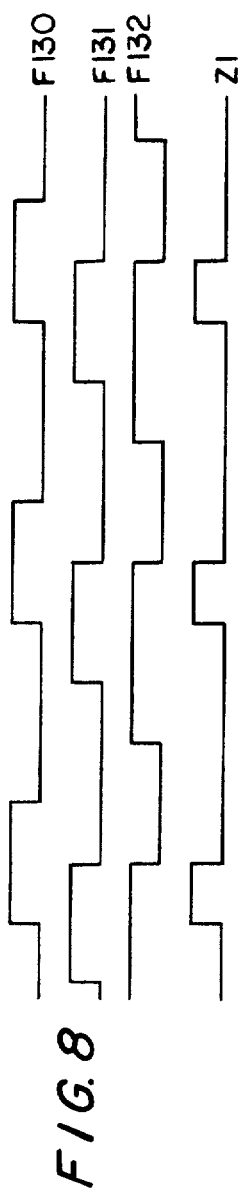
FIGS. 8 – 11 are master timing signal diagrams.
Figure 12:
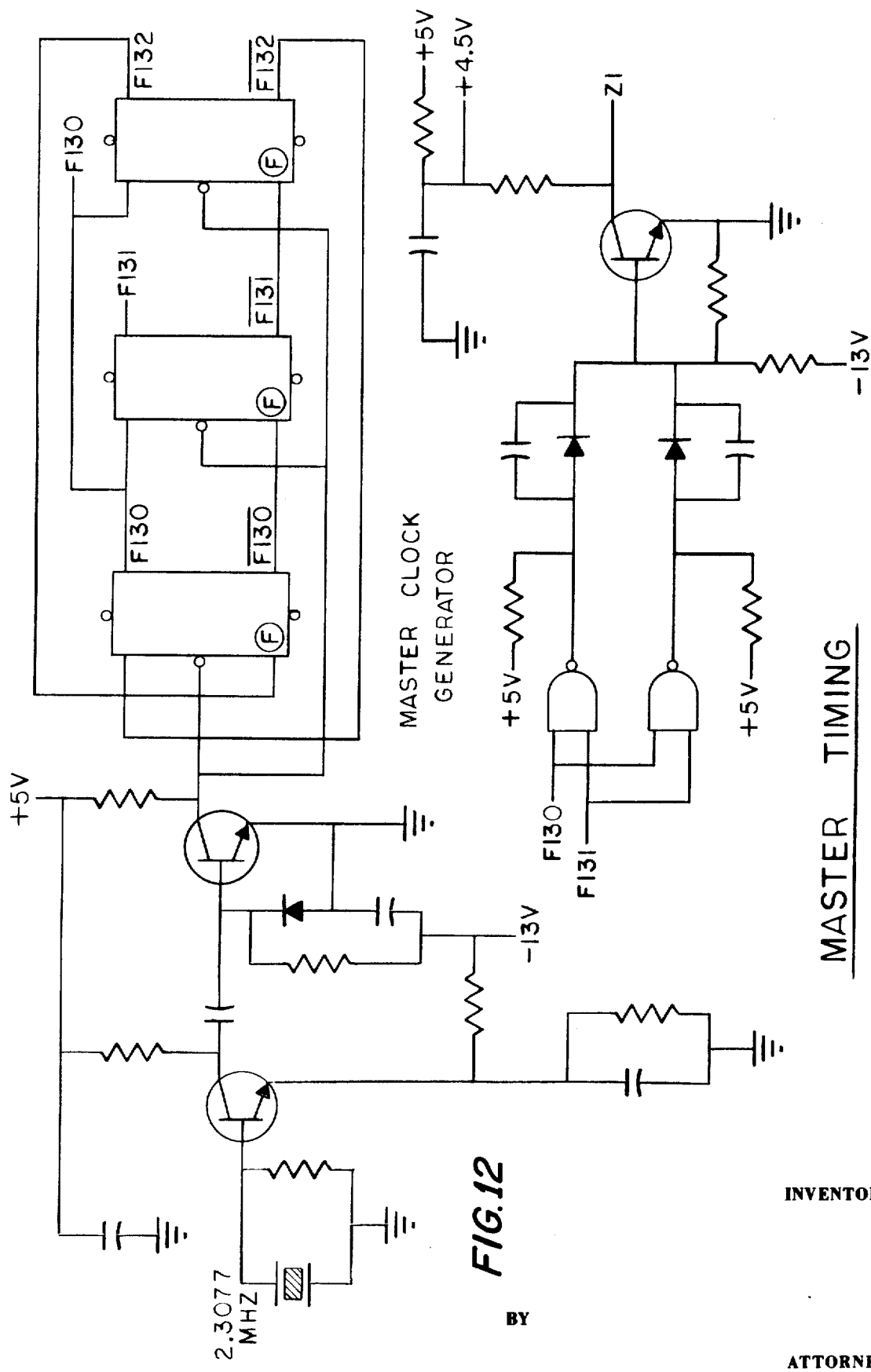
FIG. 12 is a logic-schematic diagram illustrating a master clock generator.

FIG. 7 illustrates in block diagram form the master timing system of the invention. A master clock generator, shown in greater detail in FIG. 12, is the heart of the master timing system. It may comprise a crystal oscillator that generates a sine-wave of very accurate and stable frequency, followed by shaping, counting and amplifying circuits for producing the system clock Z1. It may also produce another clock (termed Z5, but not shown) for use with the dynamic (MOS) shift registers. The system clock Z1 is the main clocking signal for the logic of the cash register, and most actions internal to the machine occur at its falling edge or else are synchronized by special circuits that delay their effect on the other parts of the machine until a falling edge of Z1 occurs. The period of Z1 defines the fundamental unit of time within the system, that is, the bit time. Z1 consists of positive pulses, 0.43 microseconds long, occurring every 2.17 microseconds (approximately). The MOS clock (Z5) is designed to provide wider signal swings required by MOS registers and to clock such registers at a time approximately half way between the falling edges of Z1 to allow for the rather long rise and fall times and propagation delays of these registers. The output of each register is resynchronized with Z1. The production of Z1 is illustrated by the timing diagram of FIG. 8, which shows the relationship of the signals F130, F131, and F132 (generated in FIG. 12) with Z1.

Figure 13:
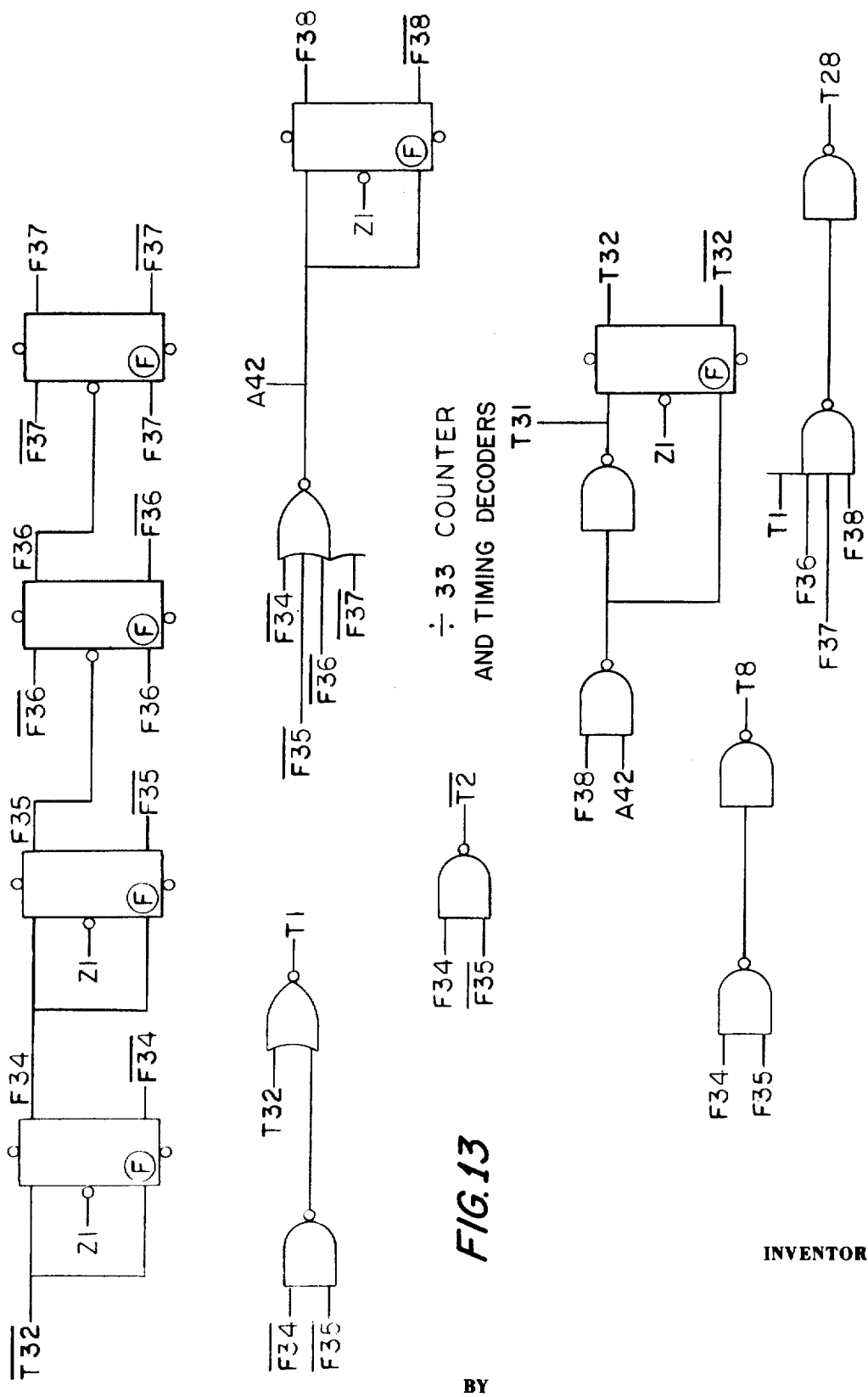
FIG. 13 is a logic diagram illustrating a divide by thirty-three counter and timing decoders employed in the master timing system.

Z1 is applied to a divide by thirty-three counter, which includes the flip-flops F34 - F38 shown in FIG. 13. This counter produces a positive pulse at its T32 output every thirty-three bit times. This pulse lasts for one bit time and coincides with the last bit time of each of word times W1 – W3 (to be described). A second output from this counter is a signal referred to as T31 and is similar to T32 except it goes high one bit time ahead of the T32 output. The outputs of each of the flip-flops F34 to F38 and the signal T32 are applied to the timing decoders to generate other timing signals which will soon be described. T32 is also applied to a divide by four counter for the generation of signals W10 and W11. The purpose of this counter is to divide the cycle of the active message register (AMR) into four consecutive periods of time, the first three of which are referred to as W1 – W3, each period being thirty-three bit times long. The signals W10 and W11 are decoded within the timing decoder to generate signals W1 – W3. This is shown in FIG. 14 (inverters being used where necessary to generate signal complements).

Signals A1 – A3, produced by the timing decoders as shown in FIG. 14, are used to define the three fields of the AMR (and corresponding fields of output buffer registers). Signal A1 is high for the first thirty-two bit times of the AMR cycle (that is, T0 – T31) and is used to define the amount portion of messages in the AMR, etc. Signal A2 is high for the forty bit times that follow A1 in the AMR cycle (that is, T32 – T71) and is used to define the alpha portion of messages stored in the AMR, etc. Signal A3 is high for the sixty bit times which follow A2 in the AMR cycle (that is, T72 – T131) and is used to define a portion of messages stored in the AMR, etc. that carries numeric information such as SKU numbers, account numbers, clerk and manager identification numbers, etc.

The timing decoders also generate signals such as T1, T2, T8, T28, and T131 (see FIG. 13). The first three of these signals are used in picking out the one's bit, the two's bit, and the eight's bit of every BCD character contained in the arithmetic registers for processing through the adder of the execute unit. Each signal consists of positive pulses of one bit time duration, T2 being delayed one bit time with respect to T1, and T8 being delayed two bit times with respect to T2.

T28 consists of positive pulses of one bit time duration and a period of thirty-three times which occur every twenty-eight bit times (that is, at T28 time, T61 time, T94 time, and T127 time in every AMR cycle).

T131 consists of positive pulses of one bit time duration occurring at T131 time in every AMR cycle. Its period is 132 bit times. The fall of T131 coincides with the end of an AMR cycle and the beginning of the next AMR cycle. Other timing signals are also generated, including T0, which consists of positive pulses of one bit time duration occurring at T0 time in every AMR cycle, with a period of 132 bit times.

The following table illustrates the basic timing, the left-hand portion giving bit counts from T0 to T131 (only some of the counts being illustrated in order not to confuse the table), and the right-hand portion indicating the occurrence of various signals by the presence of a one.

BASIC TIMING

| | | W1 | W2 | W3 | T32 | F38 | F37 | F36 | F35 | F34 | T1 | T2 | T8 | 28 |
|---|---|---|---|---|---|---|---|---|---|---|---|---|---|---|
| Count | T0 | 33 | 66 | 00 | 0 | 0 | 0 | 0 | 0 | 0 | 1 | | | |
| | 1 | | | | 0 | 0 | 0 | 0 | 0 | 1 | | 1 | | |
| | 2 | | | | 0 | 0 | 0 | 0 | 1 | 0 | | | | |
| | 3 | | | | 0 | 0 | 0 | 0 | 1 | 1 | | | 1 | |
| | 4 | | | | 0 | 0 | 0 | 1 | 0 | 0 | 1 | | | |
| | 5 | | | | 0 | 0 | 0 | 1 | 0 | 1 | | 1 | | |
| | 6 | | | | 0 | 0 | 0 | 1 | 1 | 0 | | | | |
| | 7 | | | | 0 | 0 | 0 | 1 | 1 | 1 | | | 1 | |
| | 8 | | | | 0 | 0 | 1 | 0 | 0 | 0 | 1 | | | |
| | 9 | | | | 0 | 0 | 1 | 0 | 0 | 1 | | 1 | | |
| | 10 | | | | 0 | 0 | 1 | 0 | 1 | 0 | | | | |
| | 11 | | | | 0 | 0 | 1 | 0 | 1 | 1 | | | 1 | |
| | 12 | | | | 0 | 0 | 1 | 1 | 0 | 0 | 1 | | | |
| | 13 | | | | 0 | 0 | 1 | 1 | 0 | 1 | | 1 | | |
| | 14 | | | | 0 | 0 | 1 | 1 | 1 | 0 | | | | |
| | 15 | | | | 0 | 0 | 1 | 1 | 1 | 1 | | | 1 | |
| | 16 | | | | 0 | 1 | 0 | 0 | 0 | 0 | 1 | | | |
| | 17 | | | | 0 | 1 | 0 | 0 | 0 | 1 | | 1 | | |
| | 18 | | | | 0 | 1 | 0 | 0 | 1 | 0 | | | | |
| | 19 | | | | 0 | 1 | 0 | 0 | 1 | 1 | | | 1 | |
| | 20 | | | | 0 | 1 | 0 | 1 | 0 | 0 | 1 | | | |
| | 21 | | | | 0 | 1 | 0 | 1 | 0 | 1 | | 1 | | |
| | 22 | | | | 0 | 1 | 0 | 1 | 1 | 0 | | | | |
| | 23 | | | | 0 | 1 | 0 | 1 | 1 | 1 | | | 1 | |
| | 24 | | | | 0 | 1 | 1 | 0 | 0 | 0 | 1 | | | |
| | 25 | | | | 0 | 1 | 1 | 0 | 0 | 1 | | 1 | | |
| | 26 | | | | 0 | 1 | 1 | 0 | 1 | 0 | | | | |
| | 27 | | | | 0 | 1 | 1 | 0 | 1 | 1 | | | 1 | |
| | 28 | | | | 0 | 1 | 1 | 1 | 0 | 0 | 1 | | | 1 |
| | 29 | | | 128 | 0 | 1 | 1 | 1 | 0 | 1 | | 1 | | |
| | 30 | | | 129 | 0 | 1 | 1 | 1 | 1 | 0 | | | | |
| | 31 | | | 130 | 0 | 1 | 1 | 1 | 1 | 1 | | | 1 | |
| | 32 | 65 | T131 | | 1 | 0 | 0 | 0 | 0 | 0 | | | | |

Figure 9:
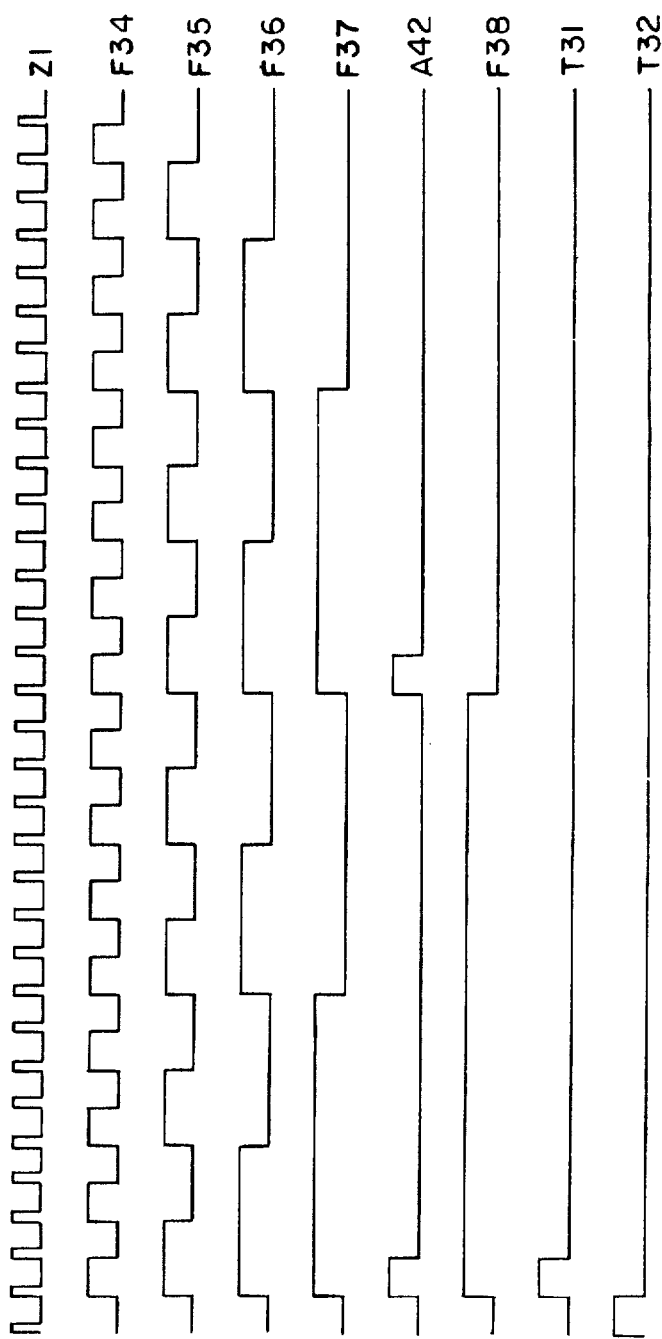
Figure 10:
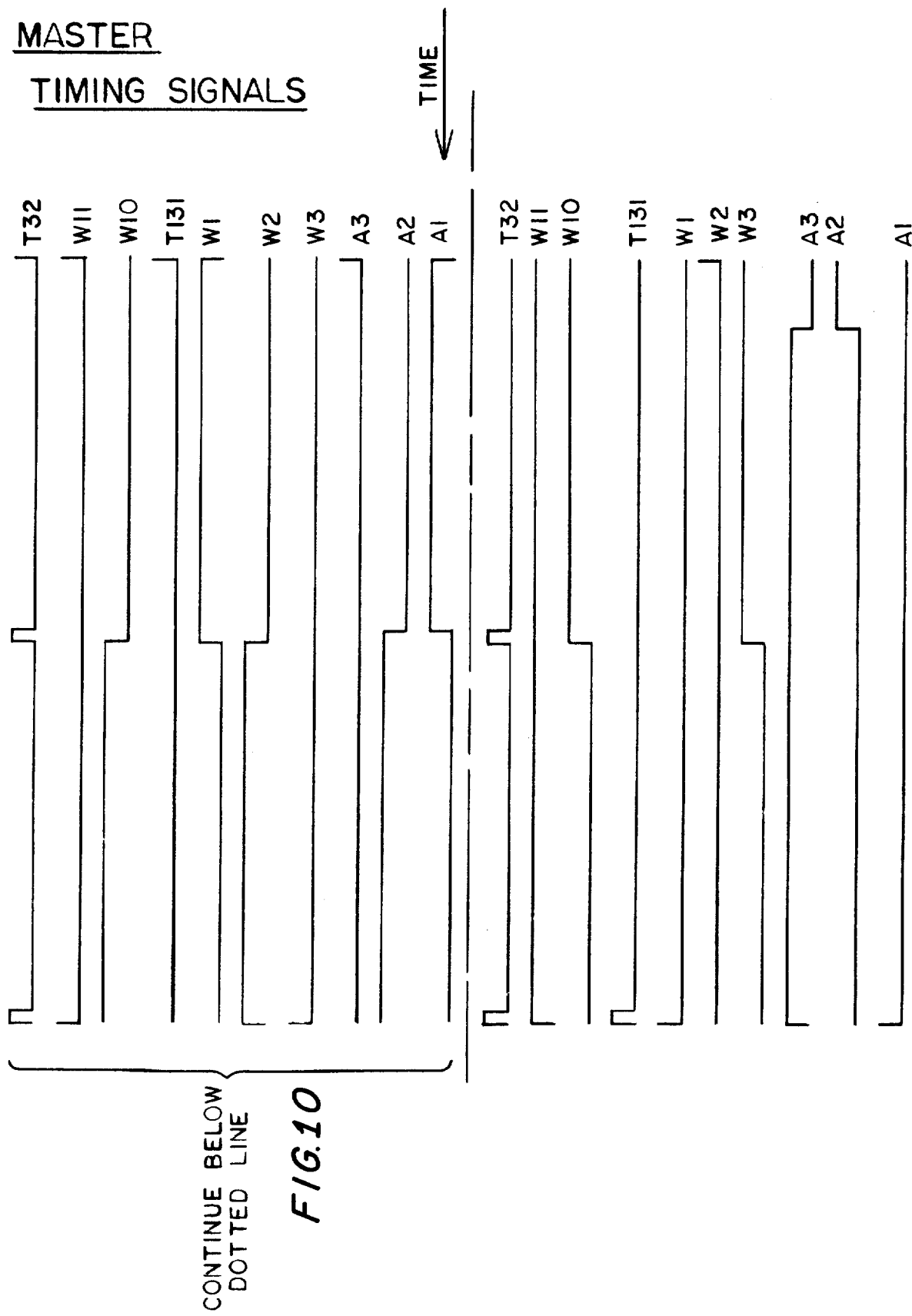
Figure 11:
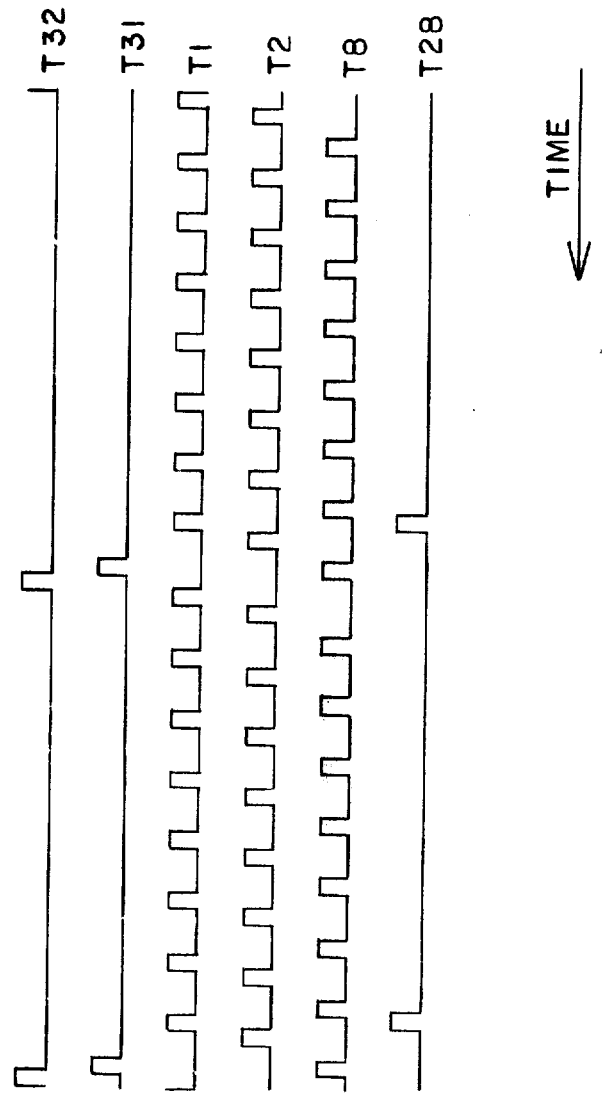

The relationship of the timing signals is also apparent from FIGS. 9 – 11.

As also shown in FIG. 7, the system clock Z1 is applied to a C-counter (a divide by eleven counter), the output signals of which, C100 – C400, are applied to a C-counter decoder, which produces signals C1 – C11. FIGS. 15 and 16 further illustrate the C-counter and its decoder and the production of the various signals. The following table illustrates the states of the C-counter with respect to the signals C1 – C11.

"C" Counter

| | C100 | C200 | C300 | C400 |
|---|---|---|---|---|
| C1 | 0 | 0 | 0 | 0 |
| C2 | 1 | 0 | 0 | 0 |
| C3 | 0 | 1 | 0 | 0 |
| C4 | 1 | 0 | 1 | 0 |
| C5 | 0 | 1 | 0 | 1 |
| C6 | 0 | 0 | 1 | 0 |
| C7 | 1 | 0 | 0 | 1 |
| C8 | 1 | 1 | 0 | 0 |
| C9 | 0 | 1 | 1 | 0 |
| C10 | 0 | 0 | 1 | 1 |

| | | | | |
|---|---|---|---|---|
| C11 | 0 | 0 | 0 | 1 |

Signals C1 – C11 are used to identify in time (with the aid of W1) each of eleven individual registers contained within the arithmetic register ( a dynamic register having eleven parts) of the execute unit. Each of C1 – C11 is high for 132 bit times every 1452 bit period (that is, eleven AMR cycles). These signals occur consecutively in time, C2 going high at the end of C1, C3 going high at the end of C2, etc. The C-counter makes it possible to relate the amount field (A1) in the AMR to a particular arithmetic register. Such registers are specified by the X and Y characters referred to previously, also known as the LSD and NLSD characters, respectively. As will be seen more fully hereinafter, these characters are trapped in registers or traps and are compared with the output of the C-counter to gain access to particular arithmetic registers. Such comparators are illustrated in FIGS. 17 and 18.

Figure 22:
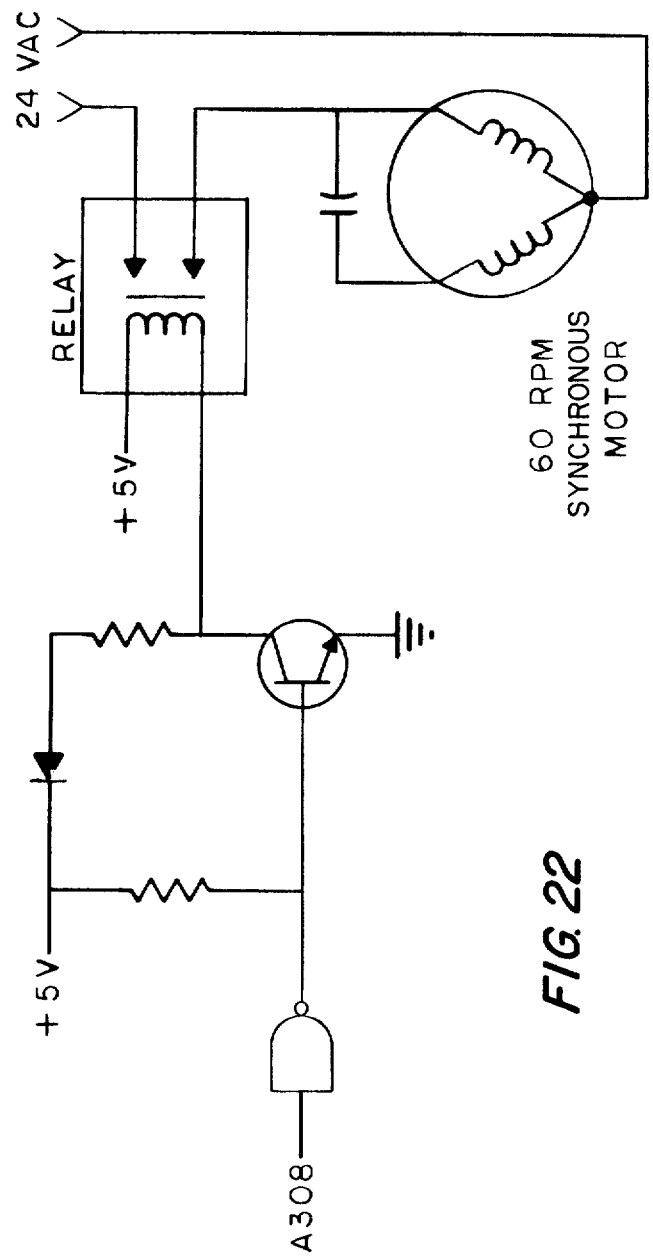
FIG. 22 is a schematic diagram concerned with the tape motor and driver.
Figure 22A:
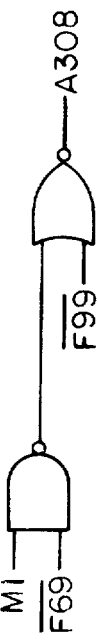
FIG. 22A is a logic diagram concerned with the production of a tape motor control signal.

FIG. 19 illustrates input portions of the system, including the tape memory 36, selection logic 34, playback circuit 38, and bit sync logic 40. The tape memory has a tape motor control (see FIGS. 22 and 22A).

Figure 21:
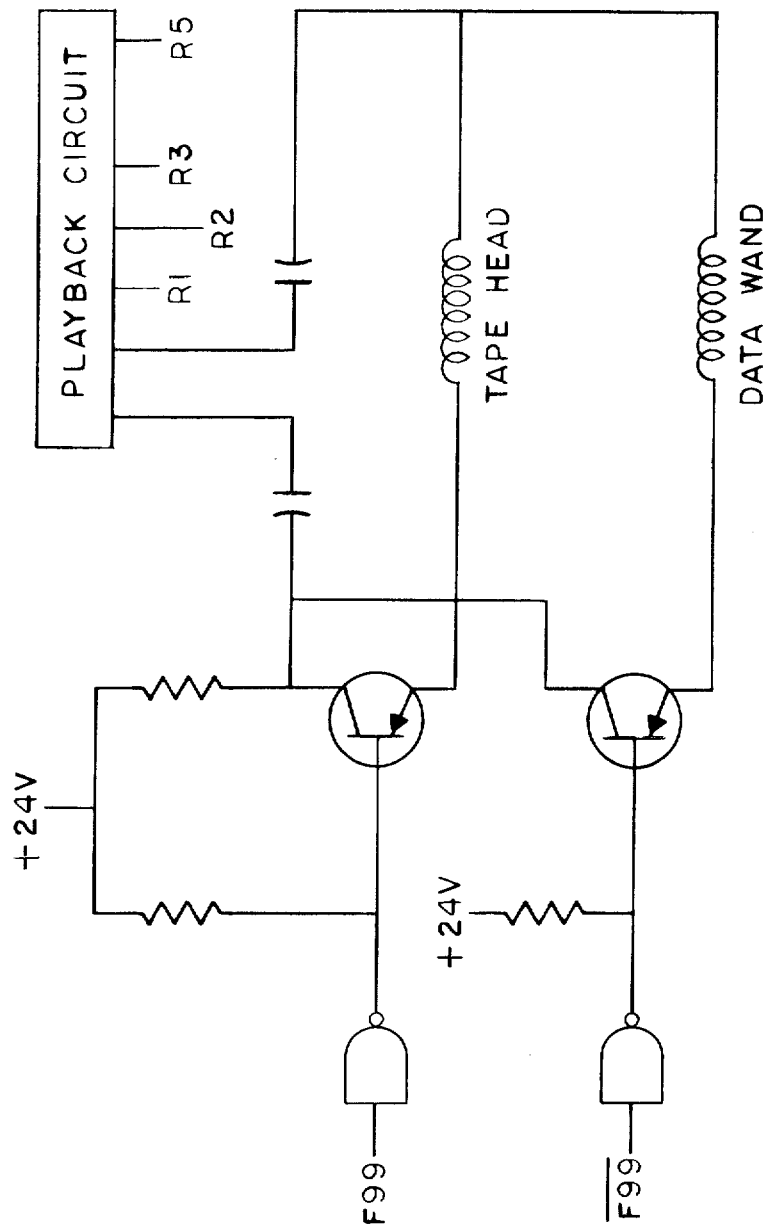
FIG. 21 is a logic-schematic and block diagram illustrating certain input portions of the system.

The selection logic 34 is illustrated in FIG. 21, being responsive to a signal F99 (or its complement) provided from the instruction message sequencer 37 (FIG. 4) described later in detail.

The playback circuit produces signals R1, R2, R3, and R5. Signal R3 is a long pulse (produced by a pulse stretcher, for example) which remains high as long as data are supplied to the playback. The grey bit signal R2 is produced very time a grey bit is present in the playback. R1 is produced every time a "one" appears in the playback, and R5 is a playback clock which accompanies every data bit. Details of such a playback system may be found in the aforementioned copending application of Jensen and Desilets, for example.

Figure 20:
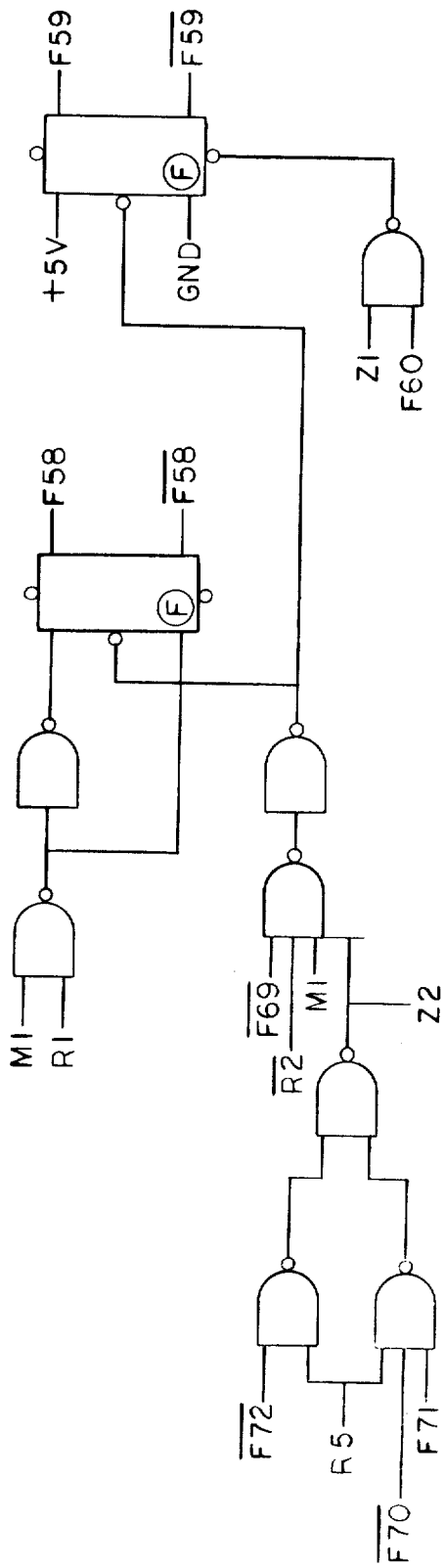
FIG. 20 is a logic diagram concerned with bit synchronization.

Signals R1 and R5 are supplied to the bit synchronization logic 40, which includes flip-flops F58 – F60 (illustrated in greater detail in FIG. 20). The operation of the bit synchronization will be later described in conjunction with FIG. 23.

Figure 24:
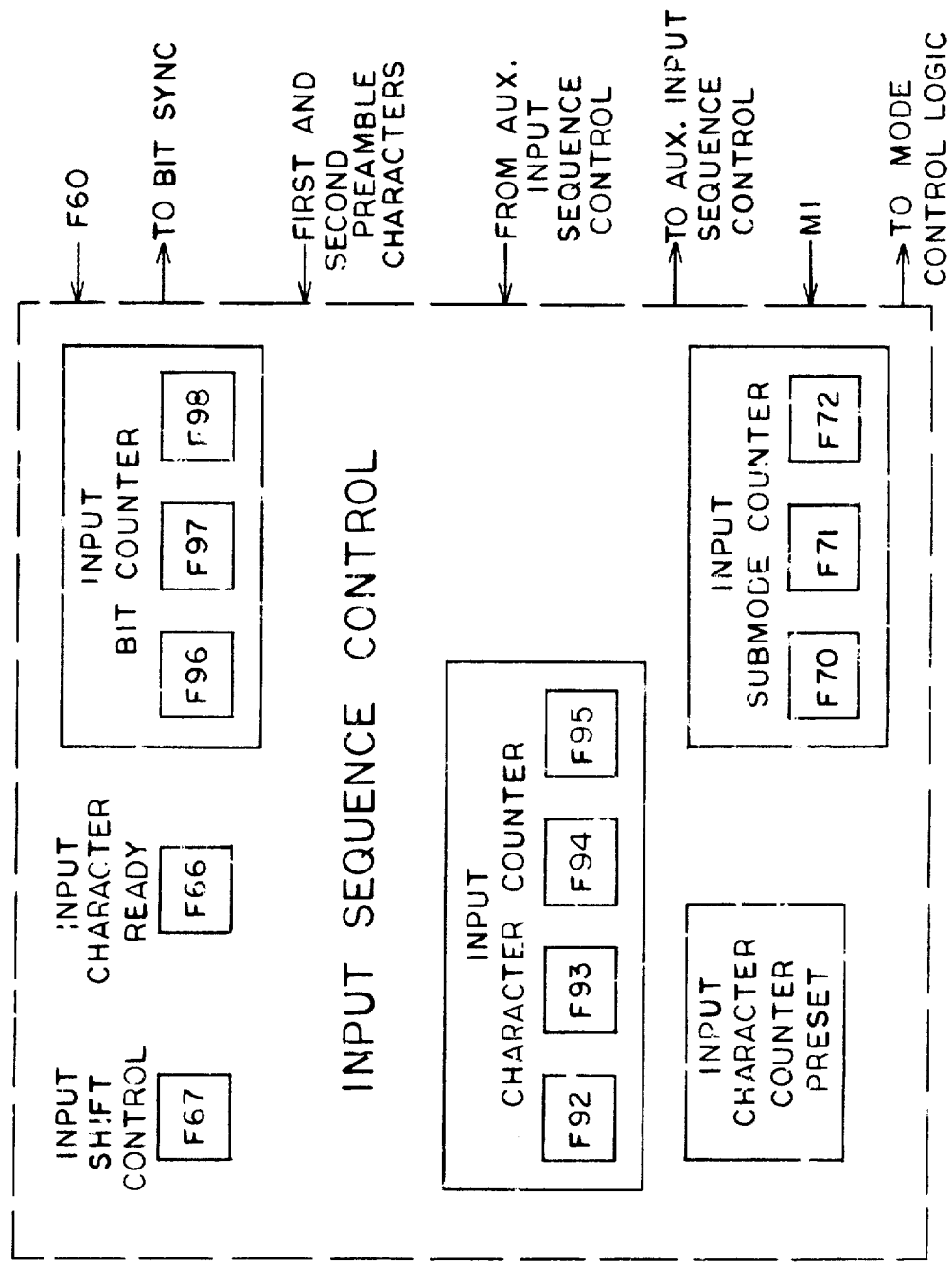
FIG. 24 is a block diagram of the input sequence control.
Figure 27:
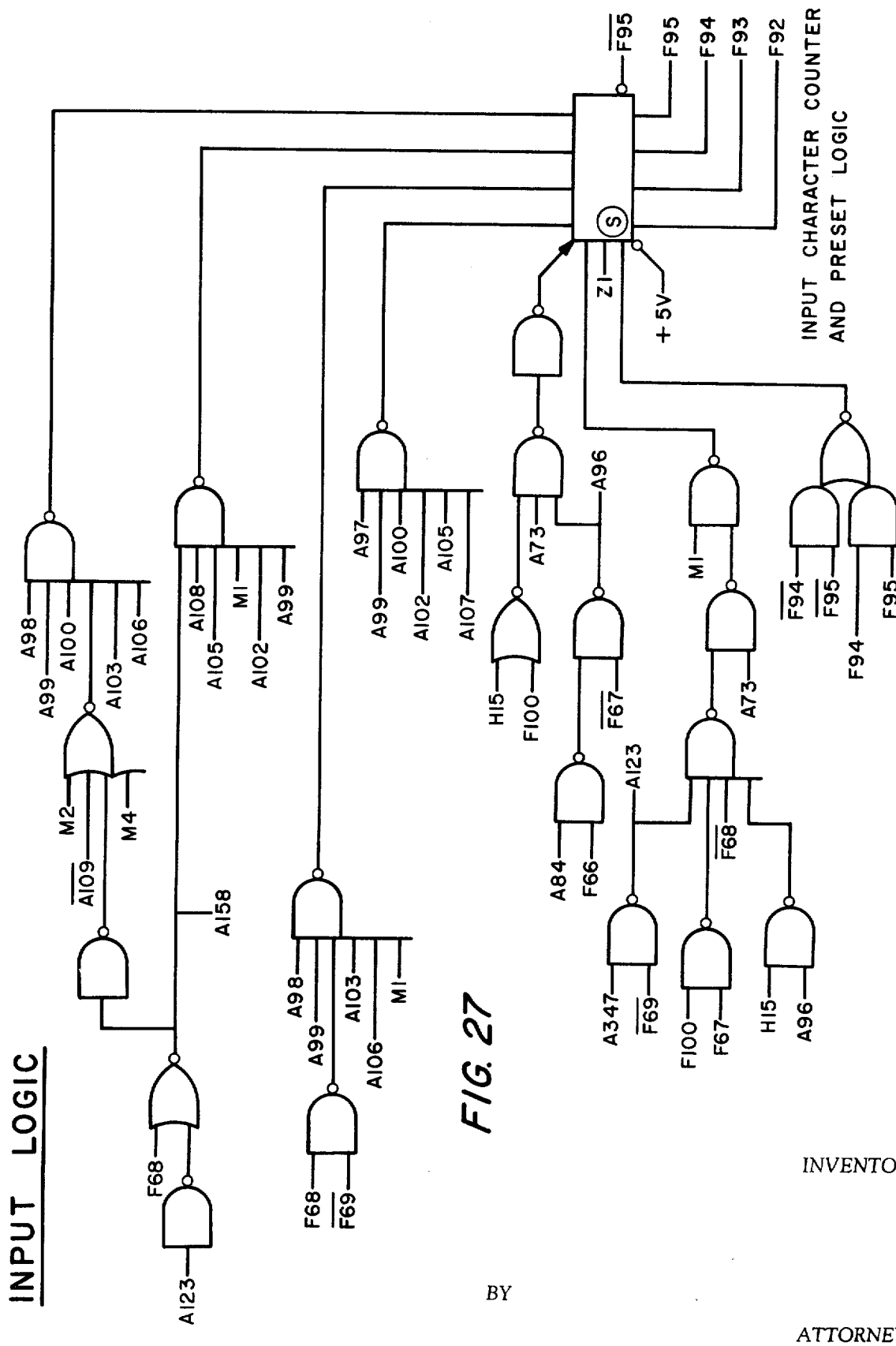
Figure 28:
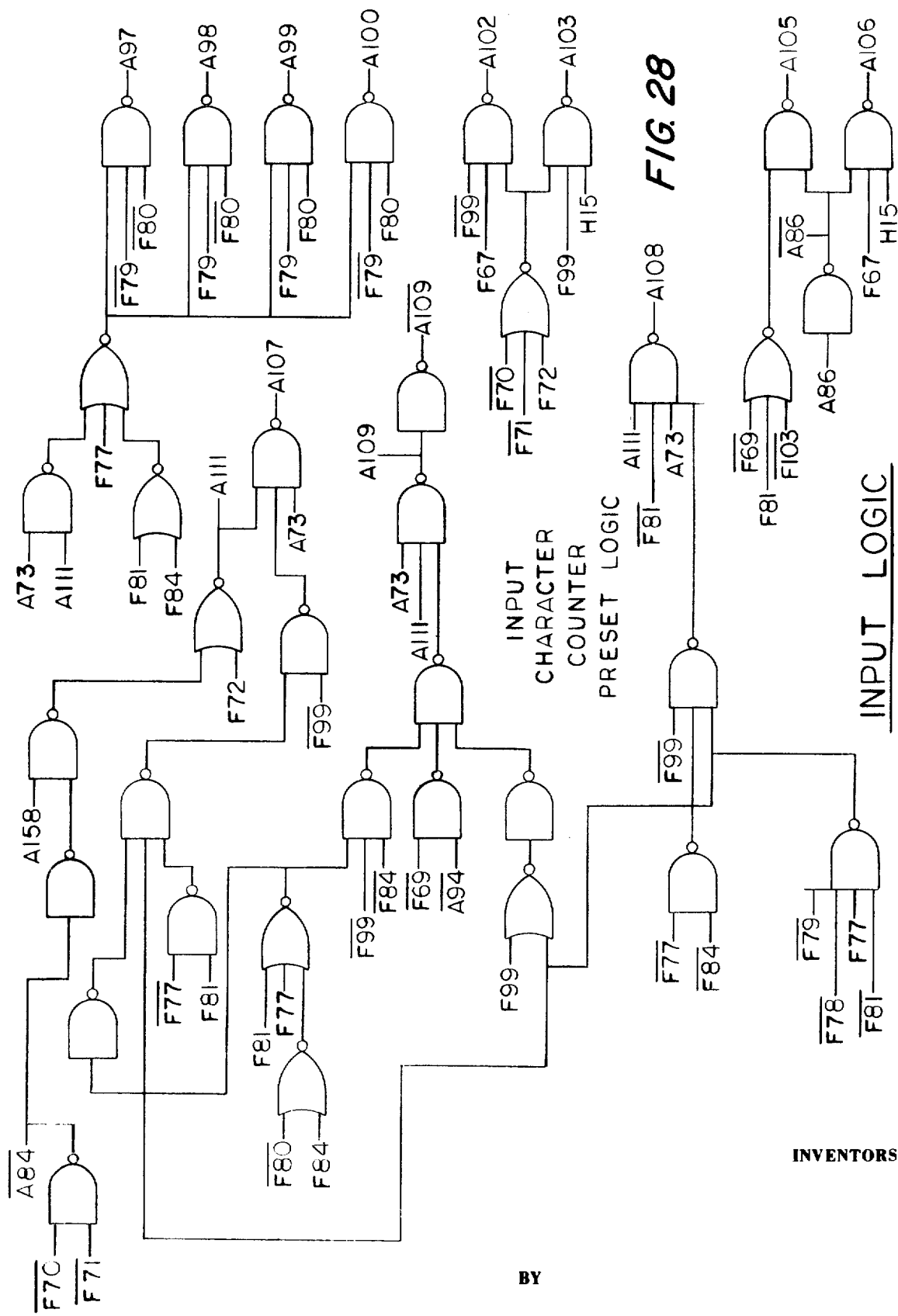
Figure 29:
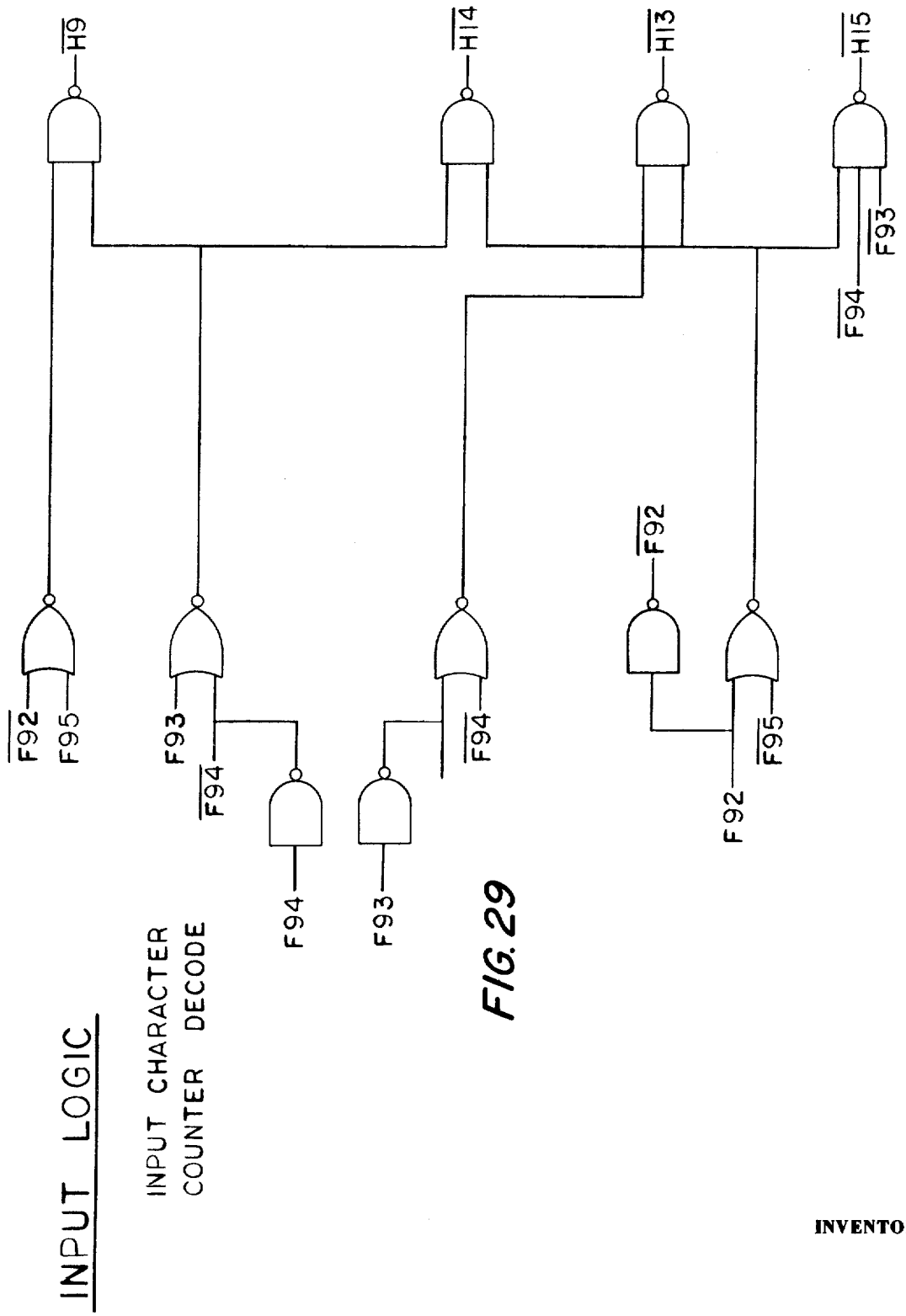
Figure 34:
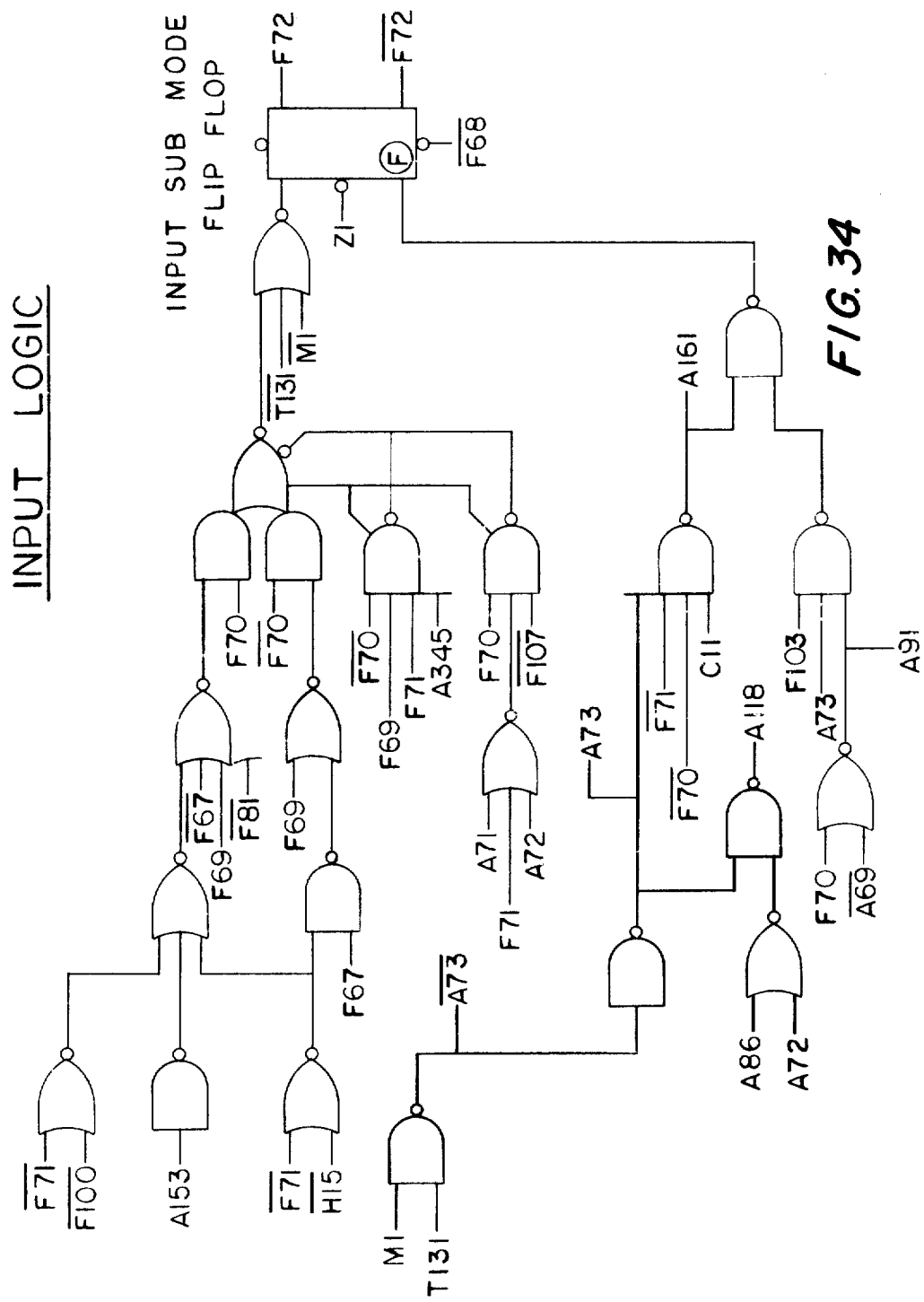
Figure 37:
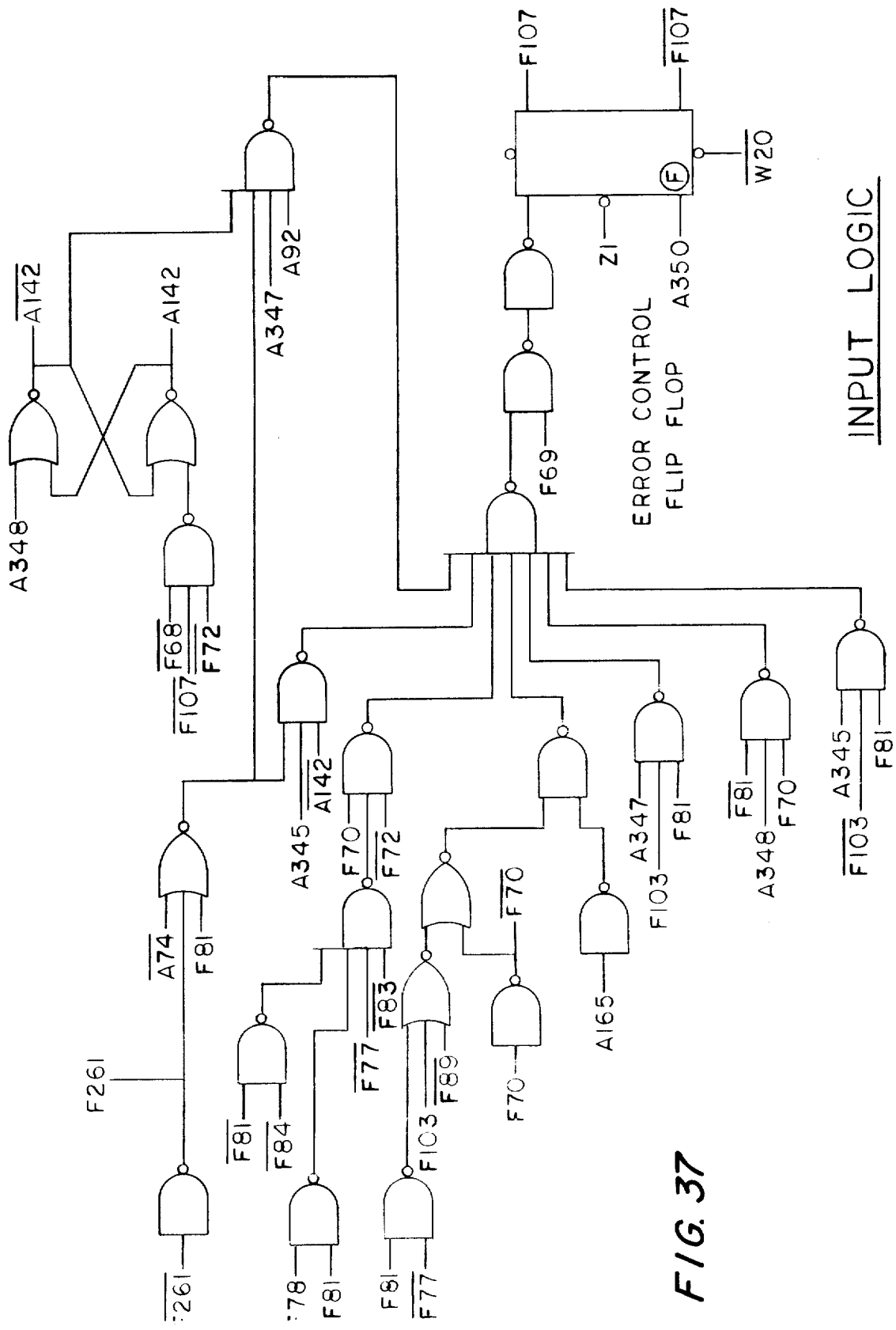

FIGS. 24 and 25 illustrate an input sequence control and auxiliary input control which come within the scope of the input control block 44 of FIG. 4. The input sequence control includes an input character counter having flip-flops F92 – F95, an input character counter preset, an input bit counter having flip-flops F96 – F98, an input character ready flip-flop F66, an input shift control flip-flop F67, and an input submode counter having flip-flops F70–F72. The auxiliary input control includes an error control having flip-flops F104, F105, F107, and F68, and additional flip-flops F100, F103, and F261. The following tables illustrate the relationship of the output signals H1 – H15 of the character counter to signals F92 – F95 from the flip-flops of the same name and illustrate the signals of the bit counter for four and five bit characters.

CHARACTER COUNTER

| | | F92 | F93 | F94 | F95 |
|---|---|---|---|---|---|
| H | 1 | 1 | 0 | 0 | 0 |
| | 2 | 0 | 1 | 0 | 0 |
| | 3 | 0 | 0 | 1 | 0 |
| | 4 | 1 | 0 | 0 | 1 |
| | 5 | 1 | 1 | 0 | 0 |
| | 6 | 0 | 1 | 1 | 0 |
| | 7 | 1 | 0 | 1 | 1 |
| | 8 | 0 | 1 | 0 | 1 |
| | 9 | 1 | 0 | 1 | 0 |
| | 10 | 1 | 1 | 0 | 1 |
| | 11 | 1 | 1 | 1 | 0 |
| | 12 | 1 | 1 | 1 | 1 |
| | 13 | 0 | 1 | 1 | 1 |
| | 14 | 0 | 0 | 1 | 1 |
| H | 15 | 0 | 0 | 0 | 1 |

BIT COUNTER

| | Numeric (4) | | | Alpha (5) | | |
|---|---|---|---|---|---|---|
| | F98 | F96 | F97 | F98 | F96 | F97 |
| Bit 1 | 0 | 0 | 0 | 0 | 0 | 0 |
| 2 | 0 | 1 | 0 | 0 | 1 | 0 |
| 3 | 0 | 1 | 1 | 0 | 1 | 1 |
| 4 | 0 | 0 | 1 | 1 | 0 | 1 |
| 5 | | | | 0 | 0 | 1 |

The logic associated with the input sequence control and the auxiliary input control is shown in FIGS. 27 – 41.

FIG. 42 illustrates further input portions of the system. The input register F61 – F65, F61 input gating, IR funnel, keyboard decode, and keyboard control may be considered as within the scope of input control 44 of FIG. 4.

Figure 52:
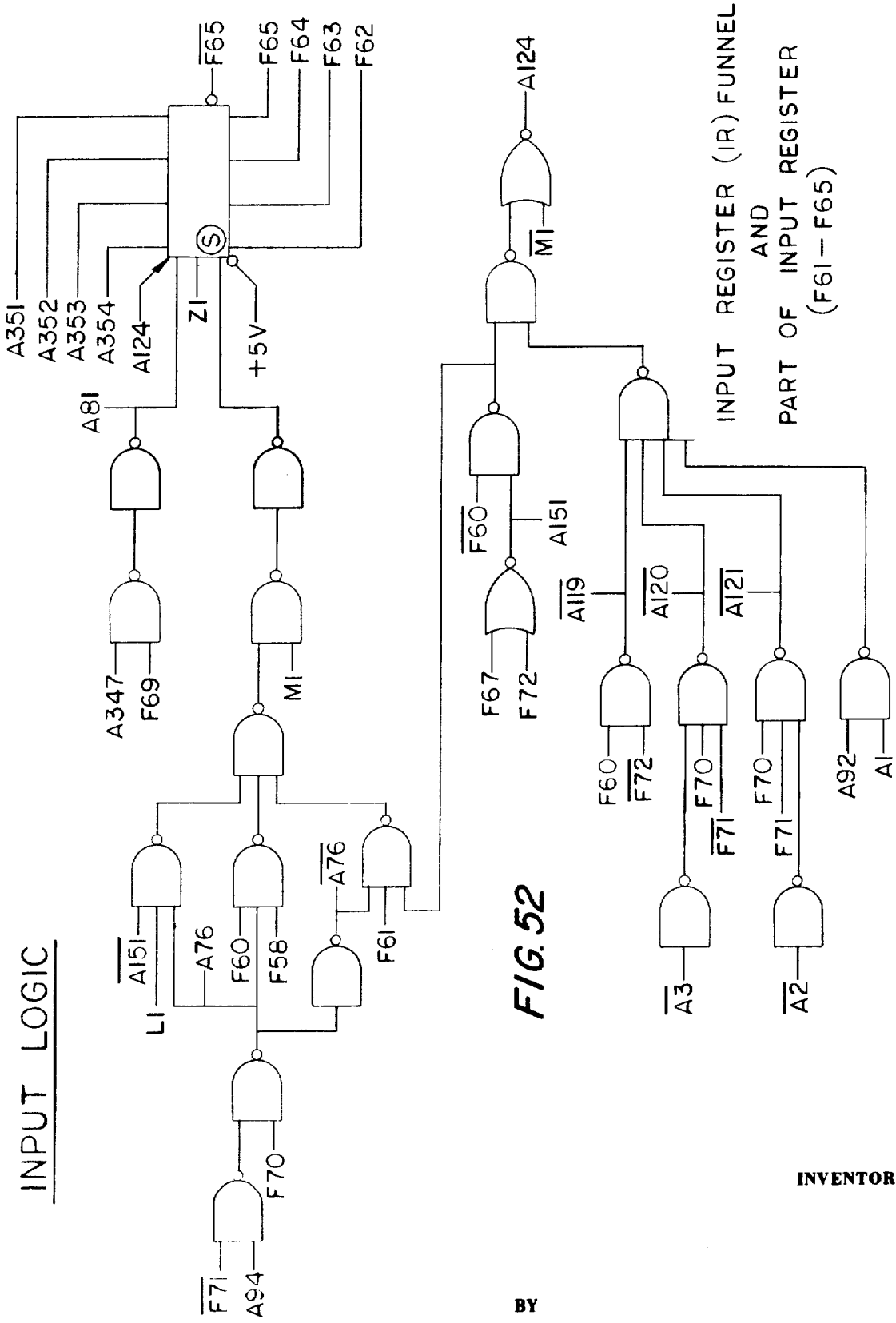

In the exemplary form of the invention, characters are first assembled in the input register, four bit characters from the bit sync (F58) being assembled in stages F62 – F65 and five bit characters being assembled in stages F61 – F65. Similarly, four bit characters from the keyboard are assembled in stages F62 – F65 after decoding in the keyboard decode under the control of the keyboard control. FIGS. 51 and 52 illustrate the input register logic and IR funnel logic. The keyboard, the keyboard control (selector, etc.) and keyboard decoder are illustrated in FIGS. 62 – 72. The signal K14 in FIG. 42 is produced whenever any key is depressed and may be referred to as the keyboard common signal. The connection from keyboard control to keyboard decode designates a group of decoded signals representing the special function keys $, Error and Enter. These special functions are not entered into the input register, but rather act directly upon the input sequence control logic.

Figure 53:
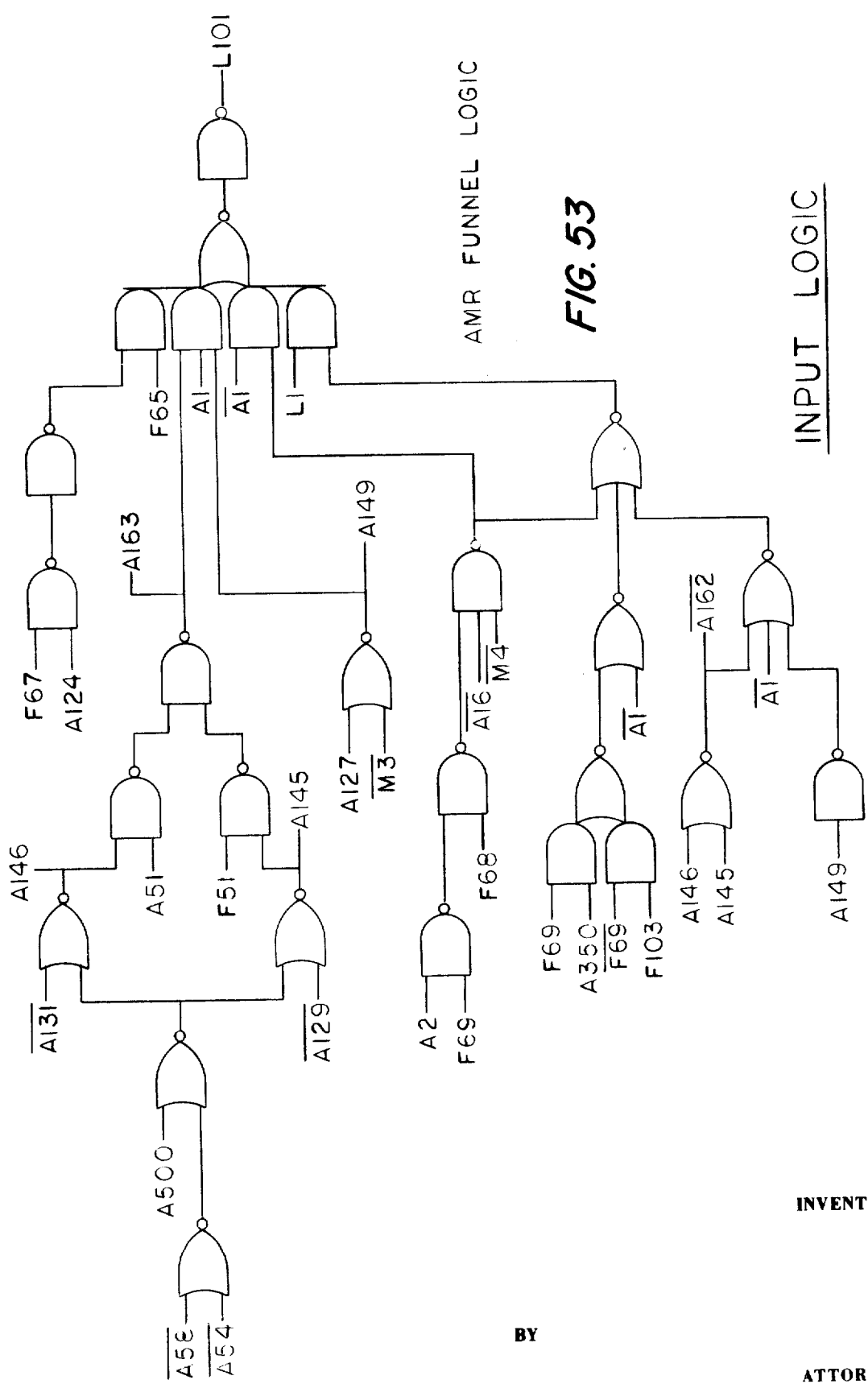

FIG. 42 also illustrates the active message register, which is shown as comprising a 128 bit register and a four bit register (total 132 bits) in order to provide an early four bit tap (signal L11) for use in the execute unit. As shown, the dynamic AMR may circulate from the output of AMR-2 directly to the input of AMR-1 via the AMR funnel, or through the F61 input gating, the IR funnel, and the input register, or the IR funnel and input register, depending upon the condition of the gating logic. The last-mentioned path is used when it is desired to shift the position of data within the AMR. The AMR control 46 of FIG. 4 comprises the AMR funnel of FIG. 42. The AMR funnel logic is illustrated in FIG. 53.

The parity/address, preamble, LSD (X-character), and NLSD (Y-character) registers are illustrated in FIGS. 43 – 46 and are comprised of the flip-flops shown. It is apparent that all of these characters are first assembled in the input register and are then inserted in their respective registers. The logic associated with these registers is illustrated in FIGS. 47 – 50.

Figure 54:
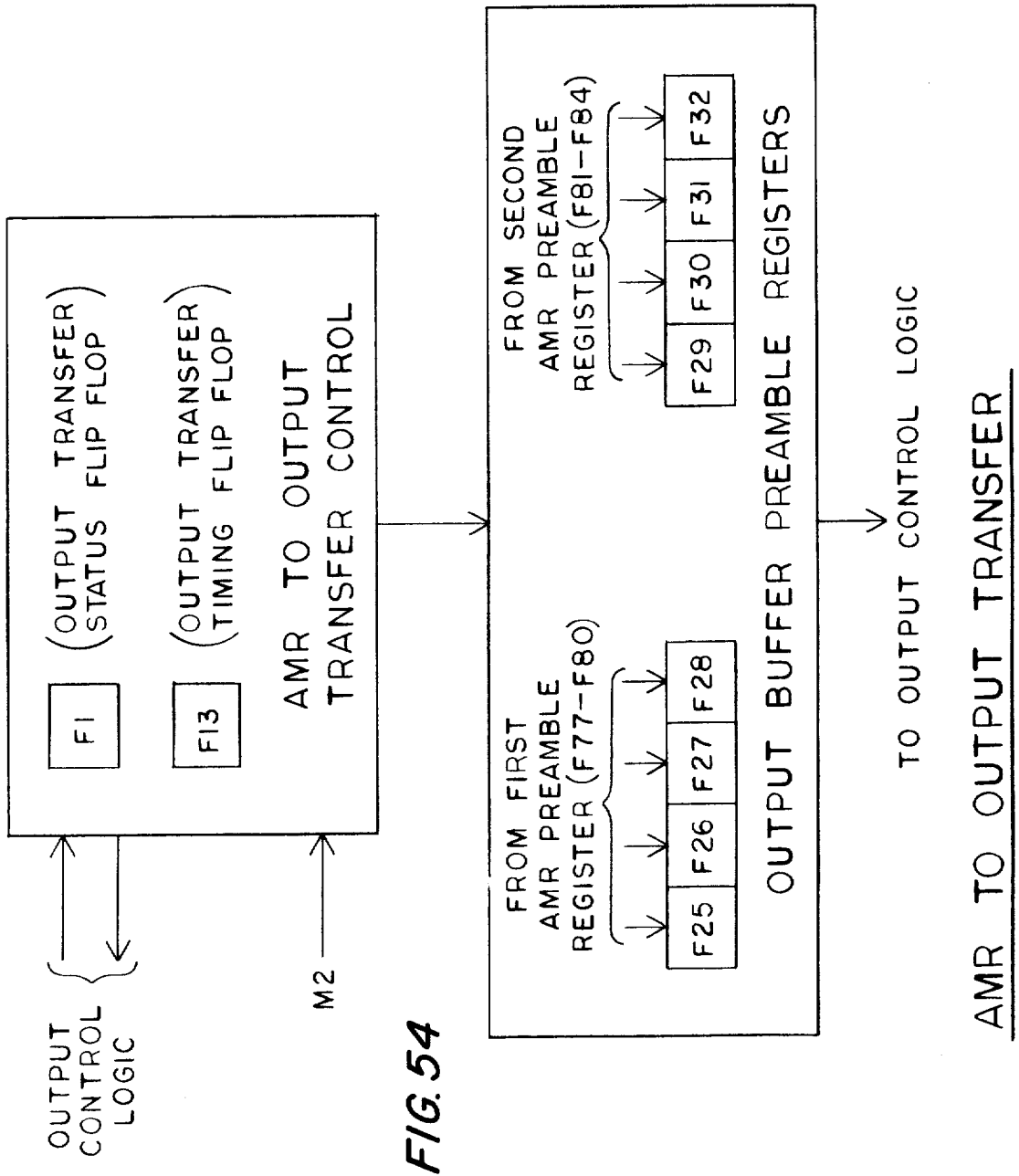
FIGS. 54 and 55 are block diagrams of output portions of the system.

FIG. 54 illustrates the AMR to output transfer control corresponding to the transfer control 62 of FIG. 4). The output is shown generally by block 64 in FIG. 4 in order to stress the fact that the invention is not restricted to particular output circuitry. However, in the exemplary form of the invention the output includes the output buffer preamble registers of FIG. 54, and the output control logic, buffer funnel, and output buffer of FIG. 55. The output buffer preamble registers comprise the flip-flops shown, and the message preamble characters are transferred from the preamble registers associated with the AMR to the corresponding output buffer preamble registers. As pointed out earlier, the preamble may control output operations, such as printing and editing, just as it controls other operations of the cash register. Output logic is shown in FIGS. 56 – 61. The output control may supply a conventional printer (not shown), such as Model ASR-33 Teletype printer controlled by conventional logic including, for example, a parallel to serial converter and certain editing controls. The printer motor advances paper from a supply roll as characters are printed thereon to constitute the transaction document or sales slip. It is preferred that at least two sheets of paper be advanced and printed, one of which remains in the machine as a permanent journal.

Figure 76:
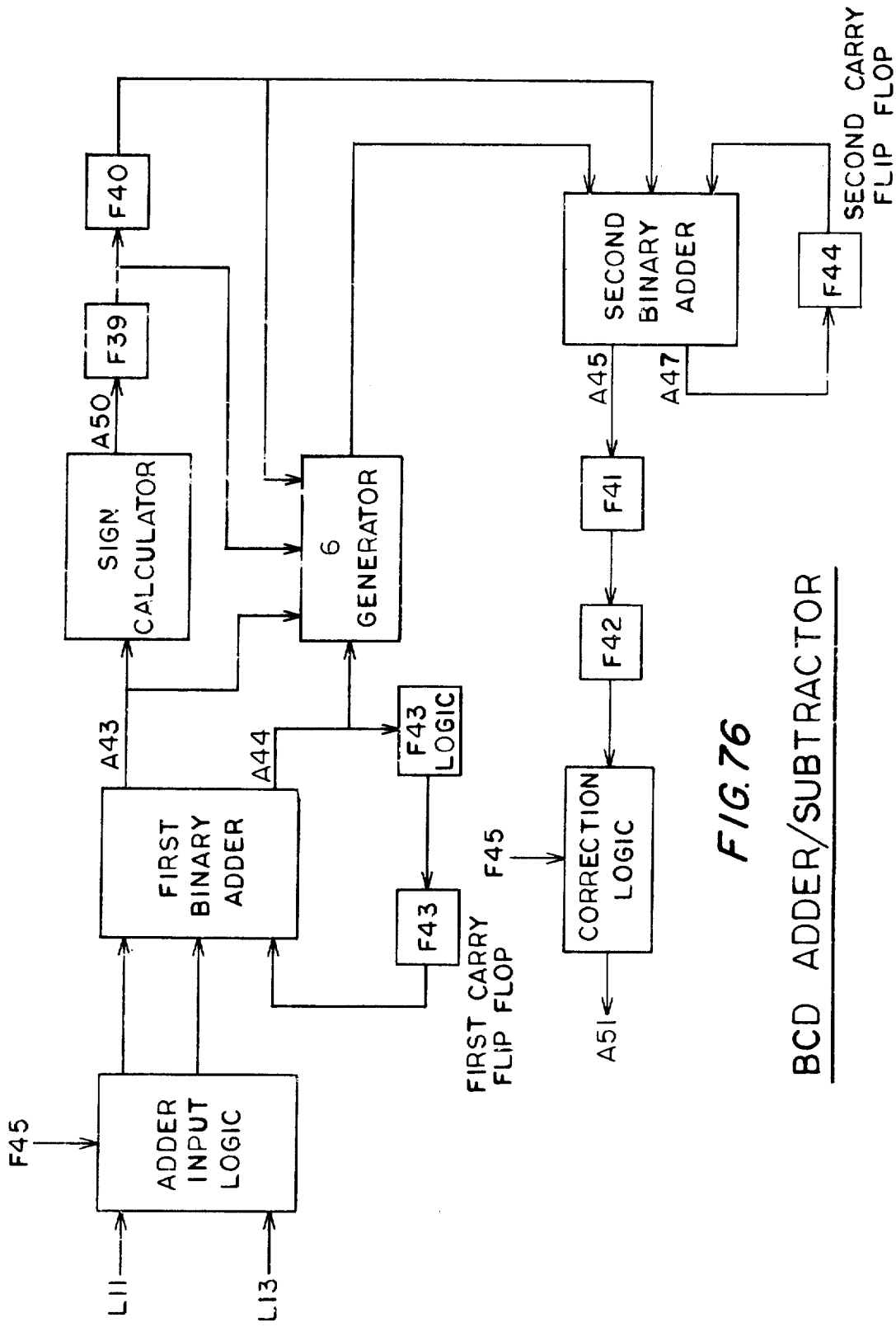
Figure 77:
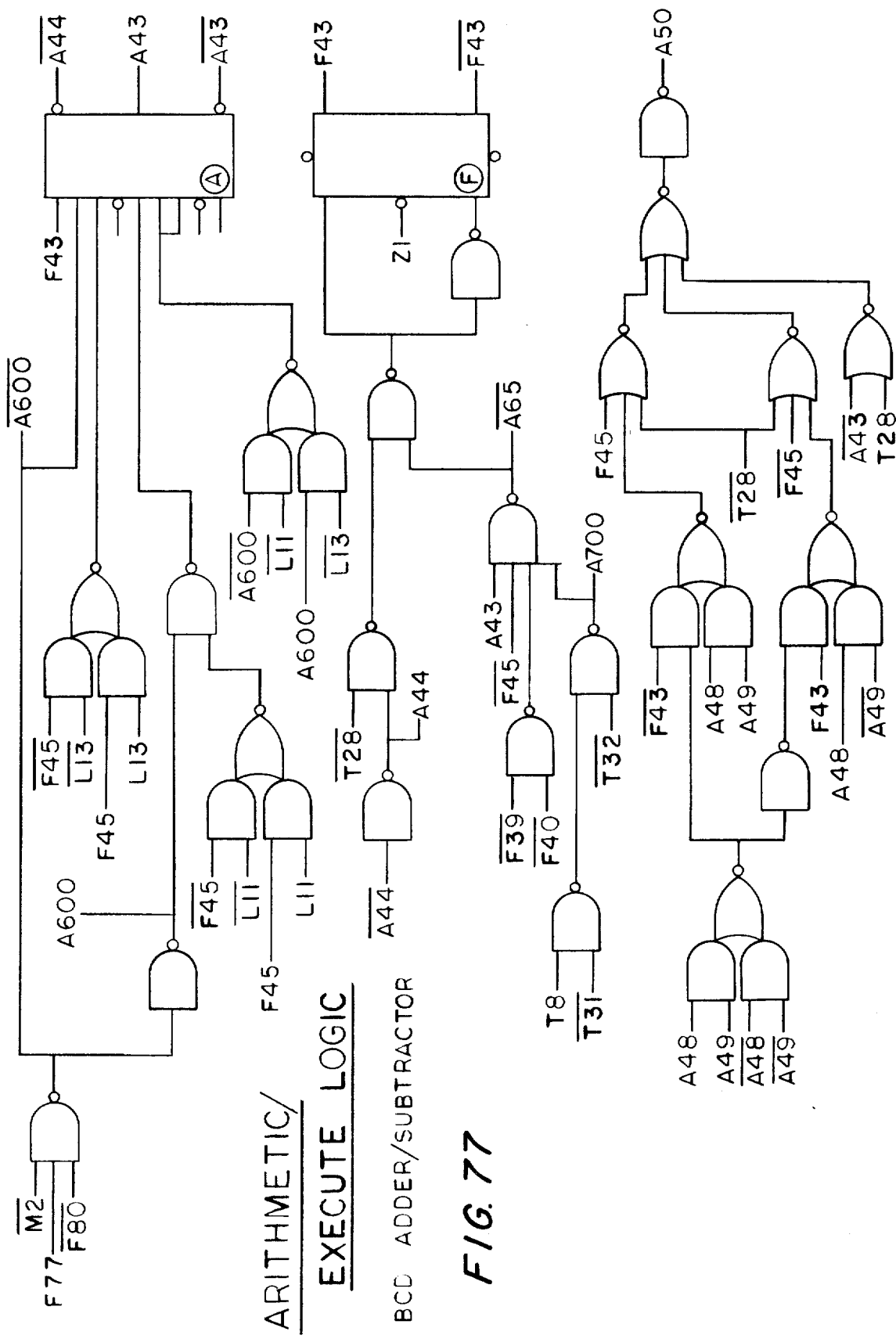
Figure 78:
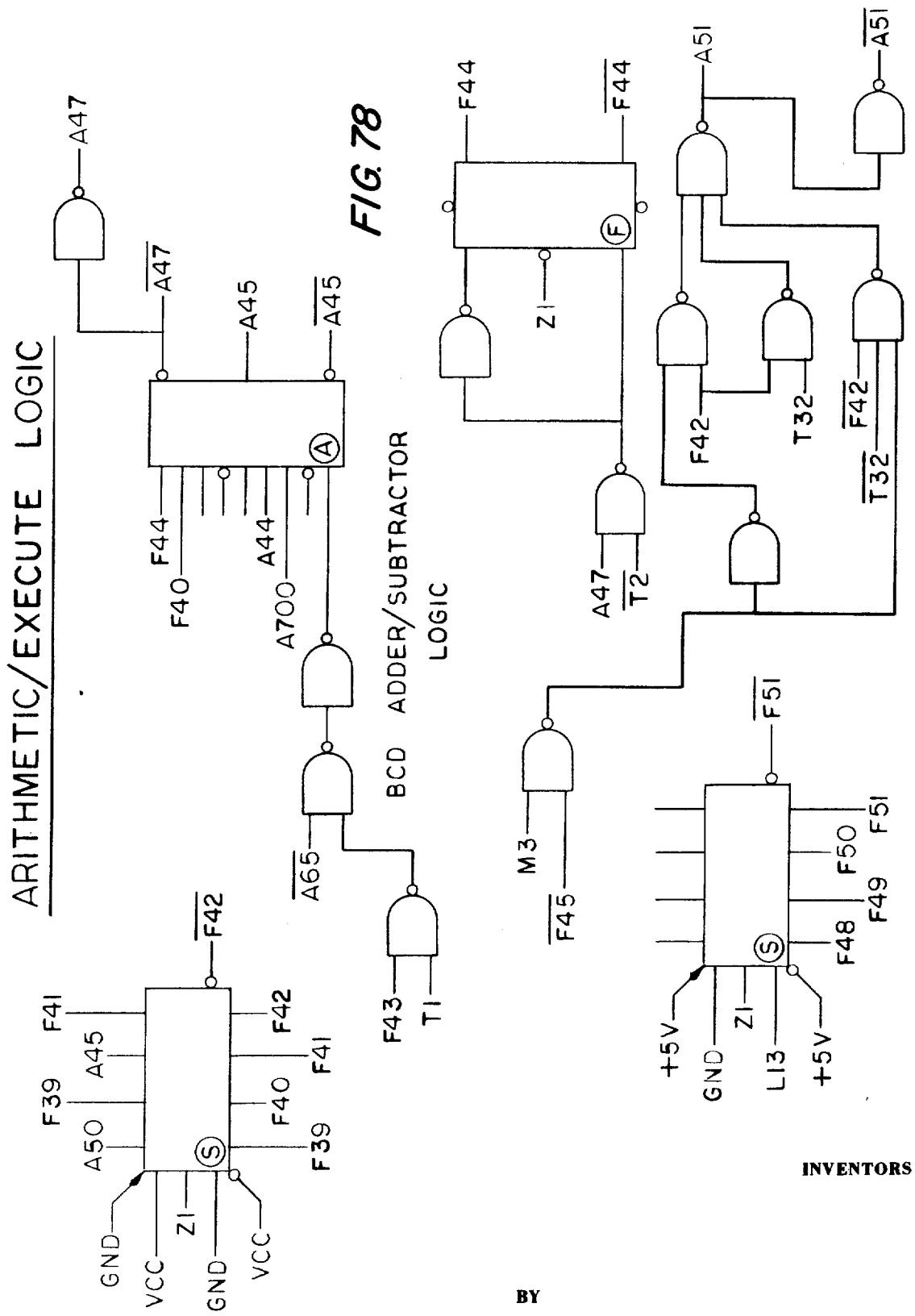
Figure 79:
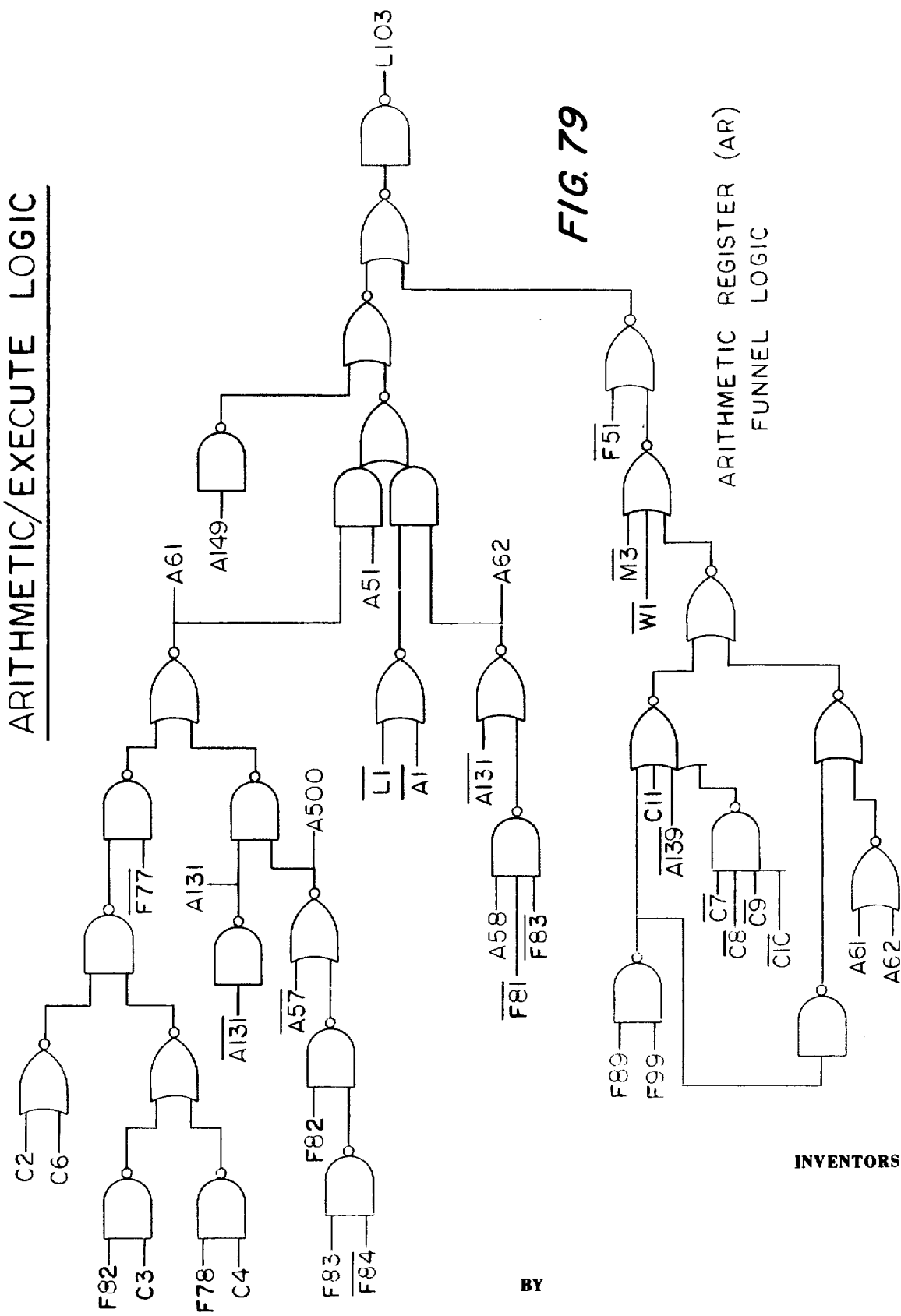
Figure 84:
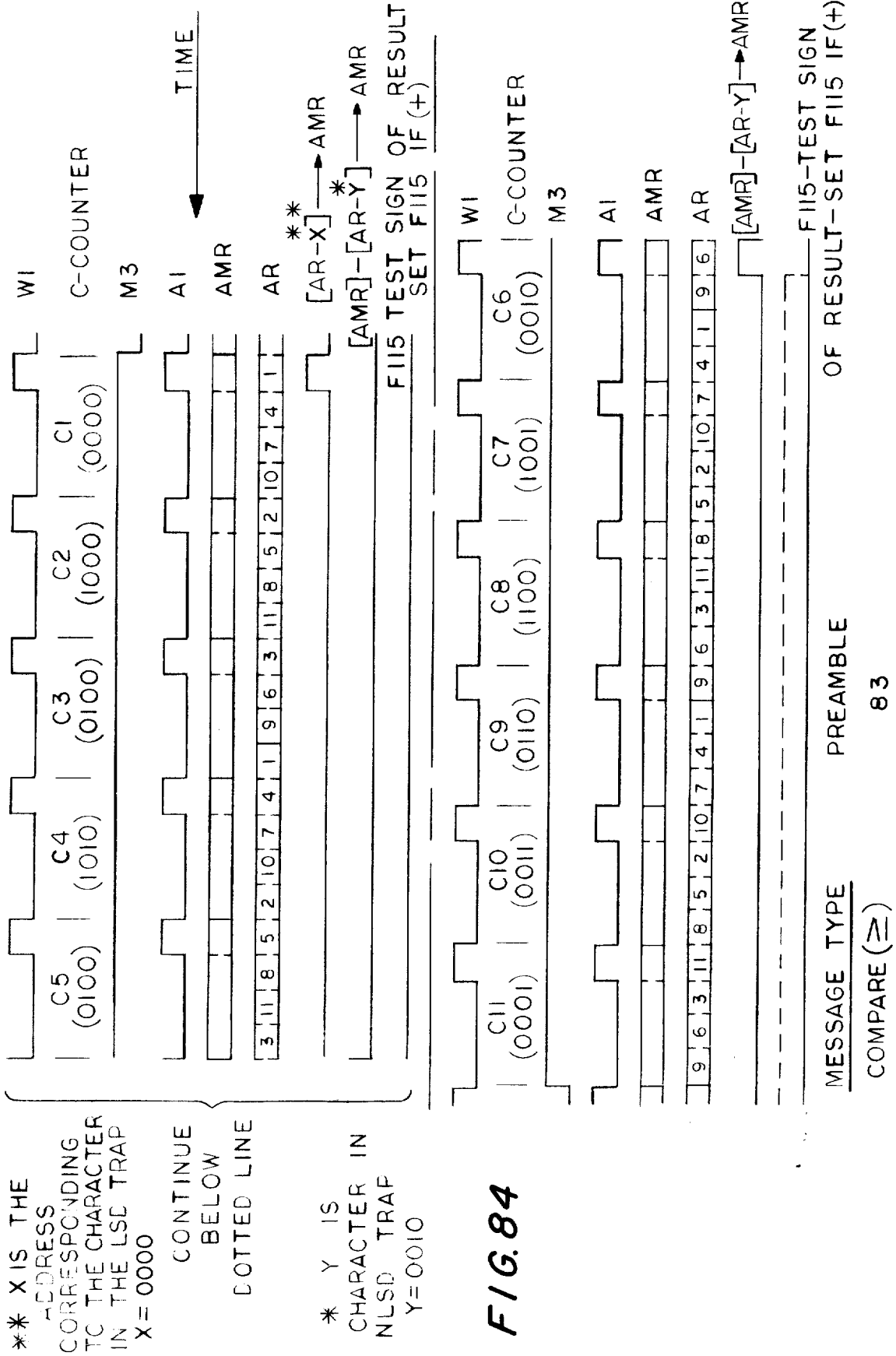
Figure 86:
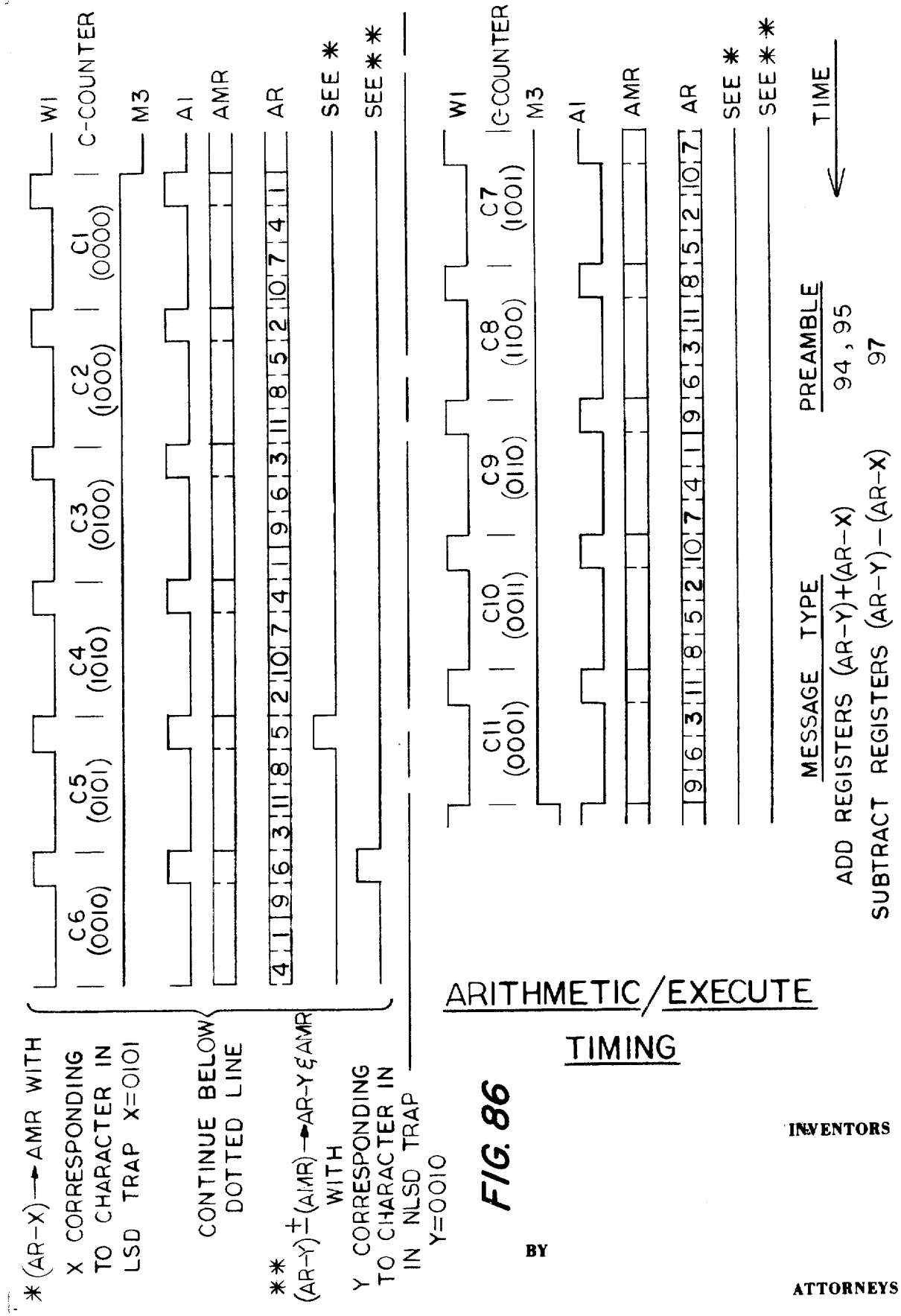

FIGS. 73 and 76 illustrate a typical execute (arithmetic) unit corresponding to the unit 58 of FIG. 4. It is to be understood, however, that the construction of the execute unit depends upon the data processing operations to be performed by the cash register. Thus, if it is desired to perform operations such as tax computations and discounts, the unit may comprise a conventional multiplier. In the form shown the execute unit includes an arithmetic register having a 359 bit portion followed by a four bit portion (flip-flops F48 – F51). These flip-flops constitute a continuation of the flip-flops of the 359 bit register (just as the flip-flops of the input register constitute a continuation of the flip-flops of the AMR). L13 is an early four bit tap for use in the BCD adder/subtractor, which also receives the signal L11 from the early tap of the AMR. The arithmetic register (AR) has an AR funnel supplying a signal L103. Circulation of the data of this dynamic register is through this funnel as shown. The arithmetic register actually comprises eleven 33 bit registers (or fields) specified by four bit addresses as in the following table:

AR ADDRESSES

| AR-1 | 0000 |
| AR-2 | 1000 |
| AR-3 | 0100 |
| AR-4 | 1010 |
| AR-5 | 0101 |
| AR-6 | 0010 |
| AR-7 | 1001 |
| AR-8 | 1100 |
| AR-9 | 0110 |
| AR-10 | 0011 |
| AR-11 | 0001 |

Certain registers are usually employed as customer registers and others to contain grand totals. As shown in FIGS. 74 and 75, access to these registers is obtained by comparing the state of the C-counter (which repetitively specifies the address of the arithmetic registers) with the four bit character of the LSD trap or the NLSD trap. These comparators were shown earlier in FIGS. 17 and 18.

Also associated with the arithmetic unit are the flip-flops F115, F128, F126, and F45 of FIG. 73. F45 controls addition/subtraction. F115 is actuated by instruction code No. 9 (previously referred to). If AR-6 is positive, the next instruction code is skipped. "Fetch and skip" command produces a similar operation. The purposes of F128 and F126 will appear later.

The BCD adder/subtractor employed in the adding and subtracting operations performed by the execute unit is shown in FIG. 76. The logic of FIGS. 77 – 83 supplements the block diagrams of FIGS. 73 and 76, but any conventional unit which performs operations such as addition and subtraction may be employed in the system of the invention. Typical arithmetic operations will be described later, some in conjunction with the timing diagrams of FIGS. 84 – 87.

Figure 88:
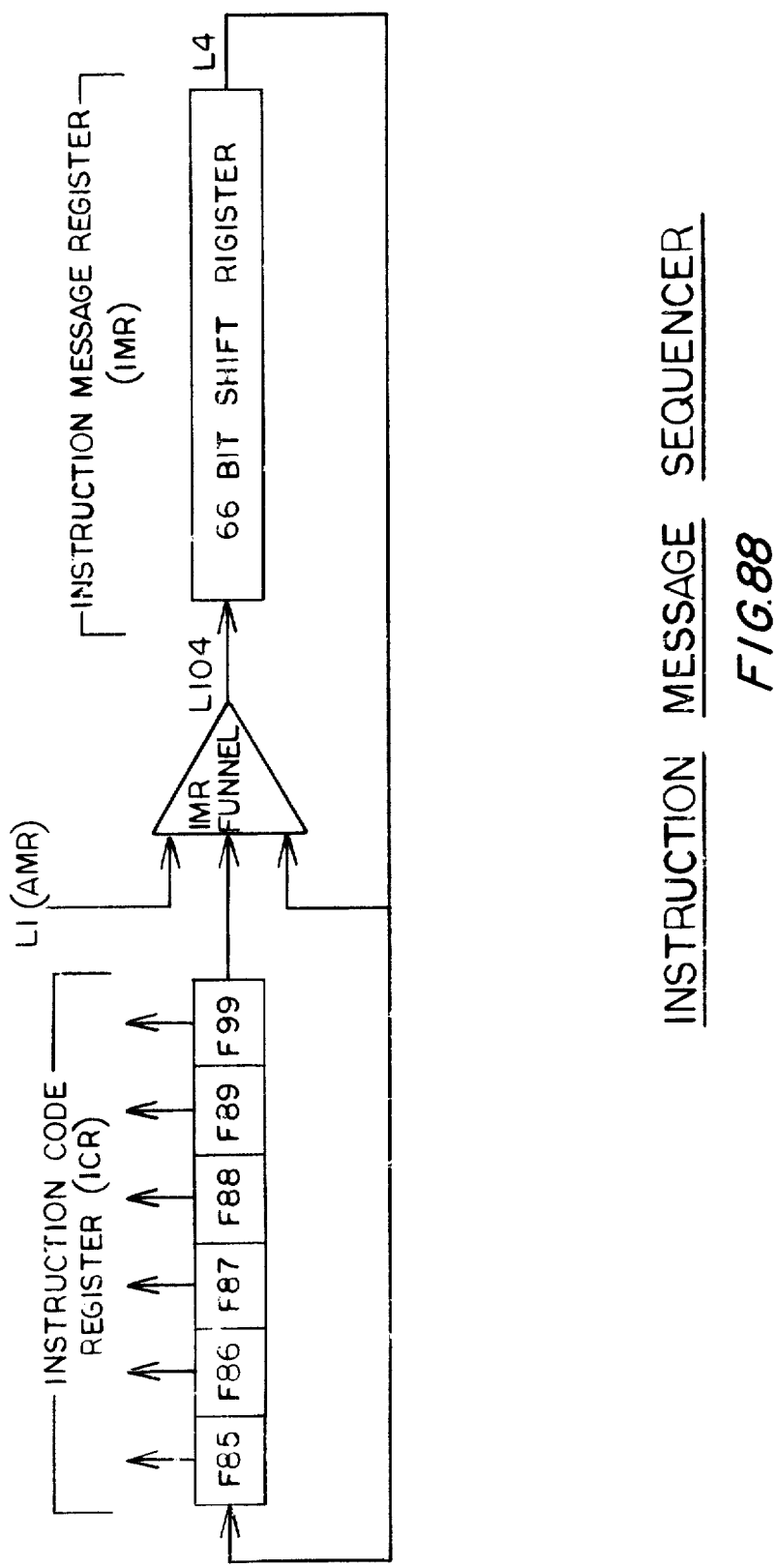
FIG. 88 is a block diagram of the instruction message sequencer.

FIG. 88 illustrates the instruction message sequencer 37 of FIG. 4. As shown, this unit comprises a 66 bit instruction message register (IMR), the flip-flop chain thereof being associated with an instruction code register (ICR) comprising flip-flops F85 – F89 and F99. The data of the IMR circulate through an IMR funnel or through the stages of the ICR. Supporting logic is shown in FIGS. 89 and 90. As will be seen hereinafter, 66 bit instruction messages are inserted in the IMR and 6-bit codes thereof are shifted one at a time to the ICR for implementation.

As shown in FIG. 4, panel lights 56 are associated with the instruction message sequencer 37 (as well as the X-character unit 52). The lamp driver and driver logic are illustrated in FIGS. 92 – 109.

Figure 110:
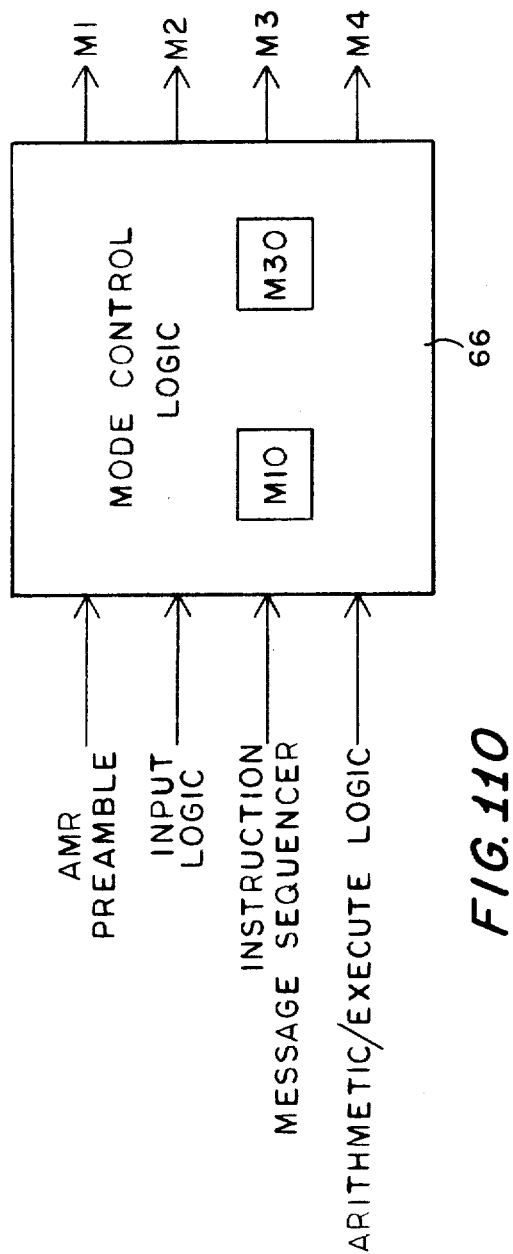
FIG. 110 is a block diagram of the mode control unit.
Figure 111:
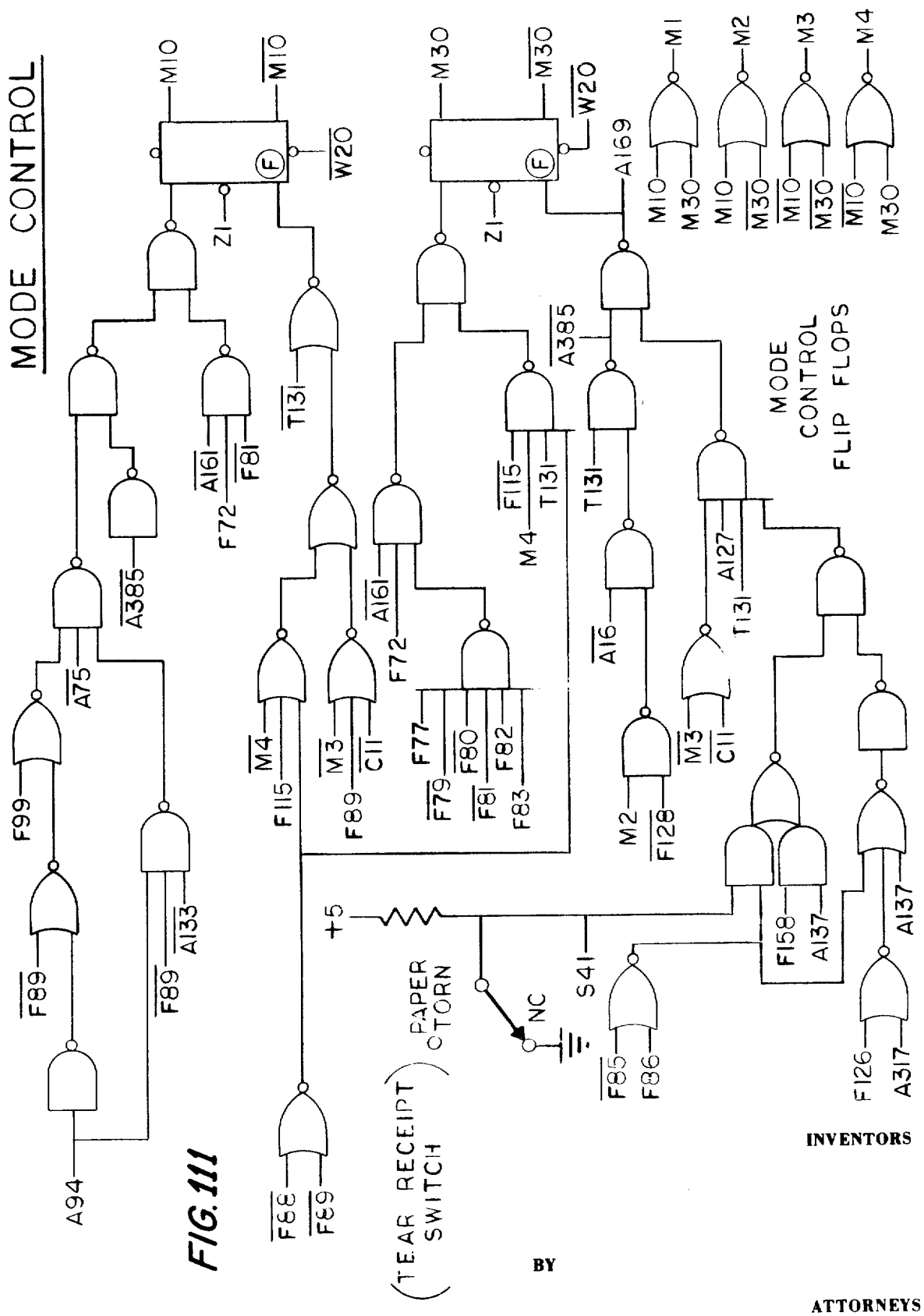
FIG. 111 is a logic diagram supplementing the block diagram of FIG. 110.
Figure 112:
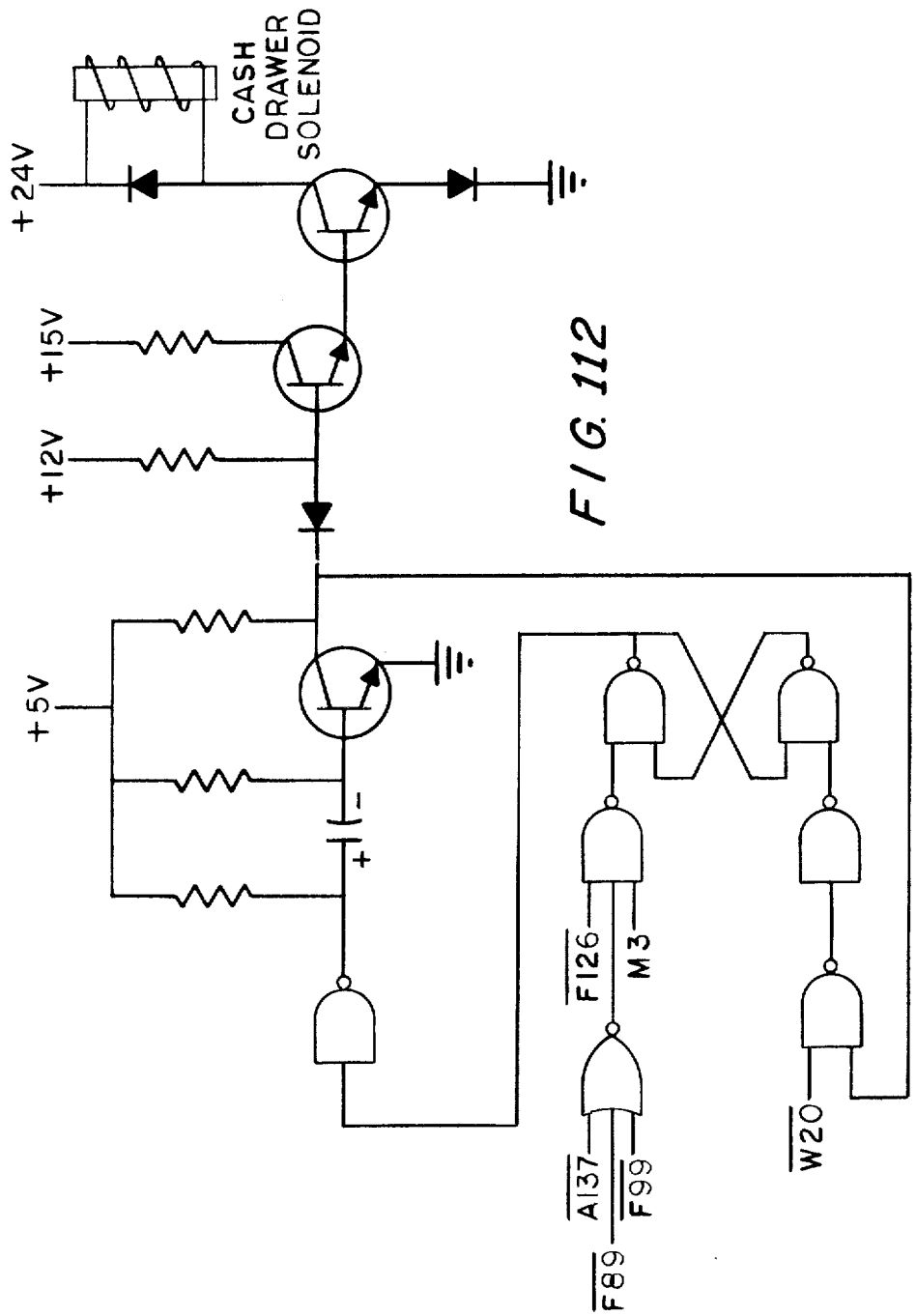
FIG. 112 is a logic-schematic diagram of the cash drawer solenoid and driver.
Figure 126:
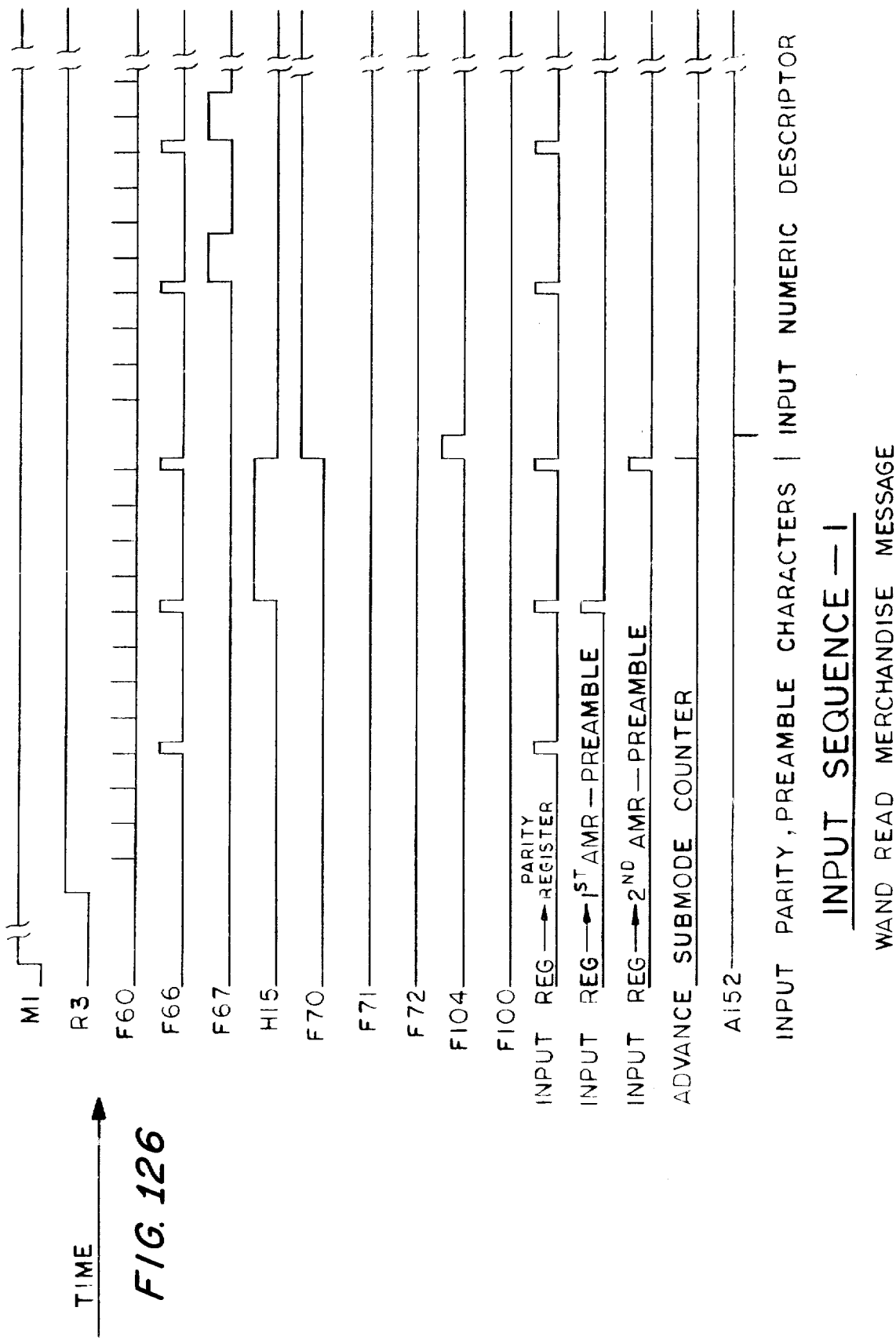
Figure 127:
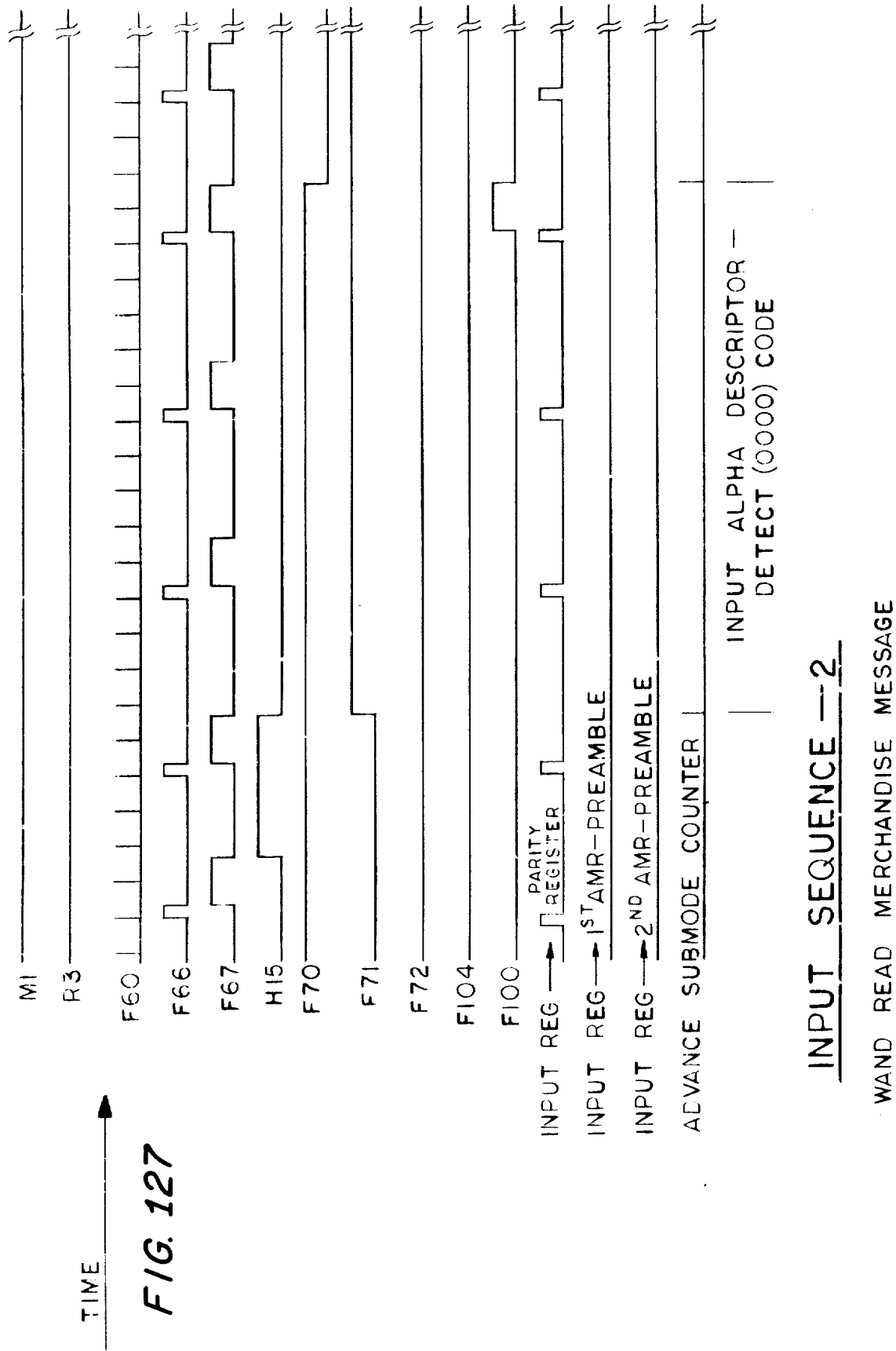
Figure 128:
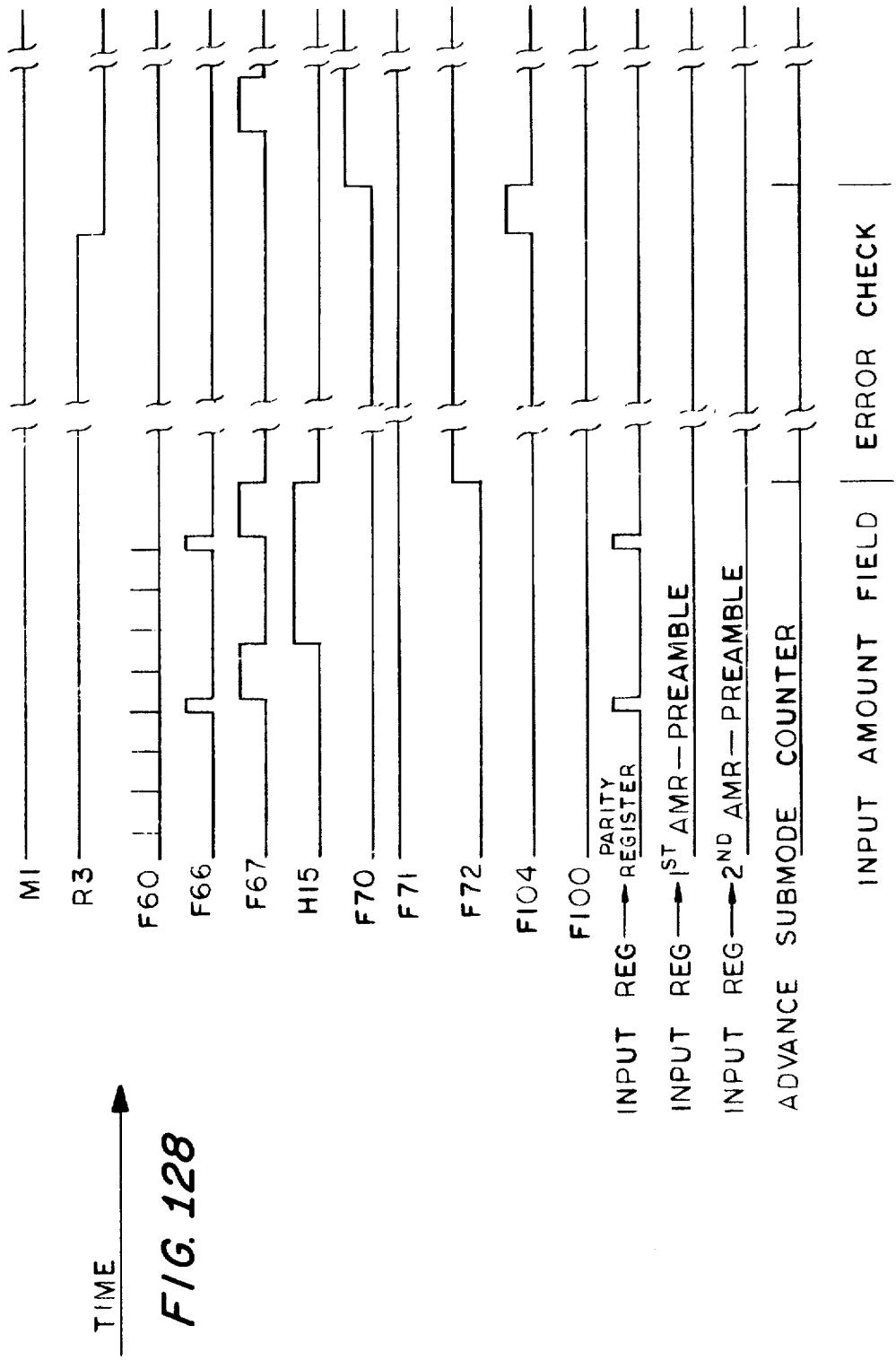

As also stated earlier, the cash register system of the exemplary embodiment of the invention has four operating modes M1– M4 provided by a mode control unit 66, which as shown in FIG. 110 comprises flip-flops M10 and M30. The mode control logic is shown in FIG. 111. A full discussion of the operation of the mode control unit will appear hereinafter.

Figure 26A:
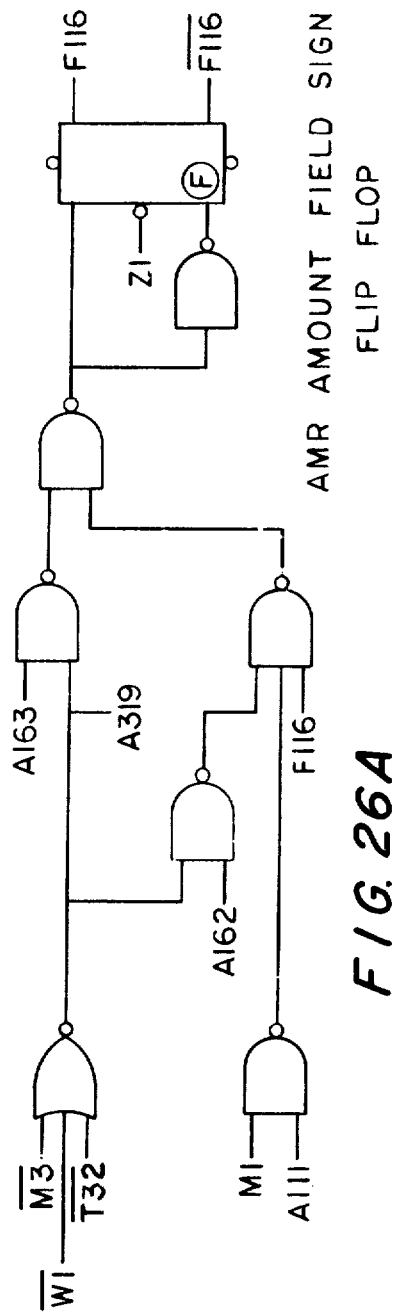
FIG. 26A is a further logic diagram concerned with this portion.

Miscellaneous portions of the system of the invention, including the cash drawer release solenoid and driver, drawer switch, etc. are illustrated in FIGS. 112 – 125. Reference will also be made later to the logic diagrams of FIGS. 26 and 26A concerned with the AMR amount field sign. It should be mentioned that signal W20, which appears in the logic, is merely a warm-up signal which monitors the power supply and goes low when the supply reaches normal level.

As stated above, the operating modes M1, M2, M3, and M4 of the cash register system are specified by the states of two flip-flops M10 and M30 (FIGS. 110 and 111). The following chart gives the states of these flip-flops:

|    | M10 | M30 |
|----|-----|-----|
| M1 | 0   | 0   |
| M2 | 0   | 1   |
| M3 | 1   | 1   |
| M4 | 1   | 0   |

Certain mode rules are established which determine which mode the system enters in leaving any other mode. It will be apparent that the mode rules are a function of the existing mode, the preamble in the preamble register, and the state of the instruction code register (FIG. 88). The rules are as follows:

From M1 to M2 — any message preamble, where F81 is set

M1 to M3 — any message preamble, where F81 is not set

M1 to M4 — "fetch" message preamble only

M2 to M1 — F99 not set and message in AMR is not an instruction message and the message in the AMR is an alpha message (or F89 is not set and and instruction code in ICR is general scan items and services)

M2 to M4 — F99 is set, or the message in AMR is an instruction message, or message in AMR is not an alpha message and F89 is set (or instruction code in ICR is not general scan items and services)

M3 to M2 — when F89 and F99 are not set at the end of mode M3

M3 to M4 — when F89 and F99 are set at the end of M3

M4 to M1 — when F88 and F89 are not set 2. non-merchandise fee message, or
3. command message ("fetch" and "skip and fetch" not included).

M3 to M4 — after terminating execution of a housekeeping instruction code

EXIT FROM M4

M4 to M1 — the new instruction code calls for a new message input from either wand or tape loop M4 to M3 — the new instruction code is a housekeeping code.

The input mode M1, comprises eight submodes determined by the state of the flip-flops F70 – F72 of the input submode counter (FIG. 24). The following table relates the submodes to the flip-flop signals and summarizes the functions of the submodes:

INPUT SUBMODE COUNTER

| Submodes | F70 | F71 | F72 | |
|---|---|---|---|---|
| 1 | 0 | 0 | 0 | enter parity/address & 2 preamble characters |
| 2 | 1 | 0 | 0 | enter numeric/descriptive and field (e.g., SKU) |
| 3 | 1 | 1 | 0 | enter alpha |
| 4 | 0 | 1 | 0 | enter amount |
| 5 | 0 | 1 | 1 | check errors |
| 6 | 1 | 1 | 1 | justify alpha |
| 7 | 1 | 0 | 1 | justify numeric/descriptive |
| 8 | 0 | 0 | 1 | shift instruction message into IMR (in any event wait for C11, T131) |

M4 to M3 — when F88 and F89 are set.

The exit rules from the various modes may be stated otherwise as follows:

EXIT FROM M1

M1 to M2 — message read and accepted is:
1. an employee or an account identification number, or
2. an instruction message M1 to M3 — message read and accepted is:
1. a merchandise message, or
2. non-merchandise fee or credit, or
3. a command message ("fetch" excluded)

M1 to M4 — message read and accepted is:
1. "fetch", or
2. "skip and fetch"

EXIT FROM M2

M2 to M1 — message transferred to output was:
1. all alpha input via the wand or
2. a merchandise, non-merchandise fee or credit, or command message; input via the wand in response to a general scan items and services instruction message M2 to M4 — message transferred to output was:
1. read from tape loop, or
2. an instruction message, or
3. an employee/account identification number read via the wand in response to a scan employee/account identification code, or
4. a command or non-merchandise input via the wand in response to an instruction code calling for input of a specific command or non-merchandise fee message preamble [used in tax and discount operations]

EXIT FROM M3

M3 to M2 — after terminating execution of a:
1. merchandise message, or

During the first submode, the parity/address and preamble characters are entered into their registers, but before characters can be entered, they must be synchronized and assembled. Referring to the bit sync unit 40 of FIG. 19, when a clock Z2 appears from the playback unit 38 (in response to R5), F59 is set, and if the data from the playback at the same time is a "one", F58 is simultaneously set (otherwise F58 is not set). Once F59 is set, F60 sets upon the next system clock pulse Z1 and resets F59 immediately. See FIG. 23. On the next system clock pulse Z1, the state of F58 is shifted into the input register (FIG. 42), starting with flip-flop F62 or flip-flop F61, depending upon whether the character being entered is a four- or a five-bit character. The first three characters are, as stated previously, four-bit characters (the combination of preamble and submode informs the logic whether four-bit or five-bit characters are being entered). At the same time that F58 is applied to the input register, F60 is reset. Thus F60 remains set for only one bit length. Successive bits of each character are synchronized and inserted into the other flip-flops (F62 – F65) in this manner, each bit moving to the right as the next bit is entered.

The input bit counter (FIG. 24) counts the bits, and the input character counter counts the characters. F66 is set when all of the bits of an input character have been inserted in the input register, as determined by the bit counter, and informs the logic that the character is ready to be shifted out of the input register. The input submode counter informs the system as to the part of the message being entered. This permits the four bits of the input register to be transferred into the parity/address register or one of the preamble registers at the proper time. When a message is entered from wand or tape loop, three initial characters are expected (parity/address and two preamble characters). Hence, the input character counter is preset to three. The depression of a key on the keyboard presets the input character counter to two, however, because there are no parity/address characters from keyboard.

After the second preamble character has been entered, the input submode counter goes to the second submode. At the same time F104 of the error control (FIG. 25) is set, and if the input is from wand, the "grey" bit is sought. If the "grey" bit is present, F104 is reset. If a data clock Z2 is present while F104 is set, then the "grey" bit is not present, and F105 is set, indicating an error. When F105 is set, F68 sets at the beginning of the next AMR cycle and stays set for one whole cycle. During that time, the input submode counter returns to the first submode, resets the input character counter to look for three characters again, and initializes the AMR.

The AMR is initialized whenever the input submode counter goes to the first submode. This is accomplished by setting the amount field A1 of the AMR to all zeros and the other fields (A2 and A3) to all ones. As will be seen presently, all ones defines an illegal character. This facilitates justification of certain AMR fields, which will be described later. The AMR is always initialized when mode M1 is entered from mode M2 or Mode M4.

During the second submode, either numerical or alpha characters are entered, the latter only in the case of an all-alpha message. The preamble, which has already been entered in the preamble registers, informs the system whether to expect four-bit or five-bit characters and thus states whether to use the first stage, F61, of the input register or not. During the second submode, data will be entered into the field A3 of the AMR.

During the setting of characters into the AMR, F66 remains set until T131. F67 is set and remains set for one cycle of the AMR. During that time the contents of the AMR are circulated through the input register (by control of the IR funnel and the AMR funnel), but only during the time of the particular field of interest. The other two fields will recirculate through the AMR funnel without going through the input register. F67 is employed only when inserting information into the AMR. When F67 is reset, at the end of the AMR cycle, the input character counter is advanced. When the input character counter reaches the count H15, the end of the field A3 is also reached, the input character counter having been preset by the input character counter preset to a value dependent upon the number of characters to be expected in that particular field. Presetting of the input character counter is accomplished when the input submode counter switches from submode 1 to submode 2.

When H15 is reached, the input submode counter switches to submode 3. During this submode the characters of the alpha field, A2, are assembled and entered in the AMR. At the beginning of submode 3 the input character counter is preset to 8, and it is assumed that eight characters will be entered during this submode. It will be recalled, however, that the alpha field of the message may be terminated prematurely by the presence of a special character, an AT sign, which may be designated by five zero bits. There is a gate in front of flip-flop F100 (FIGS. 25 and 26) that observes the input register and at the proper time (when a character is complete) determines whether the input register contains all zeros. If so, F100 is set, and the submode counter shifts to submode 4. In the absence of an AT sign entry of characters is complete when H15 is reached.

During the fourth submode four-bit numerics are entered in the field A1, which is always of fixed length. If entry is via wand or keyboard, seven digits are expected. If from tape loop, eight are expected. Zeros fill up the field when the useful digits are less than the numbers specified. When the input character counter, which has been preset to seven or eight characters, reaches H15, the fifth submode is entered.

During the fifth submode, there should be no further entry of data. If the message is from wand, the parity register is checked (FIGS. 43 and 47), and all of its flip-flops should show zeros. If the message is from tape loop (specified by the instruction code register) the four bits in the address register are compared with those in the instruction code register (FIG. 91 [on sheet with FIG. 41]). Unless the states of the registers are identical, the entire message will be rejected. F105 catches all errors, operating asynchronously, and if an error is detected, F105 is set. At the first T131 thereafter, F68 is set, remaining set for one AMR cycle, during which the AMR is initialized. The system thus returns to the first submode. As stated previously, the playback unit 38 produces a signal R3 indicating the presence of data. In the absence of an error, when this signal goes low, flip-flop F104 of the error control (FIG. 25) is set, and the next time T131 occurs, the submode counter shifts to the next submode.

The sixth submode is employed to justify the alpha field A2. During justification, the characters in the AMR are moved from the low order end to the high order end of the field. It will be recalled that the A2 field was initially filled with all ones. The entry of characters into this field had the effect of pushing these ones from the low order end toward and out of the high order end of the field. To justify, the useful characters in the alpha field must be moved in the direction of the high order end until all of the illegal (all-ones) characters are eliminated. During the sixth submode the characters in the A2 field are recirculated in the usual manner through the AMR funnel, but they are also fed to the input register. After one cycle of the AMR, the character in the input register will be the highest order character of the alpha field A2. If this character is all ones, justification is required. F67 (FIG. 24) is set, and during the next cycle of the AMR, the contents of the A2 field only are recirculated through the input register in series with the AMR. The effect of this is to shift everything in the field upwardly by five bits (one character). Thus the highest order character is shifted into the low order end of the A2 field and the next highest order character is now the highest order character and appears in the input register. This character is observed, and if it consists of all ones, the procedure is repeated. It is continued until all of the illegal characters are evicted from the high order end of the A2 field, at which point the submode counter switches to the seventh submode.

The seventh submode is used to justify the field A3. Justification of the A3 field is carried out in substantially the same manner as justification of the A2 field, with a slight complication caused by the fact that when T131 is reached, the last bit is still in the AMR, rather than in the input register. Thus, instead of observing four bits of the input register (for four bit characters) the last bit in the AMR is observed as well as the first three bits in the input register (stages F62 – F64). If the message were all-alpha, four bits in the input register (stages F61–F64) would be observed in addition to the last bit in the AMR. When justification is complete, the submode counter switches to the next submode.

During the eighth submode, the message in the AMR, if an instruction message, is transferred to the instruction message register. The type of message is, of course, determined from the preamble. If any other type of message is in the AMR, the message merely remains there during this submode. The eighth submode is always terminated upon the concurrence of C11 and T131, and that also terminates mode M1.

A typical input sequence for a merchandise message (via wand) is shown in FIGS. 126 – 129, in which the relationship of various signals referred to above can be seen.

Certain preambles tell the system to skip some submodes. As an example, if data are entered from the keyboard, the alpha submode will be skipped. The only submode that may be skipped when data are entered via the wand or tape loop is the amount submode, which is skipped if the preamble indicates that it should be skipped. If a credit card number is entered from the keyboard, the amount submode is skipped. There may also be circumstances in which it is desired to ignore the information stored in an amount field and to key in new information instead. At the end of submode 2, the preamble is observed, and if it designates one of these cases, F103 (FIG. 25) is set. The system continues through submodes 3, 4 and 5. F69 (FIG. 42) will set at the end of submode 5 (if F103 was previously set) and this will render the keyboard live. When the end of submode 5 is reached, the system reverts to the beginning of submode 4 and lights a lamp to illuminate the legend "Key In Amount". The amount is then keyed into the amount field, and when the "Enter" key is pressed, the system switches to submode 5 again and resets F103. Now, in submode 5 the system is no longer seeking the end of data signal R3 (the setting of F69 so informs the system), but merely awaits the next T131 and switches to the next submode. At the end of submode 5 F69 is reset. From this point the procedure continues as before, including justification etc.

The same sequence of events may take place if F261 (FIG. 25) is set as a result of the combination of a particular preamble and the Y-character. In that event, if the next message that arrives is a merchandise message, the submode skipping procedure just outlined is followed.

When the system is requesting information from the wand, it is possible to key in from the keyboard two types of information:
1. If a merchandise item is sought, it is possible to key in the entire equivalent of a tag, except the alpha field, of course.
2. If an account number is sought, it is possible to key in the same.

There are instances, of course, where the keyboard is employed for keying in a portion of a message, as already discussed, when at an appropriate time during mode M1 the system requests that the operator key in an amount. F69 (FIG. 42), when set, designates that the keyboard is selected, and the wand is locked out. F129, along with the anti-bounce circuit (FIG. 64), produces a "strobe" pulse for key signals.

There are two differences when entering a complete message from the keyboard (as distinguished from the wand):

1. The character counter is preset to two characters, instead of three, because of the absence of a parity character.
2. The A2 field is preset to all zeros, instead of all ones, to avoid a problem during justification. In the absence of this, the system would remain in the A2 justification submode indefinitely.

Any quantities inserted in the AMR from an external source (during M1) are assumed to be positive quantities, but if as the result of an arithmetic operation, a negative is set into the AMR, then flip-flop F116 (FIGS. 26 and 26A) is set.

Figure 55:
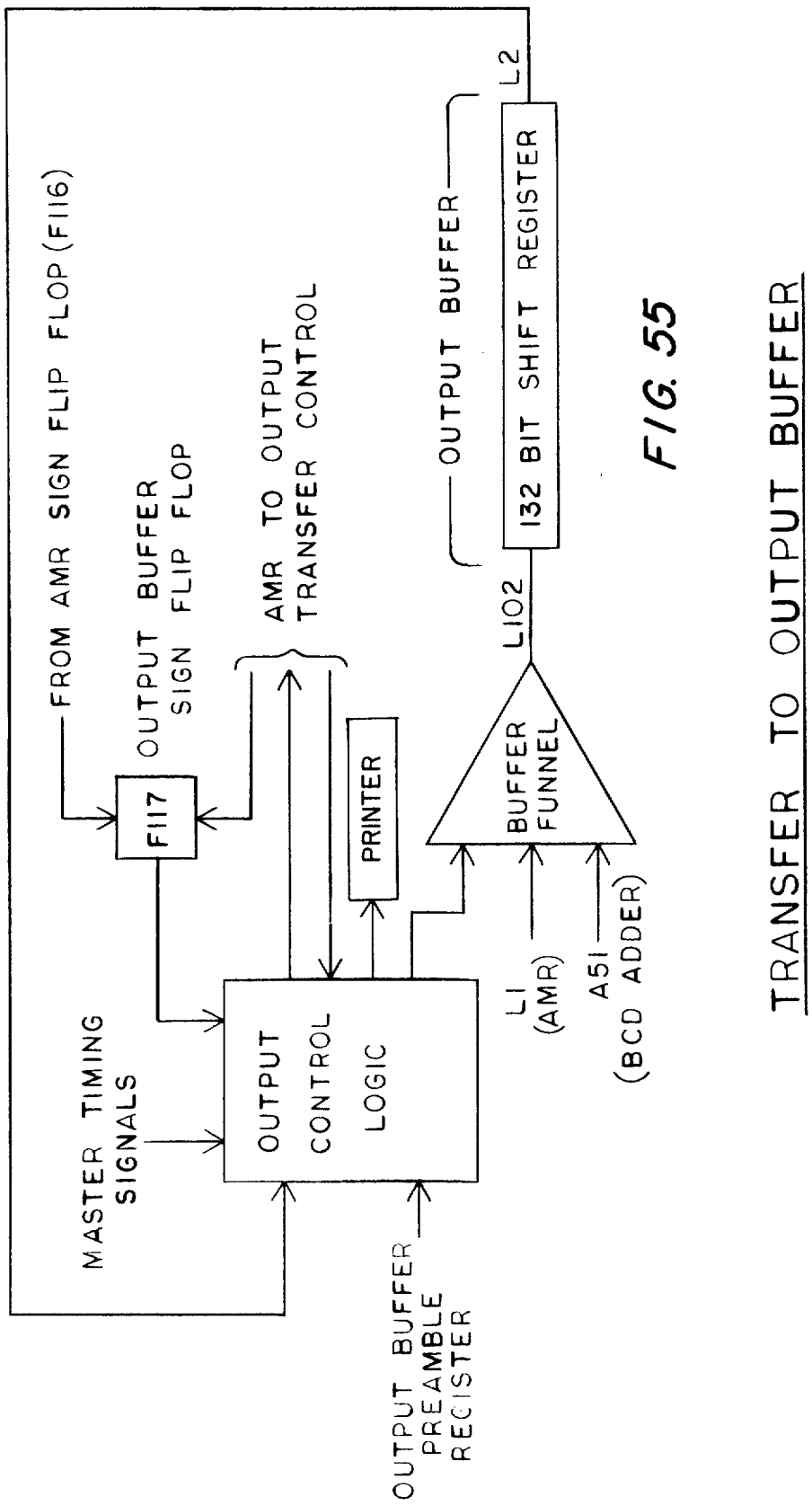
Figure 56:
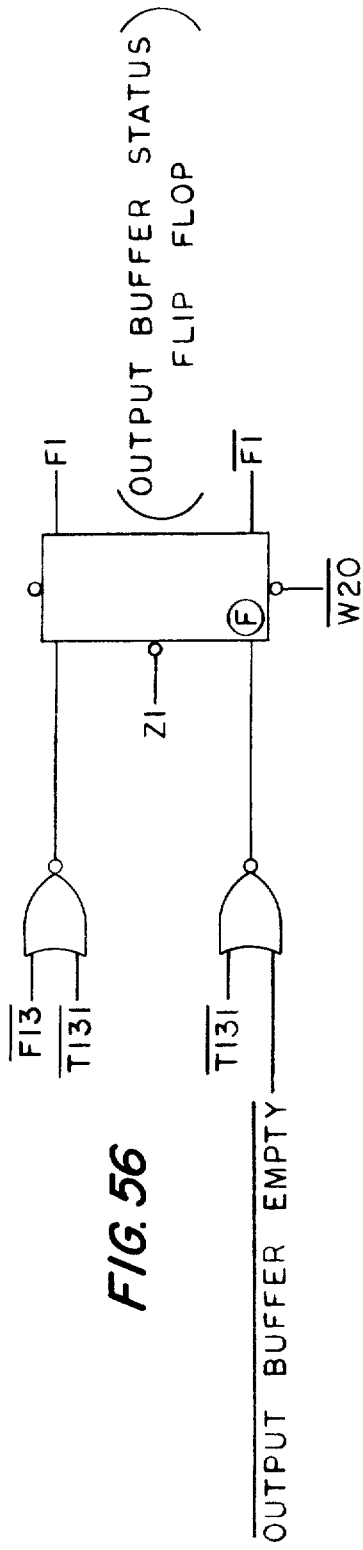
Figure 57:
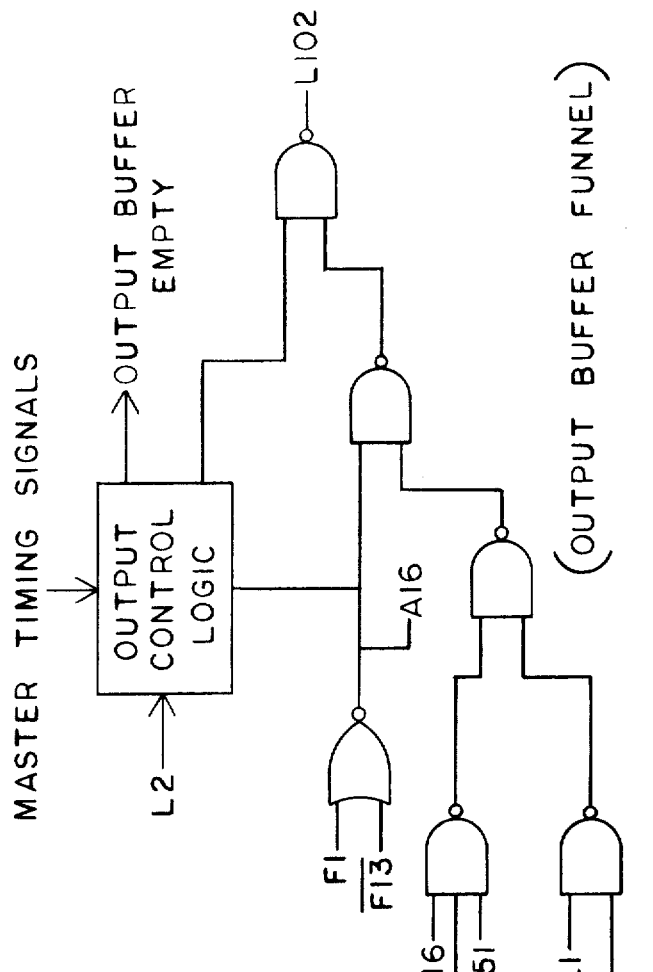
Figure 62:
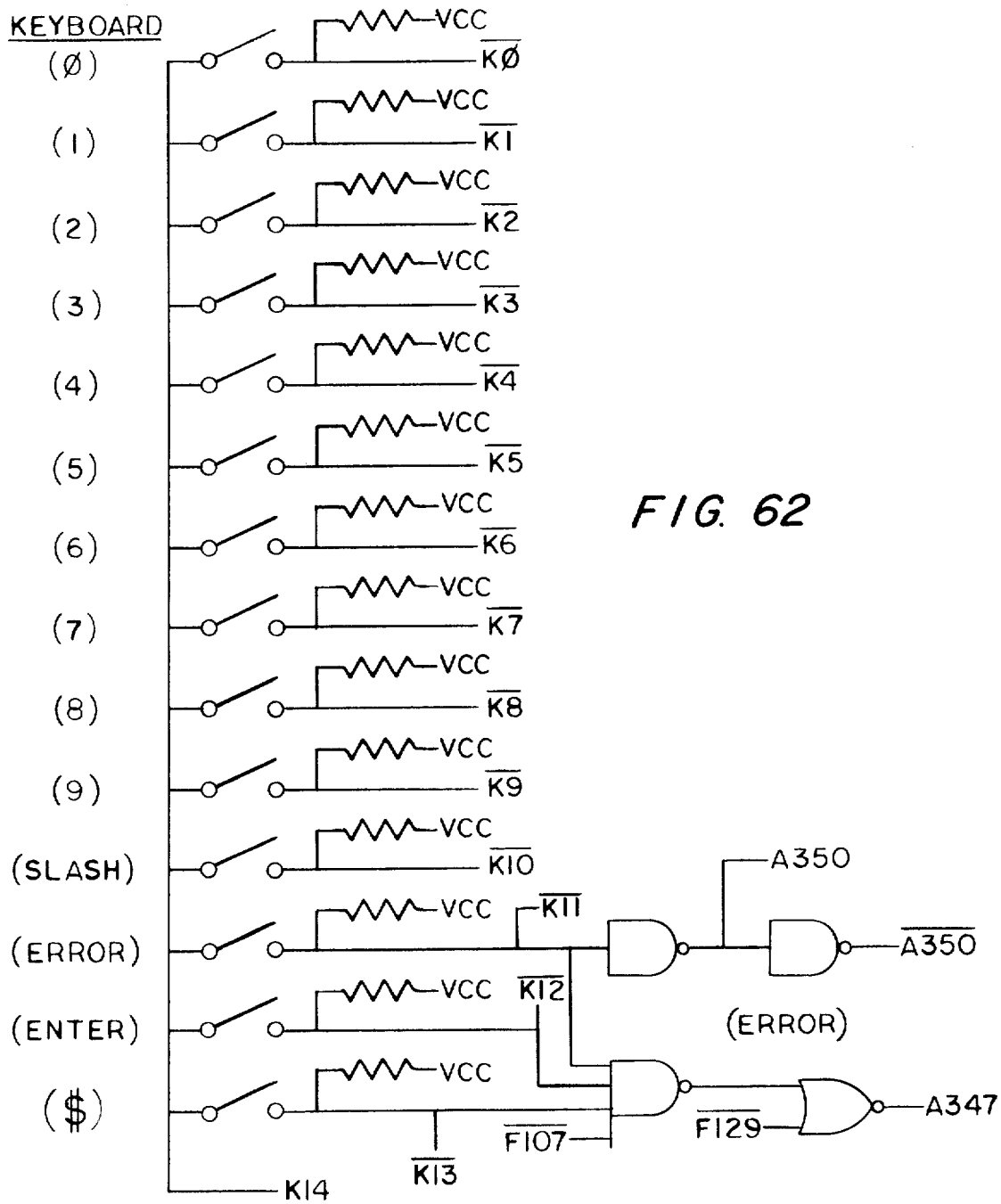
FIG. 62 is a logic-schematic diagram of another input portion of the system.

In mode M2, the contents of the AMR are shifted to the output buffer (FIGS. 42 and 55). If flip-flop F1 (FIG. 56) is set when mode M2 is entered, the output buffer is full, and the system waits until F1 is reset, which occurs coincident with T131, at which time the contents of the AMR are shifted to the output buffer during the next cycle of the AMR. Flip-flop F13 (FIG. 58) is always set upon the first T131 in the M2 mode. This provides one complete cycle of the AMR before the contents are shifted into the output buffer. Shifting of data into the output buffer can only occur when F13 is set and F1 is not set. Flip-flop F128 (FIGS. 73 and 83) is employed to control printing or non-printing of the message in the output buffer. If F128 is reset when F13 is set, M2 terminates immediately.

As stated previously, mode M3 is the execute (arithmetic) mode. The duration of mode M3 is always eleven cycles of the AMR (e.g., C1–C11). When leaving M1 to enter M3, the system always waits for the end of C11 before commencing M3, so as to provide the full eleven cycles of the AMR in M3. When entering M3 from M4, flip-flop F126 (FIGS. 73 and 82) is set at the end of the first C11 which appears during M3. The system remains in M3 until the next C11.

The following table gives arithmetic or bit-manipulative rules for different preambles of command messages, which are executed during M3:

| Rule No. | Preamble | Rule |
| --- | --- | --- |
| 1 | 95 | [Y] − [X]→[Y] & AMR & print with decimal point |
| 2 | 97 | [Y] + [X]→[Y] & AMR & print with decimal point |
| 3 | 94 | [Y] + [X] [Y] & AMR & print without decimal point |
| 4 | 83 | [X] − [Y]→AMR & print with decimal point |
| 5 | 84,85 | [AMR]→Y & print with decimal point |
| 6 | 80,81 | [AMR]→Y & print without decimal point |

The notation [Y] − [X] → AMR means subtract the quantity in the AR-X register from the quantity in the AR-Y and transfer the result to the AMR. The notation [AMR] → Y means transfer the quantity in the AMR register to the AR-Y. The meaning of the remaining notations will thus be apparent. Two preambles are given for Rule Nos. 5 and 6. Preambles 80 and 84 will result in illumination of the legend "Key Amount" (by the X-character), requiring an entry from keyboard, while preambles 81 and 35 will not.

The following table gives typical sequences of events during the mode M3 for the preamble types listed, the parenthetical terms (L__) designating the signals involved in the performance of the functions:
SEQUENCE OF EVENTS IN M3 (for command messages)

94, 95, 97; Find arithmetic register (AR-X) corresponding to X address character in LSD trap & copy its contents into the AMR A1 field (L 101).

Find arithmetic register (AR-Y) corresponding to Y address character in NLSD trap & perform ADD-/SUB (see arithmetic rules) on its contents and contents of AMR A1 field, result to AR-Y register and AMR A1 field (L101, L103).

83; Find arithmetic register (AR-X) corresponding to X address character in LSD trap & copy its contents into the AMR A1 field (L101).

Find arithmetic register (AR-Y) corresponding to Y address character in NLSD trap & subtract its contents from contents of AMR A1 field, result to AMR A1 field only (L101).

84, 85; 80,81: Find arithmetic register (AR-Y) corresponding to Y address character in NLSD trap & copy contents of AMR A1 field into it (L103).

FIGS. 84 – 87 are timing diagrams which show the performance of execute/arithmetic operations for different message types. The C-counter gives the addresses of the AR registers in sequence, A1 the amount field of the AMR, and AR the arithmetic registers in sequence (but not numerical order). The time of occurrence of particular operations (depending upon preamble, X, or Y, characters) is indicated in the diagrams.

In addition to bit-manipulative and arithmetic commands, which are executed during M3, housekeeping instruction codes (which do not call for entry of data) are also executed during M3. In certain instances, as when the instruction code states "open drawer" or "tear slip", the length of M3 is indeterminate, because the system remains in M3 until the operation is performed by the operator. The closing of the drawer or the tearing of the slip produces termination of M3 at the end of the next C11.

Mode M4 is the shift or sequencing mode, during which a six-bit instruction code is shifted from the instruction message register to the instruction code register (FIG. 88). As indicated previously, there are two types of instruction codes. The first type merely requests information (external or internal), and thus calls for a new message input. The state of F99 specifies internal or external source. The states of F85 – F88 specify the address of a message sought in the tape memory and specify the preamble class of an external message. A one in F89 and a zero in F99 designate that an identification number, such as a credit card number, is desired. All zeros in F85 – F89 designates "Scan Merchandise". The second type of instruction code requests the execution of a housekeeping command, indicated by the set state of F89 and F99.

When an instruction message is being entered in the AMR from an external source (to be transferred to the IMR during the eighth sub-mode of M1) the A3 field of the AMR will be filled, and two characters will appear in the A2 field. This is accomplished by providing logic which recognizes the fact that an instruction message from an external source is requested, and which recognizes the fact that entry is being made into the A2 (alpha) field and that the character counter has reached H9, the second alpha character. At this point the logic terminates the alpha submode of M1. In messages from the tape memory, which are 112 bits long, the whole alpha field is filled. The high order 66 bits in the AMR are the usable bits, and the lower order bits are not used. During submode 8 of M1, while awaiting the concurrence of C11 and T131 as discussed previously, transfer of the instruction message from the AMR to the IMR is made, but only the high order 66 bits are fed to the IMR, as stated. While awaiting the concurrence of C11 and T131, the bits fed from the AMR to the IMR keep recirculating through the IMR, and when C11 and T131 occur, the high order 66 bits from the AMR will appear in the IMR. At this time the mode control switches to M2, so that the instruction message is transmitted to the output. Next the mode control switches from M2 to M4 in order to transfer the first 6 high order bits from the IMR to the instruction code register (ICR). Signal W11 is high for half of the time from T0 to T131, and it is during that time that the shifting occurs.

During the first 66 bit period of M4, data in the instruction message register are circulated through the IMR funnel. During the next 66 bit period of M4, the data are circulated through the instruction code register. The object is to take the six bits which are at the high end of the IMR and insert them in the ICR, at the same time, of course, shifting everything that is in the IMR upward by six bits. When the 6 bits are shifted into the ICR, whatever is in the ICR is shifted into the low-order end of the IMR.

The data in the ICR at the termination of M4 tell the logic the next mode. Since at T131 the system is about to shift from M4 and at that time the ICR is short by one bit of the new instruction code, the logic actually observes the first five stages F85 – F89 and observes the signal L4 (last stage of the IMR), and this is equivalent to looking at the six stages of the ICR after the instruction code has been shifted.

A typical transaction may now be considered in greater detail. As the result of a start up procedure, a first instruction message may be supplied to the instruction message register (IMR) during M1. The system shifts to M2 (to output the message) and then to M4 for shifting the first instruction code into the instruction code register (ICR). This instruction code calls for information from the wand, lights the "Scan Employee Number" legend, and places the machine in mode M1. The operator then scans the employee number on his badge, which is entered into the active message register (AMR) during M1, presuming that the message is read correctly. The preamble of this message, entered in the preamble register, informs the logic that printing of the employee number is required on the sales slip. The system thus switches to mode M2 for the printing of the employee number. Then, in accordance with the mode rules, the system switches to mode M4, and the next instruction code is inserted in the ICR. This code calls for information, resulting in the illumination of the "Scan Merchandise" legend and the illumination of certain other panel indicator lamps, including, for example, "Return", "Mark Down", "Discount", "Void", and "Complete". At the same time the machine switches to mode M1.

The operator then scans the message strips associated with the merchandise, each message entering the AMR and being checked for errors in the usual manner. Each preamble informs the system logic what to do with the message. In this case the system switches to mode M3 and accumulates the price information from the scanned messages in certain arithmetic registers. In each instance the system switches to mode M2 for the printing of the message and then back to mode M1 to receive the next message. When the operator is finished entering merchandise messages, he scans the "Complete" (or "fetch") message strip on the control panel. This is a command message, which may be entered when the instruction code calls for the entry of merchandise messages.

The "Complete" message enters the AMR (being checked for accuracy in the usual manner), and the preamble in the preamble register informs the system to go directly from mode M1 to mode M4, thus shifting the next instruction code into the ICR. This code calls for a command message from tape memory and switches the system to M1 for the entry of this message into the AMR. The preamble of this command message informs the system to switch to mode M3, and compute a sub-total, then to switch to mode M2 and print the sub-total. Next, in accordance with the mode rules, the system switches to M4, and the next instruction code shifted into the ICR illuminates the legend "Scan Type Transaction" as well as certain panel lamps associated with message strips, such as "Cash Take", "Cash Send", "C.O.D.", "Charge Take", "Charge Send", as well as others. The instruction code also shifts the system to mode M1.

The message type now requested by the instruction code is an instruction message via wand. If the operator then scans the "Charge Take" message strip, this instruction message will be entered in the AMR and the IMR during M1, will be sent to output during M2, and then the system will switch to M4 to shift the first instruction code into the ICR. This instruction code calls for information via wand and lights the legend "Scan Credit Card" on the control panel. At the same time the system is shifted to M1 for receiving this information. The operator then scans the credit card message from the customer's card, and this message (recognized by its preamble type) shifts the system to M2 for the printing of the credit card number.

Then the system shifts to M4, shifting in the next instruction code, which calls for an instruction message from tape and shifts the system into M1 for entry of that message. This message defines a sequence of steps for computing and printing a total, the system shifting to M3 for computation of the total and to M2 for the printing of the total. One of the instruction codes (a housekeeping code) of that message causes illumination of the legends "Request Signature" and "Tear Slip". The customer signs the sales slip and the operator tears the sales slip. The system remains in M3 until this operation is accomplished. The actuation of the "Tear Slip" switch (referred to previously) then causes the system to switch to M4 for the next instruction code, which may commence a new transaction by illuminating the legend "Scan Employee Number".

From the foregoing description it is apparent that the invention provides a data processing device, such as a cash register, with significant advantages in terms of speed, accuracy, economy, and versatility. The operator is relieved of the necessity of pressing keys to tell the machine the type of entry made and what operations to perform. The operator is reminded, by indicator lights, of each step to be performed by the operator, and the transaction will not proceed unless each step is performed correctly. Expensive internal computer memory is avoided, and a single serial input channel is used for the entry of all information, regardless of source. Many different transaction routines are possible merely by changing the external control panel. Full control of floor procedures and negative transactions (voids, refunds, exchanges, etc.) is provided, and certain procedures may be restricted to certain classes of authorized personnel (or credit levels) only (by virtue of preamble class). Instead of the usual system of keys and locks to restrict certain operations to supervisory personnel, for example, it is only necessary to provide such personnel with an appropriate message strip badge. The machine will perform restricted operations only when such a badge is scanned. In the event of the loss of a badge or a compromise of security, it is not necessary to incur the usual expense of changing locks. Rather, the machine of the invention can readily be programmed to ignore messages associated with certain employee numbers and in fact to sound an alarm when such a number is entered.

A further aspect of versatility of the invention concerns the provision of master tags for merchandise without merchandise tags. The master tags may be message strips similar to merchandise strips, but provided at the register. These may be scanned to enter information such as department, class, and description of article, and to cause the machine to instruct the operator to key in the price.

While preferred embodiments of the invention have been shown and described, it will be apparent to those skilled in the art that changes can be made in these embodiments without departing from the principles and spirit of the invention, the scope of which is defined in the appended claims. For example, within the broader aspects of the invention, a general purpose digital computer, such as an IBM 360, RCA Spectra 70, or Control Data 7600, could be programmed to perform the data processing operations in response to the external message strips via the wand. Accordingly, the foregoing embodiments are to be considered illustrative, rather than restrictive, and those modifications which come within the meaning and range of equivalents of the claims are to be included therein.

The invention claimed is:

1. Data terminal processing apparatus comprising a housing having electronic circuit means therein for performing data processing operations in accordance with an operator-selectable program, an array of operator-accesible pre-recorded instruction message strips external to said housing and having program sub-routine messages recorded thereon, additional operator-accesible, pre-recorded message strips having messages recorded thereon including data to be processed by said apparatus in accordance with said program, a manually movable wand connected to said circuit means for scanning said strips to produce electrical signals corresponding to the messages scanned, each of said message strips having recorded thereon characters which represent identification and processing information relating to the associated message, said circuit means including means responsive to the electrical signals corresponding to said characters for identifying the associated messages, and including means for determining the data processing operations to be performed upon the electrical signals corresponding to the associated messages, said circuit means further including an instruction message sequencer having means responsive to said means for determining, for receiving and temporarily storing electrical signals corresponding to a scanned and identified instruction message, and said circuit means also including means responsive to the electrical signals stored by said instruction message sequencer for causing said apparatus to execute the stored instruction message and to perform a sequence of data processing operations in accordance with a program constituted at least in part by said sub-routine messages, said instruction message sequencer also including means responsive to the execution of the stored instruction message for replacing the stored signals with other signals corresponding to a subsequent scanned and identified instruction message.

2. Apparatus in accordance with claim 1, wherein said characters are recorded as a preamble to the message of each strip.

3. Apparatus is accordance with claim 1, wherein said apparatus has indicators associated with said message strips and said circuit means includes means for illuminating said indicators at appropriate times during data processing operations for informing the operator of said apparatus as to the strips to be scanned by said wand.

4. Apparatus in accordance with claim 3, wherein said circuit means includes means for establishing certain acceptable message-identifying characters concurrently with the illumination of certain of said indicators, and means for rejecting electrical signals associated with characters other than the acceptable characters.

5. Apparatus in accordance with claim 1, wherein said apparatus is a point-of-sale device, said array of strips is mounted upon said housing, and at least some of said additional strips are attached to articles to be sold.

6. Apparatus in accordance with claim 5, wherein said array is readily detachable from said housing for replacement by another array.

* * * * *